US010200688B2

United States Patent
Ikai

(10) Patent No.: US 10,200,688 B2
(45) Date of Patent: Feb. 5, 2019

(54) ILLUMINATION COMPENSATION DEVICE AND ILLUMINATION COMPENSATION METHOD

(71) Applicant: Sharp Kabushiki Kaisha, Sakai, Osaka (JP)

(72) Inventor: Tomohiro Ikai, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/842,601

(22) Filed: Dec. 14, 2017

(65) Prior Publication Data

US 2018/0109790 A1 Apr. 19, 2018

Related U.S. Application Data

(63) Continuation of application No. 14/899,047, filed as application No. PCT/JP2014/064734 on Jun. 3, 2014, now Pat. No. 9,894,359.

(30) Foreign Application Priority Data

Jun. 18, 2013 (JP) ................................ 2013-127263

(51) Int. Cl.
| | | |
|---|---|---|
| G06K 9/00 | (2006.01) | |
| H04N 19/117 | (2014.01) | |
| H04N 19/176 | (2014.01) | |
| H04N 19/136 | (2014.01) | |
| H04N 19/597 | (2014.01) | |
| H04N 19/593 | (2014.01) | |
| H04N 19/11 | (2014.01) | |
| H04N 19/42 | (2014.01) | |

(52) U.S. Cl.
CPC ........... *H04N 19/117* (2014.11); *H04N 19/11* (2014.11); *H04N 19/136* (2014.11); *H04N 19/176* (2014.11); *H04N 19/42* (2014.11); *H04N 19/593* (2014.11); *H04N 19/597* (2014.11)

(58) Field of Classification Search
CPC .... H04N 19/117; H04N 19/597; H04N 19/59; H04N 19/86; H04N 19/33; H04N 19/176; H04N 19/136
USPC ......................................... 382/274
See application file for complete search history.

(56) References Cited

U.S. PATENT DOCUMENTS 9,894,359 B2 * 2/2018 Ikai ....................... H04N 19/117

OTHER PUBLICATIONS

Liu et al., "3D-CE2.h : Results of Illumination Compensation for Inter-View Prediction", Joint Collaborative Team on 3D Video Coding Extension Development of ITU-T SG 16 WP 3 and ISO/IEC JTC 1/SC 29/WG 11, 2nd Meeting: Shanghai, CN, Oct. 13-19, 2012, [Document: JCT3V-B0045].

(Continued)

*Primary Examiner* — Andrew Moyer
(74) *Attorney, Agent, or Firm* — Birch, Stewart, Kolasch & Birch, LLP

(57) ABSTRACT

By either subsampling neighbor pixels and deriving an illumination variation parameter, or deriving one normalization shift value of two normalization shift values for normalizing parameters which are used when deriving the illumination variation parameter, with a dependency on the other normalization shift value, an amount of calculation for illumination compensation is reduced.

2 Claims, 33 Drawing Sheets

(56) References Cited

OTHER PUBLICATIONS

Liu et al., "LM Mode Clean-Up", Joint Collaborative Team on Video Coding (JCT-VC) of ITU-T SG 16 WP 3 and ISO/IEC JTC 1/SC 29/WG 11, 9th Meeting: Geneva, CH, Apr. 27-May 7, 2012, [Document: JCTVC-I0148].
U.S. Notice of Allowance for U.S. Appl. No. 14/899,047 dated Apr. 12, 2017.
U.S. Notice of Allowance for U.S. Appl. No. 14/899,047 dated Sep. 22, 2017.
U.S. Office Action for U.S. Appl. No. 14/899,047 dated Oct. 18, 2016.

* cited by examiner

FIG. 2
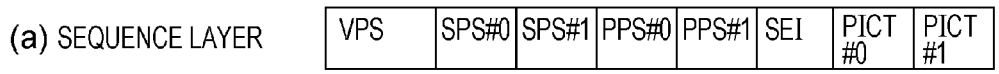
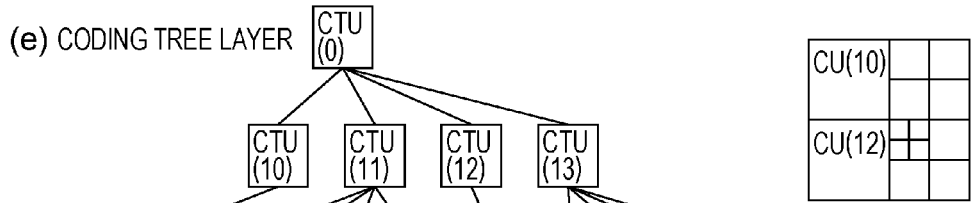

FIG. 14

| a2s | 0 | 1 | 2 | 3 | 4 | 5 | 6 | 7 | 8 | 9 | 10 | 11 | 12 |
|---|---|---|---|---|---|---|---|---|---|---|---|---|---|
| invTable | 0 | 32768 | 16384 | 10923 | 8192 | 6554 | 5461 | 4681 | 4096 | 3641 | 3277 | 2979 | 2731 |
| a2s | 13 | 14 | 15 | 16 | 17 | 18 | 19 | 20 | 21 | 22 | 23 | 24 | 25 |
| invTable | 2521 | 2341 | 2185 | 2048 | 1928 | 1820 | 1725 | 1638 | 1560 | 1489 | 1425 | 1365 | 1311 |
| a2s | 26 | 27 | 28 | 29 | 30 | 31 | 32 | 33 | 34 | 35 | 36 | 37 | 38 |
| invTable | 1260 | 1214 | 1170 | 1130 | 1092 | 1057 | 1024 | 993 | 964 | 936 | 910 | 886 | 862 |
| a2s | 39 | 40 | 41 | 42 | 43 | 44 | 45 | 46 | 47 | 48 | 49 | 50 | 51 |
| invTable | 840 | 819 | 799 | 780 | 762 | 745 | 728 | 712 | 697 | 683 | 669 | 655 | 643 |
| a2s | 52 | 53 | 54 | 55 | 56 | 57 | 58 | 59 | 60 | 61 | 62 | 63 | |
| invTable | 630 | 618 | 607 | 596 | 585 | 575 | 565 | 555 | 546 | 537 | 529 | 520 | |

ILLUMINATION COMPENSATION DEVICE AND ILLUMINATION COMPENSATION METHOD

CROSS REFERENCE TO RELATED APPLICATIONS

This application is a continuation of application Ser. No. 14/899,047, filed on Dec. 16, 2015, which is a National Phase of PCT International Application No. PCT/JP2014/064734 filed on Jun. 3, 2014 and claims priority to Japanese Patent Application No. 2013-127263 filed on Jun. 18, 2013. The entire contents of all of the above applications are hereby expressly incorporated by reference into the present application.

TECHNICAL FIELD

The present invention relates to an illumination compensation device, an LM prediction device, an image decoding device, and an image coding device.

BACKGROUND ART

As a technique of coding images for a plurality of viewpoints, disparity prediction coding in which, when coding images for a plurality of viewpoints, by predicting disparity between the images, an amount of information is reduced, and a decoding method corresponding to the coding method have been proposed. A vector that represents disparity between viewpoint images is called a disparity vector. The disparity vector is a two-dimensional vector having an element in a horizontal direction (x component) and an element in a vertical direction (y component), and is calculated for each of blocks which are regions obtained by dividing one image. For acquiring images for a plurality of viewpoints, cameras that are arranged at the respective viewpoints are generally used. In coding for the plurality of viewpoints, the viewpoint images are coded as mutually different layers in a plurality of layers. A coding method for a moving image formed of a plurality of layers is generally called scalable coding or hierarchy coding. In the scalable coding, high coding efficiency is realized by performing prediction between layers. A layer serving as a reference, for which prediction between layers is not performed, is called a base layer, and other layers are called enhancement layers. Scalable coding when layers are formed of viewpoint images is called view scalable coding. In this case, the base layer is also called a base view, and the enhancement layer is also called a non-base view. Further, in addition to the view scalable, scalable coding when layers are formed of a texture layer (image layer) and a depth layer (distance image layer) is called three-dimensional scalable coding.

Examples of the scalable coding include, in addition to the view scalable coding, spatial scalable coding (in which a picture having a low resolution is processed as a base layer and a picture having a high resolution is processed as an enhancement layer), and SNR scalable coding (in which a picture having low image quality is processed as a base layer and a picture having a high resolution is processed as an enhancement layer). In the scalable coding, for example, a picture of a base layer is used as a reference picture in coding of a picture of an enhancement layer in some cases.

In NPL 1, a technique called illumination compensation in which an illumination change in neighbor pixels of a prediction target block are used for predicting the prediction target block i s known.

Moreover, in NPL 2, a technique called LM prediction in which a chroma image of a prediction target block is prediction from a corresponding luminance image is known.

CITATION LIST

Non Patent Literature

NPL 1: 3D-CE2.h: Results of Illumination Compensation for Inter-View Prediction, JCT3V-B0045, JCT-3V Shanghai, CN, 13-19October 2012

NPL 2: LM Mode Clean-Up, JCTVC-I0148, JCT-VC Geneva, CH, 27 Apr.-7 May 2012

SUMMARY OF INVENTION

Technical Problem

In the illumination compensation of NPL 1, however, there is a problem that an amount of calculation, when prediction parameters for the illumination compensation are derived by using neighbor pixels of a target region and a reference region, is large. In the LM prediction of NPL 2, there is a problem that an amount of calculation, when prediction parameters for the illumination compensation are derived by using neighbor pixels of a target region (chroma image) and a reference region (luminance image), is large.

The invention has been made in view of above points, and provides an image decoding device, an image decoding method, an image decoding program, an image coding device, an image coding method, an image coding program, an image display system, and an image transfer system by which amounts of calculation for illumination compensation and LM prediction are reduced.

Solution to Problem

According to an illumination compensation device with one configuration, the illumination compensation device includes an illumination compensation unit that applies illumination compensation to a motion compensation image, in which the illumination compensation unit includes an illumination parameter estimation unit that derives an illumination variation parameter from reference images in a reference layer and adjacent decoding images in a target layer, and an illumination compensation filter that performs the illumination compensation by using the illumination variation parameter, the illumination compensation filter includes means for adding a parameter b of the illumination variation parameter to a product of the motion compensation image obtained from a reference picture and a parameter a of the illumination variation parameter, the illumination parameter estimation unit includes parameter a derivation means for deriving the parameter a from a first parameter and a second parameter, the parameter a derivation means includes a parameter normalization shift unit that derives a first normalization shift value and a second normalization shift value, a parameter normalization shift unit that uses the first normalization shift value to derive a normalization first parameter by right-shifting the first parameter, and a parameter normalization shift unit that uses the second normalization shift value to derive a normalization second parameter by right-shifting the second parameter, and the parameter normalization shift unit derives the first normalization shift value by subtracting a predetermined value from the second normalization shift value.

According to an illumination compensation device with one configuration, the illumination compensation device includes an illumination compensation unit that applies illumination compensation to a motion compensation image, in which the illumination compensation unit includes an illumination parameter estimation unit that derives an illumination variation parameter, which includes at least a parameter b, from, reference image regions in a reference layer and adjacent, decoding image regions in a target layer, and an illumination compensation filter that performs the illumination compensation by using the illumination variation parameter, the illumination compensation filter includes either means for adding the parameter b of the illumination variation parameter to a product of the motion compensation image obtained from a reference picture and a parameter a of the illumination variation parameter or means for adding the motion compensation image and the parameter b of the illumination variation parameter, and the illumination parameter estimation unit performs derivation by subsampling and referring to pixels of the reference image regions and the adjacent decoding image regions.

According to an illumination compensation device with one configuration, the illumination compensation device includes an illumination compensation unit that applies illumination compensation to a motion compensation image, in which in a case where a target block has a predetermined size or more, the illumination compensation is performed by the illumination compensation unit, and in a case where the target block is less than the predetermined size, the illumination compensation is not performed.

According to an illumination compensation device with one configuration, the illumination compensation device includes an illumination compensation unit that applies illumination compensation to a motion compensation image, in which the illumination compensation unit includes an illumination parameter estimation unit that derives an illumination variation parameter from reference image regions in a reference layer and adjacent decoding image regions in a target layer, and an illumination compensation filter that performs the illumination compensation by using the illumination variation parameter, and the illumination compensation filter, in a case where a target block has a predetermined size or more, performs the illumination compensation by means for adding a parameter b of the illumination variation parameter to a product of the motion compensation image obtained from the reference layer and a parameter a of the illumination variation parameter, and in a case where the target block is less than the predetermined size, performs the illumination compensation by means for adding the motion compensation image and the parameter b of the illumination variation parameter.

According to an illumination compensation device with one configuration, the illumination compensation device includes an illumination compensation unit that applies illumination compensation to a motion compensation image, in which the illumination compensation unit includes an illumination parameter estimation unit that derives an illumination variation parameter from reference image regions in a reference layer and adjacent decoding image regions in a target layer, and an illumination compensation filter that performs the illumination compensation by using the illumination variation parameter, and the illumination compensation filter, in a case where a target block is a luminance block, performs the illumination compensation by means for adding a parameter b of the illumination variation parameter to a product of the motion compensation image obtained from the reference layer and a parameter a of the illumination variation parameter, and in a case where the target block is a chroma block, performs the illumination compensation by means for adding the motion compensation image and the parameter b of the illumination variation parameter.

According to an LM prediction device with one configuration, the LM prediction device includes an LM prediction unit that applies a chroma prediction image from a luminance image, in which the LM prediction unit, includes an LM parameter estimation unit that derives an LM parameter from adjacent luminance images and adjacent chroma images, and an LM prediction filter that uses the LM parameter to generate the chroma prediction image from the luminance image, the LM prediction filter includes means for adding a parameter b of the LM parameter to a product of the luminance image and a parameter a of the LM parameter, the LM parameter estimation unit includes a parameter a derivation unit that derives the parameter a from a first parameter a1 obtained from a difference among a sum of products of pixel values of the adjacent luminance images and pixel values of the adjacent chroma images, a sum XY of the products of pixel values y of the adjacent chroma images and pixel values x of the adjacent luminance images, and a product of a sum Y of the pixel values of the adjacent chroma images and a sum X of the pixel values of the adjacent luminance images, and a second parameter a2$v$ obtained from a difference between a sum XX of squares of the pixel values of the adjacent luminance images and a square of the sum X of the pixel values of the adjacent luminance images, and the parameter a derivation unit includes means for right-shifting the first parameter a1 and the second parameter a2 according to a first normalization shift value and a second normalization shift value which are defined according to the second parameter a2.

Advantageous Effects of Invention

According to the invention, an amount of calculation and a scale of mounting for illumination compensation are reduced. According to the invention, an amount of calculation and a scale of mounting for LM prediction are reduced.

BRIEF DESCRIPTION OF DRAWINGS

FIG. 2 is a view illustrating a hierarchical structure of data in a coded stream according to the present embodiment.

FIG. 14 is a view illustrating a table used for illumination compensation according to the present embodiment.

DESCRIPTION OF EMBODIMENTS (First Embodiment)

An embodiment of the invention will hereinafter be described with reference to drawings.

Figure 1:
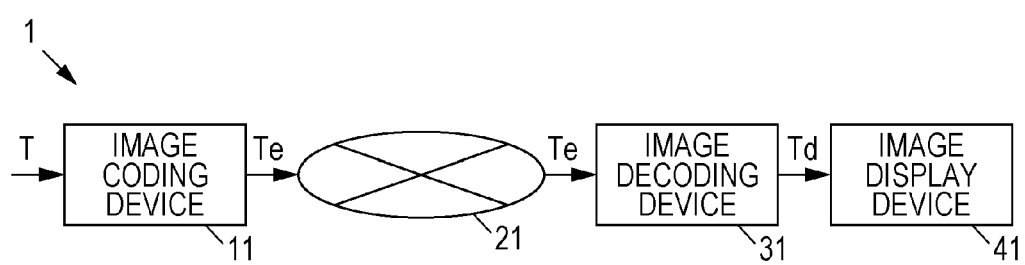
FIG. 1 is a schematic view illustrating a configuration of an image transfer system according to an embodiment of the invention.

FIG. 1 is a schematic view illustrating a configuration of an image transfer system 1 according to the present embodiment.

The image transfer system 1 is a system, that transfers codes obtained by coding a plurality of layer images, and displays an image obtained by decoding the transferred codes. The image transfer system 1 is composed by including an image coding device 11, a network 21, an image decoding device 31, and an image display device 41.

Signals T indicating a plurality of layer images (also referred to as texture images) are input to the image coding device 11. The layer image is an image that is visualized or photographed with a certain resolution and from a certain viewpoint. When view scalable coding in which a plurality of layer images are used to code a three-dimensional image is performed, each of the plurality of layer images is called a viewpoint image. Here, the viewpoint corresponds to a position of a photographing device or a point of observation. For example, a plurality of viewpoint images are images photographed by respective photographing devices on the right and the left facing an object. The image coding device 11 codes each of the signals to generate coded streams Te (coded data). The coded streams Te will be described below in detail. The viewpoint image is a two-dimensional image (plane image) that is observed from a certain viewpoint. The viewpoint image is indicated, for example, by a luminance value or a color signal value for each of pixels arranged in a two-dimensional plane. Hereinafter, one viewpoint image or a signal indicating the viewpoint image is called a picture. When spatial scalable coding is performed by using a plurality of layer images, the plurality of layer images are formed, of a base layer image having a low resolution and an enhancement layer image having a high resolution. When SNR scalable coding is performed by using a plurality of layer images, the plurality of layer images are formed of a base layer image having low image quality and an enhancement layer image having high image quality. Note that, the view scalable coding, the spatial scalable coding, and the SNR scalable coding may be performed in any combination. The present embodiment deals with coding and decoding of images that include at least a base layer image and an image other than the base layer image (enhancement layer image), as a plurality of layer images. As to two layers having a reference relation (dependence relation) in images or coding parameters among a plurality of layers, an image that is referred to is called a first layer image and an image that refers to it is called a second layer image. For example, when there is an enhancement layer image (other than a base layer) that is coded by referring to the base layer, the base layer image is treated as the first layer image and the enhancement layer image is treated, as the second layer image. Note that, examples of the enhancement layer image include an image for a viewpoint other than a base view, and a depth image.

The network 21 transfers the coded streams Te generated by the image coding device 11 to the image decoding device 31. The network 21 is the Internet, the Wide Area Network (WAN), the Local Area Network (LAN), or a combination thereof. The network 21 may not be necessarily a two-way communication network, and may be a one-way or two-way communication network that transfers broadcast waves of digital terrestrial broadcasting, satellite broadcasting and the like. A recording medium having the coded streams Te recorded therein, such as a DVD (Digital Versatile Disc) or a BD (Blu-ray Disc), may be used instead of the network 21.

The image decoding device 31 decodes each of the coded streams Te transferred by the network 21, and generates a plurality of decoded, layer images Td (decoded viewpoint images Td) each of which has been decoded.

The image display device 41 displays all or a part of the plurality of decoded layer images Td generated by the image decoding device 31. For example, in the view scalable coding, when all of them are displayed, a three-dimensional image (stereoscopic image) or a free-viewpoint image is displayed, and when a part of them is displayed, a two-dimensional image is displayed. The image display device 41 includes a display device such as, for example, a liquid crystal display or an organic EL (Electro-luminescence) display. Moreover, in the spatial scalable coding and the SNR scalable coding, when the image decoding device 31 and the image display device 41 have high processing capability, an enhancement layer image having high image quality is displayed, and when having only lower processing capability, a base layer image that does not require processing capability nor display capability as high as those of the enhancement layer is displayed.

<Structure of Coded Stream Te>

Prior to detailed description for the image coding device 11 and the image decoding device 31 according to the present embodiment, a data structure of the coded stream Te generated by the image coding device 11 and decoded by the image decoding device 31 will be described.

FIG. 2 is a view illustrating a hierarchical structure of data in the coded stream Te. The coded stream Te includes, for exemplification, a sequence and a plurality of pictures forming the sequence. Parts (a) to (f) of FIGS. 2 are views respectively illustrating a sequence layer that establishes a sequence SEQ, a picture layer that defines pictures PICTs, a slice layer that defines slices S, a slice data layer that defines slice data, a coding tree layer that defines coded tree units included in the slice data, and a coding unit layer that defines coding units (CUs) included in the coding tree.

(Sequence Layer)

In the sequence layer, a set of data to be referred to by the image decoding device 31 in order to decode a sequence SEQ to be processed (hereinafter, also referred to as a target sequence) is defined. The sequence SEQ includes a video parameter set, a sequence parameter set SPS, a picture parameter set PPS, a picture PICT, and supplemental enhancement information SEI, as illustrated in (a) of FIG. 2. In the figure, a value indicated after # denotes a layer ID. FIG. 2 indicates an example in which coded data of #0 and #1, that is, a layer 0 and a layer 1 exist, types of layers and the number of layers are not limited thereto.

In the video parameter set VPS, with respect to a moving image which is composed of a plurality of layers, a set of coding parameters that are common in a plurality of moving images and a set of coding parameters associated with a plurality of layers and individual layers included, in the moving image are defined.

In the sequence parameter set SPS, a set of coding parameters to be referred to by the image decoding device 31 in order to decode a target sequence is defined. For example, a width and a height of a picture are defined.

In the picture parameter set PPS, a set of coding parameters to be referred to by the image decoding device 31 in order to decode each picture in a target sequence is defined. For example, a reference value for a quantization width used for decoding pictures (pic_init_qp_minus26), and a flag indicating application of weighted prediction (weighted_pred_flag) are included. Note that, a plurality of PPSs may exist. In this case, any of the plurality of PPSs is selected from the respective pictures in a target sequence.

(Picture Layer)

In the picture layer, a set of data to be referred to by the image decoding device 31 in order to decode a picture PICT to be processed (hereinafter, also referred to as a target picture) is defined. The picture PICT includes slices S0 to SNS-1 (NS is the total number of the slices included in the picture PICT) as illustrated in (b) of FIG. 2.

Note that, in the following description, when it is unnecessary to distinguish the slices S0 to SNS-1 from each other, the codes may be described with subscripts thereof omitted. The similar is also applied to other data described below, which is data included in the coded stream Te and to which a subscript is added.

(Slice Layer)

In the slice layer, a set of data to be referred to by the image decoding device 31 in order to decode a slice S to be processed (also referred to as a target slice) is defined. As illustrated in (c) of FIG. 2, the slice S includes a slice header SH and slice data SDATA.

The slice header SH includes a group of coding parameters to be referred to by the image decoding device 31 in order to determine a method for decoding the target slice. Slice type designating information (slice_type) for designating a slice type is one example of coding parameters included in the slice header SH.

Examples of the slice type that is able to be designated by the slice type designating information include (1) I slice which uses only intra prediction in coding, (2) P slice which uses uni-directional prediction or intra prediction in coding, and (3) B slice which uses uni-directional prediction, bi-directional prediction, or intra prediction in coding.

Note that, the slice header SH may include reference to the picture parameter set PPS (pic_parameter_set_id) included in the sequence layer.

(Slice Data Layer)

In the slice data layer, a set of data to be referred to by the image decoding device 31 in order to decode slice data SDATA to be processed is defined. As illustrated in (d) of FIG. 2, the slice data SDATA includes a coded tree block (CTB). The CTB is a block with a fixed size (for example, 64×64), which forms a slice, and is also called a largest coding unit (LCU).

(Coding Tree Layer)

As illustrated in (e) of FIG. 2, in the coding tree layer, a set of data to be referred to by the image decoding device 31 in order to decode a coded tree block to be processed is defined. The coded tree unit is recursively split by quadtree splitting. A node with a tree structure obtained by the recursive quadtree splitting is referred to as a coding tree. An intermediate node of the quadtree is a coded tree unit (CTU), in which the coded tree block itself is also defined as a top CTU. The CTU includes a split flag (splif_flag), and is split into four coded tree units CTUs when splif_flag is 1. When splif_flag is 0, the coded tree unit CTU is divided into four coded units (CUs). The coded units CUs are end nodes of the coding tree layer, and are not split any more in this layer. The coded units CUs serve as basic units of coding processing.

When a size of the coded tree block CTB is 64×64 pixels, the coded units may take any sizes of 64×64 pixels, 32×32 pixels, 16×16 pixels, and 8×8 pixels.

(Coding Unit Layer)

In the coding unit layer, a set of data to be referred to by the image decoding device 31 in order to decode a coded unit to be processed is defined, as illustrated in (f) of FIG. 2. Specifically, the coded unit is formed of a CU header CUH, a prediction tree, a transform tree, and a CU header CUF. In the CU header CUH, for example, whether the coded unit is a unit using intra prediction or a unit using inter prediction is defined. The coded unit serves as a root for the prediction tree (PT) and the transform tree (TT). The CU header CUF is included between the prediction tree and the transform tree or after the transform tree.

In the prediction tree, the coded unit is split into one or plural prediction blocks, and a position and a size of each of the prediction blocks are defined. Stated differently, the prediction blocks are one or plural non-overlapping regions that form the coded unit. In addition, the prediction tree includes the one or plural prediction blocks obtained by the splitting above.

Prediction processing is performed for each of the prediction blocks. Hereinafter, the prediction blocks which are the units of prediction are also referred to as prediction units (PUs).

Roughly, there are two type of splitting in the prediction tree; a case of intra prediction and a case of inter prediction. The intra prediction is prediction in the same picture, and the inter prediction indicates prediction processing performed between pictures (for example, between display times or between layer images) which are mutually different.

In the case of the intra prediction, as a splitting method, there are 2N×2N (the same size as that, of the coded unit) and N×N.

In the case of the inter prediction, as a splitting method, there are 2N×2N (the same size as that of the coded unit), 2N×N, 2N×nU, 2N×nD, N×2N, nL×2N, nR×2N, N×N and the like, in which coding is performed by part mode of coded data. Note that, 2N×nU indicates splitting the coded unit with 2N×2N into two regions of 2N×0.5N and 2N×1.5N from, the top in order. 2N×nD indicates splitting the coded unit with 2N×2N into two regions of 2N×1.5N and 2N×0.5N from the top in order. nL×2N indicates splitting the coded unit with 2N×2N into two regions of 0.5N×2N and 1.5N×2N from the left in order. nR×2N indicates splitting the coded unit with 2N×2N into two regions of 1.5N×2N and 0.5N× 1.5N from the left in order. Since the splitting number is any of 1, 2, and 4, the number of PUs included in the CU is from 1 to 4. These PUs are expressed as a PU0, a PU1, a PU2, and a PU3 sequentially.

In the transform tree, the coded unit is split into one or plural transform blocks, and a position and a size of each of the transform blocks are defined. Stated differently, the transform blocks are one or plural non-overlapping regions that form, the coded unit. In addition, the transform tree includes the one or plural transform blocks obtained by the splitting above.

The splitting in the transform tree is performed by allocating regions, which have the same size as that of the coded unit, as transform, blocks or by recursive quadtree splitting similar to the splitting of the tree block described above.

Transform processing is performed for each of the transform blocks. Hereinafter, the transform blocks which are the units of transform are also referred to as transform units (TUs).

(Prediction Parameter)

A prediction image of a prediction unit is derived by a prediction parameter associated with the prediction unit. As the prediction parameter, there are a prediction parameter for the intra prediction and a prediction parameter for the inter prediction. The prediction parameter for the inter prediction (inter prediction parameter) will be described below. The inter prediction parameter is formed of prediction list utilization flags predFlagL0 and predFlagL1, reference picture indexes refIdxL0 and refIdxL1, and vectors mvL0 and mvL1. The prediction list utilization flags predFlagL0 and predFlagL1 are flags indicating whether or not reference picture lists respectively called an L0 list and an L1 list are used, and a corresponding reference picture list is used when a value is 1. Note that, when noted as "flag indicating whether or not XX" in the present description, 1 is set as a case of XX and 0 is set as a case of not XX, and 1 is treated as true and 0 is treated as false in logical NOT and logical AND (the similar is also applied below). However, other values may be used as a true value and a false value in an actual device or method. A case where two reference picture lists are used, that is, a case where predFlagL0=1 and predFlagL1=1 corresponds to bi-prediction, and a case where one reference picture is used, that is, a case where (predFlagL0, predFlagL1)=(1, 0) or (predFlagL0, predFlagL1)=(0, 1) corresponds to uni-prediction. Note that, information of prediction list utilization flags is also able to be expressed by an inter prediction flag inter_pred_idc described below. Normally, prediction list utilization flags are used in a prediction image generation unit and a prediction parameter memory, which will be described below, and when information as to which reference picture list is used is decoded from coded data, the inter prediction flag inter_pred_idc is used.

Examples of a syntax element for deriving the inter prediction parameter included in the coded data include a partition mode part_mode, a merge flag merge_flag, a merge index merge_idx, an inter prediction flag inter_pred_idc, a reference picture index refIdxLX, a prediction vector index mvp_Lx_idx, and a difference vector mvdLX.

(One Example of Reference Picture List)

Figure 3:
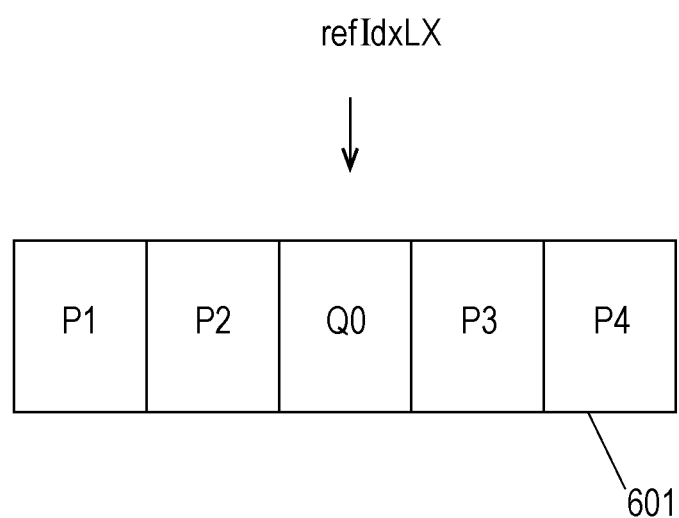
FIG. 3 is a concept view illustrating one example of a reference picture list.
Figure 5:
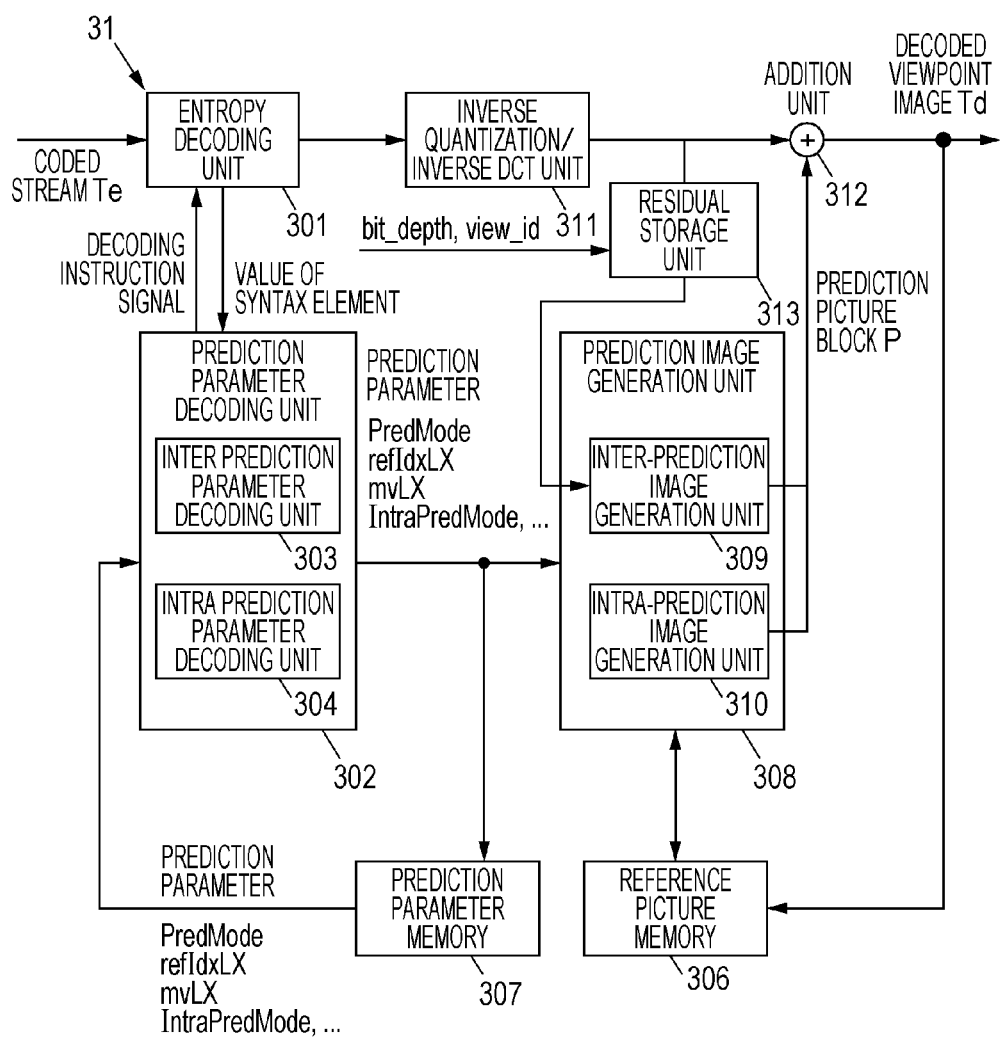
FIG. 5 is a schematic view illustrating a configuration of an image decoding device according to the present embodiment.

Next, one example of a reference picture list will be described. The reference picture list is a column composed of reference pictures stored in a reference picture memory 306 (FIG. 5). FIG. 3 is a concept view illustrating one example of the reference picture list. In a reference picture list 601, each of five rectangles arranged in one line from left to right indicates a reference picture. Codes of P1, P2, Q0, P3, and P4, which are indicated from a left end to the right, are codes indicating the respective reference pictures. P of P1 or the like indicates a viewpoint P, and Q of Q0 indicates a viewpoint Q different from the viewpoint P. Subscripts of P and Q indicate picture order numbers POCs. A downward arrow just below refIdxLX indicates that the reference picture index refIdxLX is an index for referring to the reference picture Q0 in the reference picture memory 306.

(Example of Reference Pictures)

Figure 4:
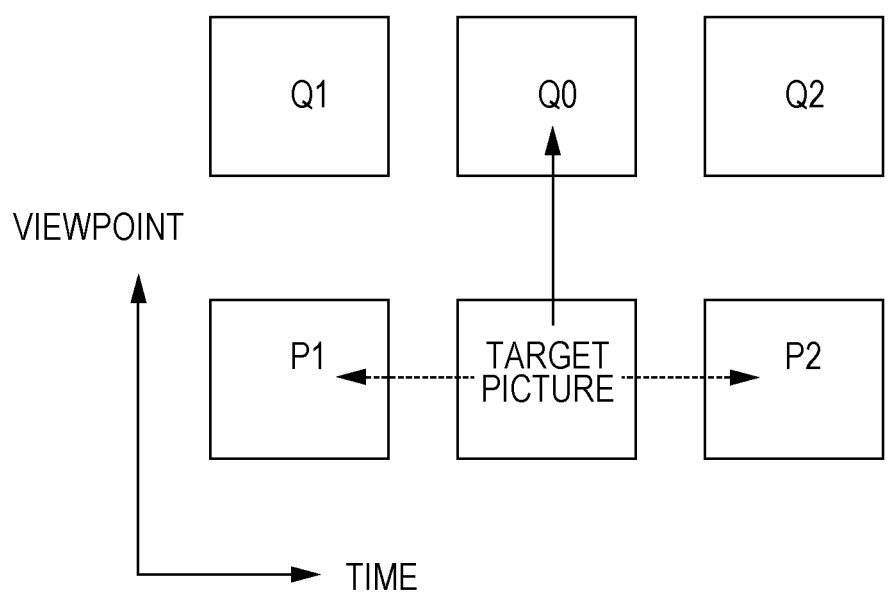
FIG. 4 is a concept view illustrating an example of reference pictures.

Next, an example of reference pictures used when a vector is derived will be described. FIG. 4 is a concept view illustrating the example of reference pictures. A horizontal axis indicates a display time and a vertical axis indicates a viewpoint in FIG. 4. Each of the rectangles in two rows in a vertical direction and three columns in a horizontal direction (six in total), which are illustrated in FIG. 4, indicates a picture. Among the six rectangles, the rectangles in the second column from left of the lower row indicates a picture to be decoded (target picture), and the remaining five rectangles each indicates a reference picture. The reference picture Q0 which is indicated with an upward arrow from the target picture is a picture that has the same display time and a different viewpoint as and from those of the target picture. The reference picture Q0 is used in disparity prediction with the target picture as a reference. The reference picture P1 indicated with a leftward arrow from the target picture is a past picture that has the same viewpoint as that of the target picture. The reference picture P2 indicated with a rightward arrow from the target picture is a future picture that has the same viewpoint as that of the target picture. The reference picture P1 or P2 is used in motion prediction with the target picture as a reference.

(Inter Prediction Flag and Prediction List Utilization Flag)

A relation between the inter prediction flag and the prediction list utilization flags predFlagL0 and predFlagL1 is able to be changed mutually as follows. Thus, the prediction list utilization flag may be used or the inter prediction flag may be used as the inter prediction parameter. Further, decision using the prediction list utilization flag may be allowed when the inter prediction flag is used instead. To the contrary, decision using the inter prediction flag may be allowed when the prediction list utilization flag is used instead.

Inter prediction flag=(predFlagL1«1)+predFlagL0
predFlagL0=inter prediction flag & 1
predFlagL1=inter prediction flag »1

Here, » indicates right-shifting and « indicates left-shifting.

(Merge Prediction and AMVP Prediction)

As a method for decoding (coding) a prediction parameter, there are a merge prediction mode and an AMVP (Adaptive Motion Vector Prediction) mode, and a merge flag merge_flag is a flag for identifying them. In both of the merge prediction mode and the AMVP mode, a prediction parameter of a target PU is derived by using a prediction parameter of a block that has been already processed. The merge prediction mode is a mode in which the prediction parameter that has been already derived is used directly without including a prediction list utilization flag predFlagLX (inter prediction flag inter_pred_idcinter_pred_idc), a reference picture index refIdxLX, or a vector mvLX in coding data, and the AMVP mode is a mode in which the inter prediction flag inter_pred_idcinter_pred_idc, the reference picture index refIdxLX, and the vector mvLX are included in the coding data. Note that, the vector mvLX is coded as a prediction vector index mvp_LX_idx indicating a prediction vector and a difference vector (mvdLX).

The inter prediction flag inter_pred_idc is data indicating a type and the number of reference pictures, and takes any value of Pred_L0, Pred_L1, and Pred_Bi. Pred_L0 and Pred_L1 indicate that a reference picture that is stored in reference picture lists called an L0 list and an L1 list, respectively, are used, and indicate that one reference picture is commonly used (uni-prediction). Prediction using the L0 list and the L1 list are respectively called L0 prediction and L1 prediction. Pred_Bi indicates using two reference pictures (bi-prediction), and indicates using two reference pictures stored in the L0 list and the L1 list. The prediction vector index mvp_LX_idx is an index indicating a prediction vector and the reference picture index refIdxLX is an index indicating reference pictures stored in the reference picture lists. Note that, LX is a description method used when the L0 prediction and the L1 prediction are not distinguished, and parameters for the L0 list and parameters for the L1 list are distinguished by replacing LX with L0 or L1. For example, refIdxL0 is a reference picture index used for the L0 prediction, refIdxL1 is a reference picture index used for the L1 prediction, and refIdx (refIdxLX) is an expression when refIdxL0 and refIdxL1 are not distinguished.

The merge index merge_idx is an index indicating which prediction parameter is to be used as a prediction parameter for a decoding target block among prediction parameter candidates (merge candidates) derived from the block for which processing has been completed.

(Motion Vector and Disparity Vector)

As the vector mvLX, there are a motion vector and a disparity vector (disparity vector). The motion vector is a vector indicating a positional shift between a position of a block in a picture of a certain layer at a certain display time and a position of a corresponding block in the picture of the same layer at a different display time (for example, an adjacent discontinuous time). The disparity vector is a vector indicating a positional shift between a position of a block in a picture of a certain layer at a certain display time and a position of a corresponding block in a picture of a different layer at the same display time. A picture of a different layer is, for example, a picture of a different viewpoint or a picture having a different resolution. In particular, a disparity vector corresponding to a picture of a different viewpoint is called a disparity vector. In the following description, it is simply called a vector mvLX when the motion vector and the disparity vector are not distinguished. A prediction vector and a difference vector, which are associated with the vector mvLX, are respectively called a prediction vector mvpLX and a difference vector mvdLX. Whether the vector mvLX and the difference vector mvdLX are motion vectors or disparity vectors are determined by using a reference picture index refIdxLX associated with the vectors.

(Configuration of Image Decoding Device)

Next, a configuration of the image decoding device 31 according to the present embodiment will be described. FIG. 5 is a schematic view illustrating the configuration of the image decoding device 31 according to the present embodiment. The image decoding device 31 is composed by including an entropy decoding unit 301, a prediction parameter decoding unit 302, the reference picture memory (reference image storage unit, frame memory) 306, a prediction parameter memory (prediction parameter storage unit, frame memory) 307, a prediction image generation unit 308, an inverse quantization/inverse DCT unit 311, an addition unit 312, and residual storage unit 313 (residual recording unit).

The prediction parameter decoding unit 302 is composed by including an inter prediction parameter decoding unit 303 and an intra prediction parameter decoding unit 304. The prediction image generation unit 308 is composed by including an inter-prediction image generation unit 309 and an intra-prediction image generation unit 310.

The entropy decoding unit 301 performs entropy decoding for the coded stream Te input from outside, and separates and decodes individual codes (syntax elements). Examples of the separated codes include prediction information for generating a prediction image and residual information for generating a difference image.

The entropy decoding unit 301 outputs a part of the separated codes to the prediction parameter decoding unit 302. Examples of the part of the separated codes include a prediction mode PredMode, a partition mode part_mode, a merge flag merge_flag, a merge index merge_idx, an inter prediction flag inter_pred_idcinter_pred_idc, a reference picture index refIdxLX, a prediction vector index mvp_LX_idx, and a difference vector mvdLX. Control as to which code to be decoded or not is performed based on an instruction of the prediction parameter decoding unit 302. The entropy decoding unit 301 outputs a quantization coefficient to the inverse quantization/inverse DCT unit 311. The quantization coefficient is a coefficient which is obtained by performing DCT (Discrete Cosine Transform) for a residual signal for quantization in coding processing.

The inter prediction parameter decoding unit 303 decodes an inter prediction parameter by referring to the prediction parameters stored in the prediction parameter memory 307, based on the codes input, from the entropy decoding unit 301.

The inter prediction parameter decoding unit 303 outputs the decoded inter prediction parameter to the prediction image generation unit 308 and stores it in the prediction parameter memory 307. The inter prediction parameter decoding unit 303 will be described in detail below.

The intra prediction parameter decoding unit 304 decodes an intra prediction parameter by referring to the prediction parameters stored in the prediction parameter memory 307, based on the codes input from, the entropy decoding unit 301. The intra prediction parameter is a parameter which is used for processing of predicting a picture block in one picture, for example, an intra prediction mode IntraPredMode. The intra prediction parameter decoding unit 304 outputs the decoded intra prediction parameter to the prediction image generation unit 308 and stores it in the prediction, parameter memory 307.

The intra prediction parameter decoding unit 304 may derive different intra prediction modes between luminance and chroma. In this case, the intra prediction parameter decoding unit 304 decodes a luminance prediction mode IntraPredModeY as a prediction parameter of luminance and a chroma prediction mode IntraPredModeC as a prediction parameter of chroma. The luminance prediction mode IntraPredModeY has 35 modes, and planar prediction (0), DC prediction (1), and directional prediction (2 to 34) correspond thereto. The chroma prediction mode IntraPredModeC uses any of planar prediction (0), DC prediction (1), directional prediction (2, 3, 4), and LM mode (5).

The reference picture memory 306 stores blocks of a reference picture (reference picture blocks) generated by the addition unit 312 at predefined positions for each picture and block which are to be decoded.

The prediction parameter memory 307 stores prediction parameters at predefined positions for each picture and block which are to be decoded. Specifically, the prediction parameter memory 307 stores the inter prediction parameter decoded by the inter prediction parameter decoding unit 303, the intra prediction parameter decoded by the intra prediction parameter decoding unit 304, and the prediction mode predMode separated by the entropy decoding unit 301. Examples of the inter prediction parameter to be stored include a prediction list utilization flag predFlagLX (inter prediction flag inter_pred_idcinter_pred_idc), a reference picture index refIdxLX, and a vector mvLX.

To the prediction image generation unit 308, a prediction mode predMode input from the entropy decoding unit 301 is input and a prediction parameter is input from the prediction parameter decoding unit 302. Moreover, the prediction image generation unit 308 reads a reference picture from the reference picture memory 306. The prediction image generation unit 308 generates a prediction picture block P (prediction image) by using the input prediction parameter and the read reference picture, with a prediction mode indicated by the prediction mode predMode.

Here, when the prediction mode predMode indicates the inter prediction mode, the inter-prediction image generation unit 309 uses the inter prediction parameter input from, the inter prediction parameter decoding unit 303 and the read reference picture to generate a prediction picture block P by inter prediction. The prediction picture block P corresponds to a prediction unit PU. The PU corresponds to a part of a picture formed of a plurality of pixels, which is to be a unit for performing prediction processing as described above, that is, decoding target blocks for performing prediction processing at one time.

The inter-prediction image generation unit 309 reads, from the reference picture memory 306, a reference picture block at a position indicated by the vector mvLX with a decoding target block as a reference from the reference picture indicated by the reference picture index refIdxLX, for the reference picture list having the prediction list utilization flag predFlagLX of 1 (L0 list or L1 list). The inter-prediction image generation unit 309 performs prediction for the reference picture block which is read and generates the prediction picture block P. The inter-prediction image generation unit 309 outputs the prediction picture block P, which is generated, to the addition unit 312.

When the prediction mode predMode indicates the intra prediction mode, the intra-prediction image generation unit 310 performs intra prediction by using the intra prediction parameter input from the intra prediction parameter decoding unit 304 and the read reference picture. Specifically, the intra-prediction image generation unit 310 reads, from, the reference picture memory 306, a reference picture block, which is a picture to be decoded and which is in a predefined range from a decoding target block among blocks which have been already decoded. When the decoding target block sequentially moves in order of so-called raster scan, the predefined range is, for example, any of left, upper-left, upper, and upper-right adjacent blocks, and varies depending on the intra prediction mode. The order of raster scan is the order in which the decoding target block sequentially moves from a left end to a right end for respective rows from an upper end to a lower end in each picture.

The intra-prediction image generation unit 310 performs prediction for the read reference picture block with a prediction mode indicated by the intra prediction mode IntraPredMode and generates a prediction picture block. The intra-prediction image generation unit 310 outputs the prediction picture block P, which is generated, to the addition unit 312.

When different intra prediction modes between luminance and chroma are derived in the intra prediction parameter decoding unit 304, the intra-prediction image generation unit 310 generates a prediction picture block of luminance with any of the planar prediction (0), the DC prediction (1), and the directional prediction (2 to 34), according to the luminance prediction mode IntraPredModeY, and generates a prediction picture block of chroma with any of the planar prediction (0), the DC prediction (1), the directional prediction (2, 3, 4), and the LM mode (5), according to the chroma prediction mode IntraPredModeC. In the LM mode, by using a processed image adjacent to a target block, a prediction parameter for predicting a pixel value of chroma is derived from a pixel value of luminance, and a picture block of chroma is generated from a processed block of luminance based on the prediction parameter. Such prediction is called LM prediction. The intra-prediction image generation unit 310 is composed of a DC prediction unit 3101, a planar prediction unit 3102, a directional prediction unit 3103, and an LM prediction unit 3104, which are not illustrated.

(LM Prediction Unit 3104)

Figure 15:
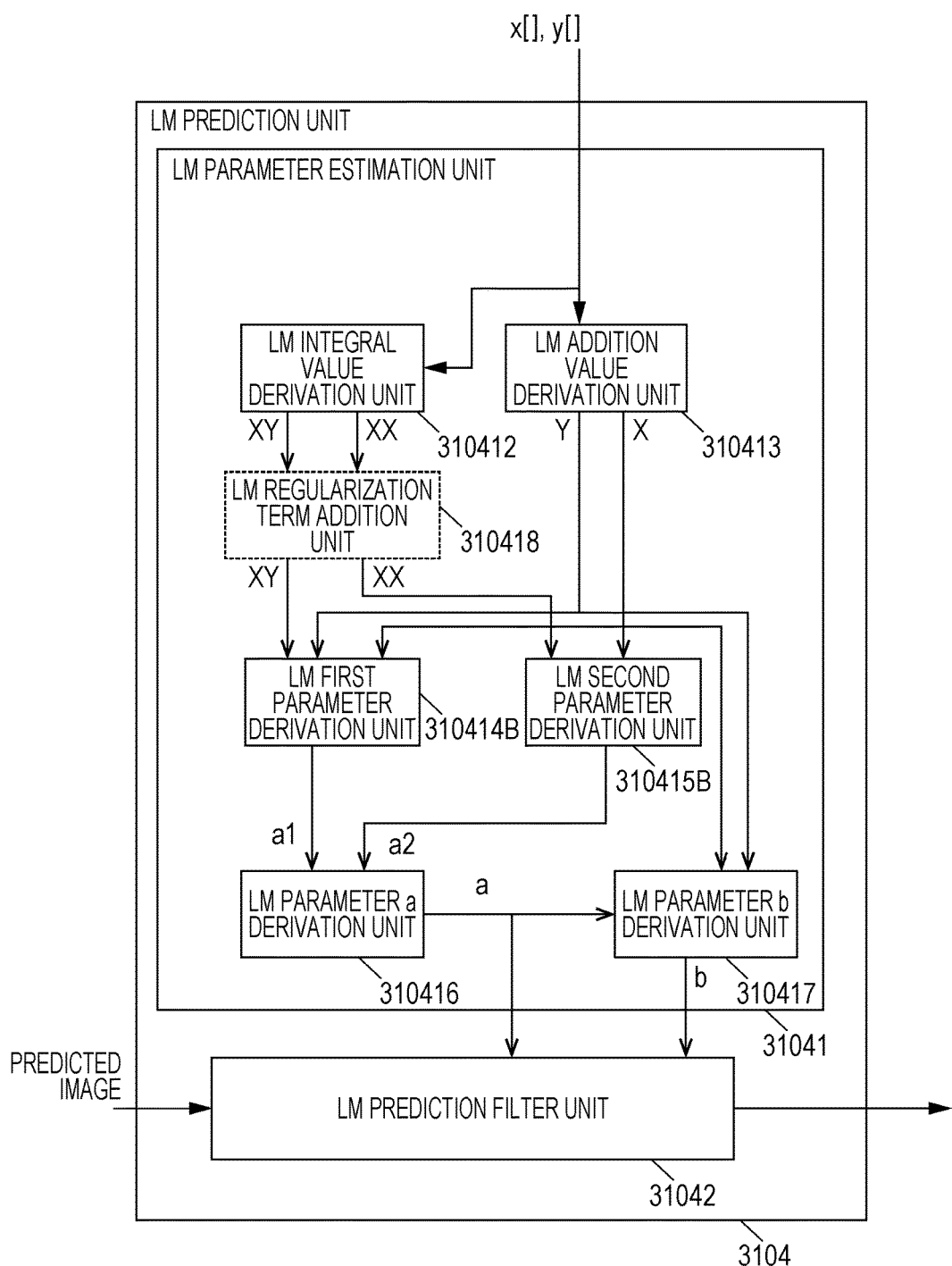
FIG. 15 is a block diagram illustrating a configuration of an LM prediction unit 3104 according to the present embodiment.

FIG. 15 is a block diagram illustrating a configuration of the LM prediction unit 3104. The LM prediction unit 3104 is composed of an LM parameter estimation unit 31041, and an LM prediction filter unit 31042. The LM parameter estimation unit 31041 is composed of an LM integral value derivation unit 310412, an LM addition value derivation unit 310413, an LM first parameter derivation unit 310414, an LM second parameter derivation unit 310415, an LM parameter a derivation unit 310416, and an LM parameter b derivation unit 310417.

Figure 10:
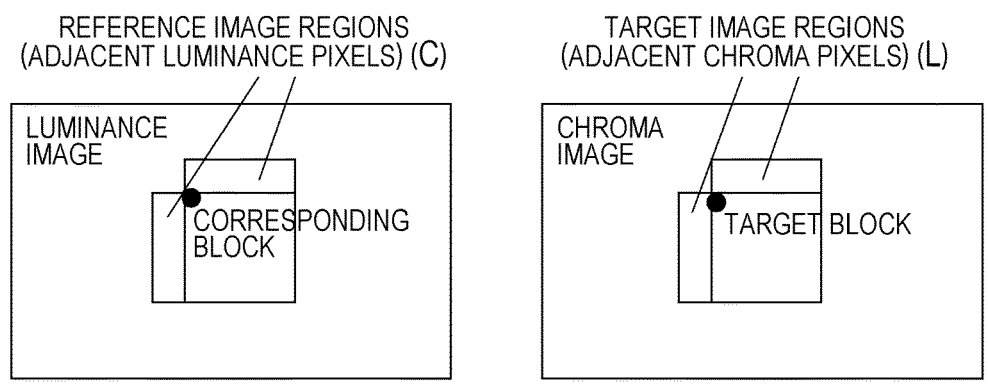
FIG. 10 is a concept view of LM prediction according to the present embodiment.
Figure 13:
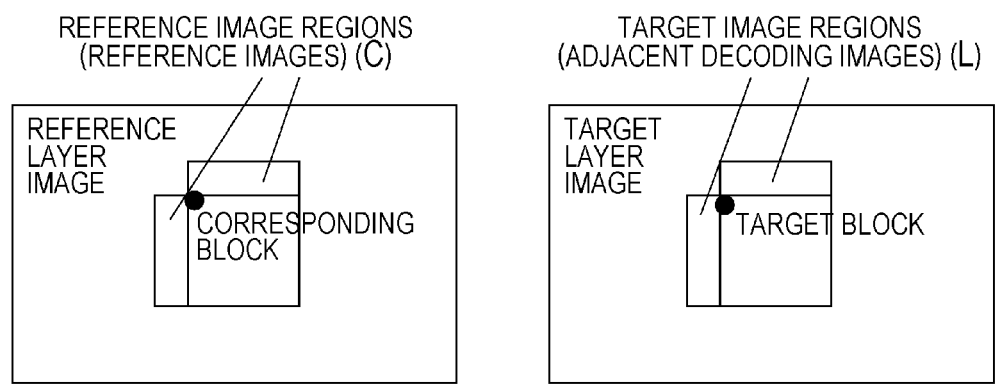
FIG. 13 is a concept view of illumination compensation according to the present embodiment.

The LM parameter estimation unit 31041 obtains an estimation parameter for estimating a pixel of a target block (target prediction unit) from pixels of reference blocks. FIG. 10 is a diagram for explaining LM prediction. FIG. 13 indicates positions of pixels L in a chroma image neighboring a target block and pixels C neighboring a reference block (corresponding block) in a luminance image corresponding to the target block.

The LM parameter estimation unit 31041 sets the pixels C neighboring a luminance block, which corresponds to neighbor of the target block illustrated in FIG. 10, and the pixels L of a chroma component neighboring the target block as pixel values x[ ] of adjacent luminance images (reference image regions) and pixel values y[ ] of adjacent chroma images, respectively, and based on the pixel values x[ ] of the adjacent luminance images and the pixel values y[ ] of the adjacent chroma images, derives a parameter a and a parameter b which are parameters when the pixel values y[ ] of the adjacent chroma images are linearly prediction from the pixel values x of the adjacent luminance images.

The LM addition value derivation unit 310413 derives a sum Y of the pixel values y of the adjacent chroma images and a sum X of the pixel values x of the adjacent luminance images with a formula (B-2) and a formula (B-3) as follows.

The LM integral value derivation unit 310412 derives a sum XY of products of the pixel values y of the adjacent chroma images and the pixel values x of the adjacent luminance images, and a sum XX of squares of the pixel values of the adjacent luminance images with following formulas (B-4) to (B-5). At this time, the LM integral value derivation unit 310412 performs addition after right-shifting by an integration shift value precShift at the time of deriving the sum XY of the products of the pixel values y of the adjacent chroma images and the pixel values x of the adjacent luminance images and at the time of deriving the sum XX of the squares of the pixel values x of the adjacent luminance images. Before addition as follows, X, Y, XY and XX are initialized to 0.

$$X = \Sigma x[i] \quad \text{formula (B-2)}$$

$$Y = \Sigma y[i] \quad \text{formula (B-3)}$$

$$XX\mathrel{+}= \Sigma(x[i] * x[i]) \quad \text{formula (B-4)}$$

$$XY\mathrel{+}= \Sigma(y[i] * y[i]) \quad \text{formula (B-5)}$$

Here, $\Sigma$ is a sum with respect to a reference region, by which a sum with respect to an index i for designating a pixel of the reference region is derived. y[i] is a pixel value in an index i of the adjacent decoding images, x[i] is a pixel value in the index i of the reference images. A count shift value iCountShift is a log of 2 for a size of the reference region. Here, the pixel values y of the adjacent chroma images and the pixel values x of the adjacent luminance images are referred to after doubling the index i.

$$i\text{CountShift} = \log 2 \text{ (pixel number of reference region)} \quad \text{formula (B-6)}$$

The LM first parameter derivation unit 310414 derives a first parameter a1 with a following formula by a difference between the sum XY of products of the pixel values y of the adjacent chroma images and the pixel values x of the adjacent luminance images and a product of the sum Y of the pixel values of the adjacent chroma images and the sum X of the pixel values of the adjacent luminance images.

$$a1 = (XY \ll i\text{CountShift}) - (Y * X); \quad \text{formula (B-7)}$$

As indicated with the formula (B-7), XY is left-shifted by the count shift value iCountShift and the product of Y and X is right-shifted by the integration shift value precShift, and then, a difference therebetween is calculated.

The LM second parameter derivation unit 310415 derives a second parameter a2 with a following formula by a difference between the sum XX of the squares of the pixel values of the adjacent luminance images and a square of the sum X of the pixel values of the adjacent luminance images.

$$a2 = (XX \ll i\text{CountShift}) - (X * X); \quad \text{formula (B-8)}$$

The first parameter a1 and the second parameter a2, which are derived, are output to the LM parameter a derivation unit 310416.

Figure 16:
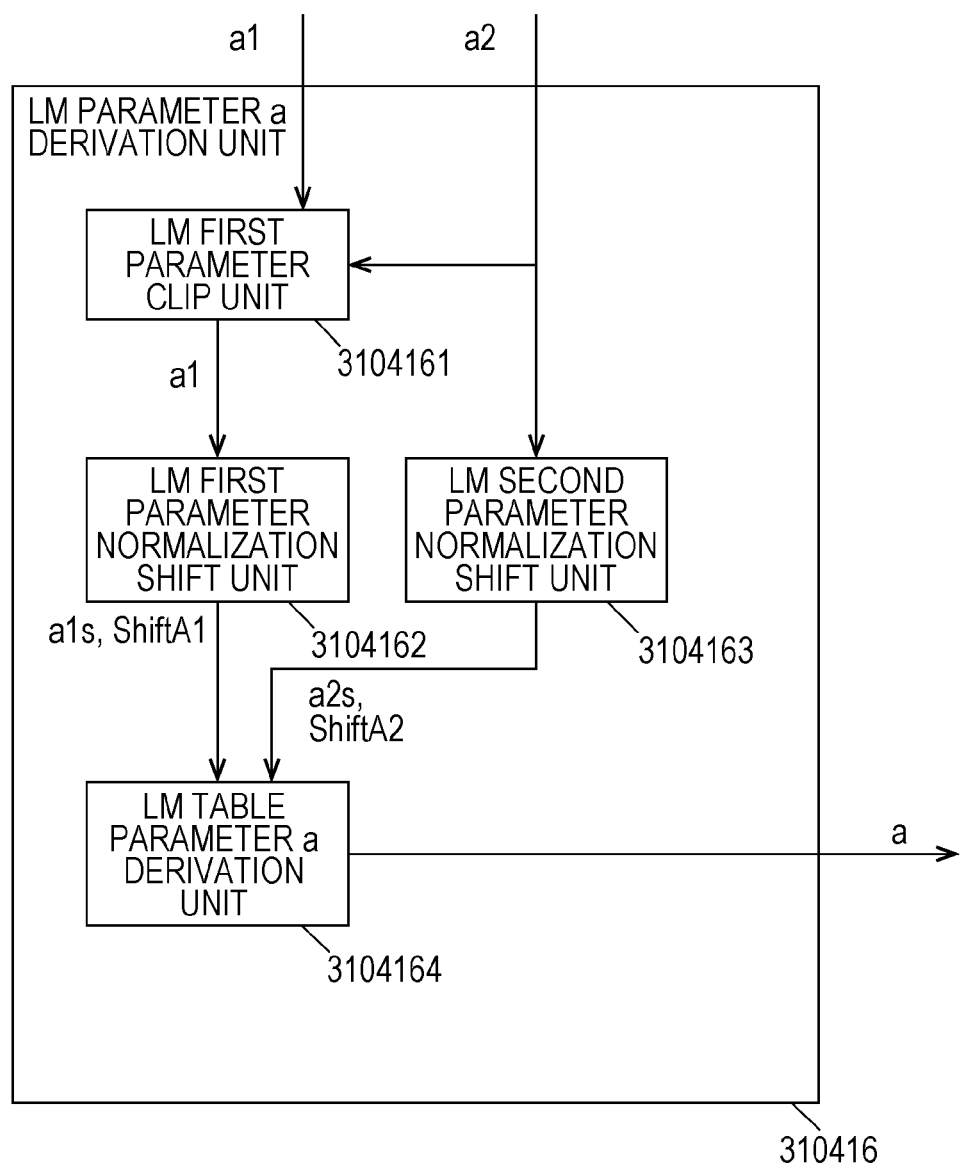
FIG. 16 is a block diagram illustrating a configuration of an LM parameter a derivation unit 310416 according to the present embodiment.

FIG. 16 is a block diagram illustrating a configuration of the LM parameter a derivation unit 310416. The LM parameter a derivation unit 310416 is composed of an LM first parameter clip unit 3104161, an LM first parameter normalization shift unit 3104162, an LM second parameter normalization shift unit 3104163, and a table base LM parameter a derivation unit 3104164.

The LM parameter a derivation unit 310416 derives a parameter a corresponding to inclination in linear prediction for illumination compensation. Specifically, the parameter a corresponding to a1/a2≪iShift which is a value obtained by left-shifting a ratio of the first parameter a1 to the second parameter a2 by a fixed shift value for obtaining an integer is derived with following processing by using integer arithmetic operation.

The LM first parameter clip unit 3104161 limits the first parameter a1 according to magnitude of the second parameter a2. For example, like a following formula, a1 is clipped to be almost equal to or more than $-2*a2$ and equal to or less than $127/64 (=127 \gg 6)$ times of a2.

$$a1 = \text{Clip3}(-2*a2, (127*a2) \gg 6, a1) \quad \text{formula (B-12')}$$

Since a value of a1 is clipped according to a value of a2 by the LM first parameter clip unit 3104161, a value of a1/a2 which is a ratio thereof is also clipped to be between −2 and 127/64. Accordingly, a value of a1/a2≪iShift which is a value of the parameter a is also clipped to be from −2≪iShift to (127/64)≪iShift. That is, when iShift=6, the parameter a becomes −128 to 127 and is able to be treated in a range of an 8-bit integer.

With the table base LM parameter a derivation unit 3104164, the LM parameter a derivation unit 310416 derives arithmetic operation of a1/a2 ≪iShift with a following formula by using an inverse table value invTable[ ] indicated in FIG. 14.

$$a1 * \text{invTable}[a2] \gg \log 2(M) \quad \text{formula (A-0)}$$

Here, M is a constant derived by 2 raised to the power of ShiftA1. ShiftA1 is called a table shift value. As indicated in the formula (A-0), by using an inverse table invTable[ ], arithmetic operation corresponding to division by a2 is able to be realized by a product of an inverse table invTable[a2] corresponding to an inverse of a2 and a right-shifting of log2 (M).

FIG. 14 indicates the inverse table value invTable[ ] used in the present embodiment. An inverse invTable[x] indicated in FIG. 14 is 0 when an index x is 0, and is derived from a value obtained by dividing a predetermined constant (2 raised to the power of ShiftA1) by x for obtaining an integer, when the index x is other than 0. That is, $$\text{invTable}[x]=0 \text{ (when } x \text{ is 0)} \quad \text{formula (T-1)}$$

$$\text{invTable}[x]=\text{Floor}((2^{\text{ShiftA1}}/x/2)/x) \text{ (when } x \text{ is other than 0)} \quad \text{formula (T-2)}.$$

Here, the aforementioned table is defined in a range where x is [0 . . 2^ShiftA2-1]. In the example of FIG. 14, it is defined in a range of ShiftA2=6, that is, 0 . . 63. Note that, Floor(x) is a function for rounding down to an integer. A following formula (T-2') may be used instead of the formula (T-1). That is, rounding adjustment for adding ½time of a divisor x may not be performed.

$$\text{invTable}[x]=\text{Floor}(M/x) \text{ (when } x \text{ is other than 0)} \quad \text{formula (T-2')}$$

Here, the inverse table invTable[x] is defined so that invTable[x] is 0 when x=0, In division of 1/x, normally, a case of x=0 is not defined, so that processing needs to be performed by branching according to whether or not x=0, but by the definition as described above, when 1/x is calculated with 1*invTable[x], processing is able to be performed without branching according to whether or not x=0. The result of the division when x=0 is 0.

Here, since a value of the inverse table invTable is 0 to 2 raised to the power of ShiftA2-1, that is, x defines invTable[x] in a range of [0, 2 raised to the power of ShiftA2-1], a value of a2 needs to be equal to or less than 2raised to the power of ShiftA2-1 in order to calculate the formula (A-0). Thus, the second parameter a2 is right-shifted by a second normalization shift value iScaleShiftA2 to derive a normalization second parameter a2s which falls within a range of [0 . . 2 raised to the power of ShiftA2-1], and the inverse table invTable is subtracted by using the normalization second parameter a2s. Further, in order to calculate a product of a1*invTable[a2] of the formula (A-0) in a range of 32 bits, the first parameter a1 is right-shifted by a first normalization shift value iScaleShiftA1 so that the value of a1 does not become too large, and a normalization first parameter a1s is derived. Next, a product of the normalization first parameter a1s and the inverse table invTable is calculated. Here, it is set that the product of the normalization first parameter a1s and the inverse table invTable does not exceed 32 bits. Specifically, the LM parameter a derivation unit 310416 derives the parameter a by using a value obtained by calculation of a following formula (A-1) instead of the formula (A-0);

$$a1s*\text{invTable}[a2s] \gg \log 2(M) \quad \text{formula (A-1)}.$$

According to magnitude of the second parameter a2, the LM second parameter normalization shift unit 3104163 derives the second normalization shift value iScaleShiftA2 with a following formula with respect to a predetermined bit width ShiftA2 used for the derivation of the table in FIG. 14. The second normalization shift value iScaleShiftA2, which is derived, is output to the table base LM parameter a derivation unit 3104164.

$$i\text{ScaleShiftA2}=\text{Max}(0, \text{Floor}(\log 2(\text{Abs}(a2)))-(\text{ShiftA2}-1)) \quad \text{formula (B-14)}$$

Here, Floor(Log 2(Abs(x))) is able to be obtained by Floor(Log 2(Abs(x)))=32−NLZ(x)−1 by using the Number of Leading Zero (NLZ), which is the number of successive zeros as viewed from a left side of a bit sequence, Leftmost bit, when a2 is stored in a 32-bit register. Note that, when a 64-bit register is used, it is able to be derived by 64−NLZ(x)−1.

Note that, it is preferable that the number is small in the derivation of the NLZ because relatively complicated calculation is required.

The LM first parameter normalization shift unit 3104162 derives the first normalization shift value iScaleShiftA1 with a following formula according to the second normalization shift value iScaleShiftA2. The first normalization shift value iScaleShiftA1, which is derived, is output to the table base LM parameter a derivation unit 3104164.

$$i\text{ScaleShiftA1}=\text{Max}(0, i\text{ScaleShiftA2}-\text{offsetA1}) \quad \text{formula (B-13)}$$

Note that, offsetA1 here is a constant which satisfies to be equal to or less than 14.

In the above, the second normalization shift value is derived by subtracting the predetermined constant offsetA1 from the second normalization shift value. Here, both of the first normalization shift value and the second normalization shift value are clipped to be equal to or more than 0 in the formula (B-14) and the formula (B-13). Though the first normalization shift value is derived by clipping the second normalization shift to be equal to or more than 0 and then subtracting the predetermined constant offsetA1 therefrom and clipping the resultant to be equal to or more than 0 in the above, the first normalization shift value may be derived by subtracting the predetermined constant offsetA1 before clipping the second normalization shift to be equal to or more than 0, and clipping the resultant to be equal to or more than 0.

Since the first normalization shift value is derived by using the second normalization shift value in the above, an effect is achieved that the processing for deriving the first normalization parameter becomes easy. That, is, it is possible to prevent the first normalization parameter from being obtained, for example, with a following formula (B-13') which has a relatively large arithmetic amount.

$$i\text{ScaleShiftA1}=\text{Max}(0, \text{Floor}(\log 2(Abs(a1)))-(31-\text{ShiftA1}-1) \quad \text{formula (B-13')}$$

The LM first parameter normalization shift unit 3104162 and the LM second parameter normalization shift unit 3104163 derive a normalization first parameter a1s and a normalization second parameter a2s by right-shifting the first parameter a1 and the second parameter a2 by the first normalization shift value iScaleShiftA1 and the second normalization shift value iScaleShiftA2, respectively.

$$a1s=a1 \gg i\text{ScaleShiftA1} \quad \text{formula (B-15)}$$

$$a2s=a2 \gg i\text{ScaleShiftA2} \quad \text{formula (B-16)}$$

Thereby, the normalization first parameter a1s and the normalization second, parameter a2s are normalized to values from 0 to 2 raised to the power of ShiftA1-1 and from 0 to 2raised to the power of ShiftA2-1, respectively.

The table base LM parameter a derivation unit 3104164 derives a parameter a shift value iScaleShiftA with a following formula based on a difference between the first normalization shift value iScaleShiftA1 and the second normalization shift value iScaleShiftA2.

$$\text{ScaleShiftA}=\text{ShiftA1}+i\text{ScaleShiftA2}-i\text{ScaleShiftA1}-i\text{Shift} \quad \text{formula (B-18)}$$

Here, since iScaleShiftA1=Max (0, iScaleShiftA2−offsetA1), following formulas are obtained.

$$\text{ScaleShiftA} \ll = \text{ShiftA1} + i\text{ScaleShiftA2} - (i\text{ScaleShiftA2} - \text{offsetA1}) - i\text{Shift}$$

$$\text{ScaleShiftA} \ll = \text{ShiftA1} + \text{offsetA1} - i\text{Shift}$$

Since offsetA1 is equal to or more than 0, a fixed shift value iShift is 5 to 8 bits, and ShiftA1 is 14 to 15 bits, ScaleShiftA is always equal to or more than 0. When ScaleShiftA is less than 0, it is required that branching is performed according to whether ScaleShiftA is equal to or more than 0, or less than 0, and when ScaleShiftA is equal to or more than 0, right-shifting is performed by a value of ScaleShiftA, and when ScaleShiftA is less than 0, left-shifting is performed by an absolute value of ScaleShiftA (=−ScaleShiftA), which is not required in the aforementioned configuration.

That is, in the above, since the first normalization shift value is derived by subtracting the predetermined constant from the second normalization shift value, ScaleShiftA, which is used when shifting is performed after multiplication by the inverse table, is always equal to or more than 0. Thus, branching according to whether ScaleShiftA is equal to or more than 0 becomes unnecessary and the parameter a is able to be always derived by right-shifting, so that an effect of reducing an amount of calculation is achieved.

By referring to the inverse table value invTable which is defined according to the normalization second parameter a2s, the table base LM parameter a derivation unit 3104164 calculates a product of the inverse table value invTable and the normalization first parameter a1s and right-shifts the product by a table shift value (ScaleShiftA) to thereby derive a parameter a with a following formula.

$$a = (a1s * \text{invtable}[a2s]) \gg (\text{ScaleShiftA}) \quad \text{formula (B-19)}$$

A value of the parameter a is a ratio of the first parameter a1 to the second parameter a2 (corresponding to a value obtained by left-shifting a1/a2 by the fixed shift value iShift).

The derived parameter a is output to the LM parameter b derivation unit 310417 and the LM prediction filter unit 31042.

The LM parameter b derivation unit 310417 derives a parameter b with a following formula by dividing a value obtained by subtracting a value, which is obtained by multiplying the sum X of the pixel values of the adjacent luminance images by the parameter a to perform right-shifting by the fixed shift value iShift, from the sum Y of the pixel values of the adjacent chroma, images, by the pixel number of the reference region.

$$b = (Y - ((a*X) \gg i\text{Shift}) + (1 \ll (i\text{CountShift} - 1))) \gg i\text{CountShift} \quad \text{formula (B-20)}$$

Here, the right-shifting of iCountShift corresponds to division by the pixel number of the reference region.

The LM prediction filter unit 31042 uses the estimation parameter derived by the LM parameter estimation unit 31041 to derive a prediction image predSamples'[ ] after LM prediction from a prediction image predSamples[ ] before the LM prediction. For example, when deriving the parameter b with the formula (B-20), a following formula is used.

$$\text{predSamples}'[x][y] = (a * \text{predSamples}[x][y] \gg i\text{Shift}) + b \quad \text{formula (B-21)}$$

Note that, an LM parameter b derivation unit 310417' having a configuration different from that of the LM parameter b derivation unit 310417 may be used instead of the LM parameter b derivation unit 310417. In this case, the parameter b may be derived with a following formula by dividing a value obtained by subtracting a value, which is obtained by multiplying the sum X of the pixel values of the adjacent luminance images by the parameter a, from a value obtained by left-shifting the sum Y of the pixel values of the adjacent chroma images by the fixed shift value iShift, by the number of reference pixels.

$$b = ((Y \ll i\text{Shift}) - ((a*X)) + ((1 \ll (i\text{CountShift} - 1)))) \gg i\text{CountShift} \quad \text{formula (B-20')}$$

Note that, when a bit depth of a pixel is 8 bits, a range of the pixel values x is a range of an 8-bit nonnegative variable, and a range of the parameter a is also a range of an 8-bit nonnegative variable, thus arithmetic operation is possible by performing arithmetic operation of ones both of which are the 8-bit nonnegative variables serving as a minimum bit number in software (unsigned char in C language). For example, in an STMD arithmetic operation using a 128-bit register, arithmetic operation of the 8-bit nonnegative variable is able to be performed by storing 16 pieces simultaneously in the register. That is, 16 pixels are able to be processed simultaneously, thus achieving an effect of increasing a speed.

When the LM parameter b derivation unit 310417' having a configuration different from that of the LM parameter b derivation unit 310417 is used instead of the LM parameter b derivation unit 310417, an LM prediction filter unit 31042' having a configuration different from that of the LM prediction filter unit 31042 is used instead of the LM prediction filter unit 31042. The LM prediction filter unit 31042' derives a prediction image predSamples'[ ] after LM prediction with a following formula from a prediction image predSamples[ ] before the LM prediction.

$$\text{predSamples}'[x][y] = (a * \text{predSamples}[x][y] + b \gg i\text{Shift}) \quad \text{formula (B-21')}$$

(Modified Example of LM Prediction Unit 3104)

Figure 17:
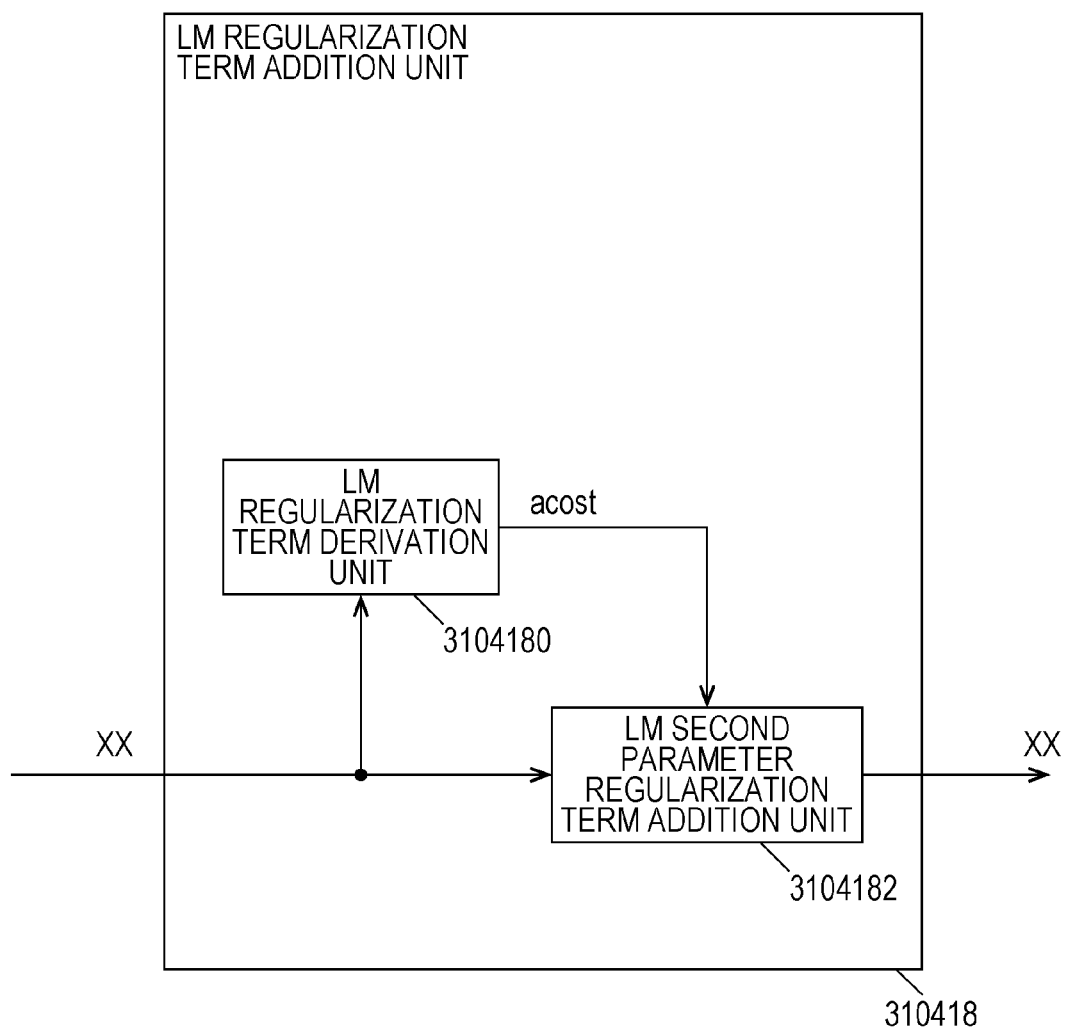
FIG. 17 is a block diagram illustrating a configuration of an LM regularization term addition unit 310418 according to the present embodiment.

Note that, the LM prediction unit 3104 may further include an LM regularization term addition unit 310418. FIG. 17 is a block diagram, illustrating a configuration of the LM regularization term addition unit 310418. The LM regularization term, addition unit 310418 is composed of a regularization term derivation unit 3104180 and an LM second parameter regularization term addition unit 3104182. A regularization term is a term which is added as a parameter cost to an objective function in derivation of a prediction parameter by a least mean square method.

The regularization term derivation unit 3104180 derives a regularization term acost.

$$a\text{cost} = XX \gg a\text{shift} \quad \text{formula (E-1)}$$

Here, ashift is a fixed value for adjusting a value of the regularization term.

The LM second parameter regularization term addition unit 3104182 adds the regularization term to a parameter (for example, XX) used for deriving the second parameter.

$$XX = XX + a\text{cost} \quad \text{formula (E-3)}$$

By adding the regularization term to the second parameter serving as a denominator when deriving the parameter a, the parameter a becomes close to 0. When a correlation between the pixel values y of the adjacent chroma, images and the pixel values x of the adjacent luminance images is low, an influence of the regularization term becomes great, and when the correlation is high, the influence of the regularization term becomes small. When the parameter a which corresponds to inclination of linear prediction is 0, there is only the parameter b which corresponds to an offset component of the linear prediction. Since an estimation value of the offset component is robust compared to an estimation value of an inclination component, when there is only the offset component in a case of the low correlation, accuracy for the estimation is improved as a whole.

Note that, the addition of the regularization term may be performed by the LM second parameter derivation unit 310415. In this case, the second parameter is derived with a following formula instead of the formula (B-8).

$$a2=((XX+acost)\text{«}i\text{CountShift})-(X*X); \quad \text{formula (E-3')}$$

In the configuration of the LM parameter estimation unit 31041, the regularization term acost is added when the second parameter a2, which is derived from, the difference between the sum XX of the squares of the pixel values of the adjacent luminance images and the square of the sum X of the pixel values of the adjacent luminance images, is derived. Since the parameter to be estimated becomes robust by the regularization term, an effect of improving the effect of LM prediction is achieved.

(Another Modified Example of LM Prediction Unit 3104)

Note that, the LM prediction unit 3104 may include an LM regularization term addition unit 310418R which is different from the LM regularization term addition unit 310418. As a modified example of the LM parameter estimation unit 31041, an LM parameter estimation unit 31041R which uses regularization terms as follows may be used. The LM parameter estimation unit 31041R includes an LM first parameter derivation unit 310414R, an LM second parameter derivation unit 310415R, and an LM regularization term derivation unit 3104180R.

The LM regularization term derivation unit 3104180R derives regularization terms acostX and acostY.

$$acostX=X\text{«}ashiftX \quad \text{formula (E-1X)}$$

$$acostY=Y\text{«}ashiftY \quad \text{formula (E-1Y)}$$

Here, ashiftX and ashiftY are values for adjusting values of the regularization terms.

The LM first parameter derivation unit 310414R and the LM second parameter derivation unit 310415R derive the first parameter and the second parameter as follows by using the regularization terms derived by the LM regularization term derivation unit 3104180R.

$$a1=((XY+acostY)\text{«}i\text{CountShift})-(X*Y); \quad \text{formula (E-3'')}$$

$$a2=((XX+acostX)\text{«}i\text{CountShift})-(X*X); \quad \text{formula (E-3'')}$$

Other operations of the LM first parameter derivation unit 310414R and the LM second parameter derivation unit 310415R are the same as those of the LM first parameter derivation unit 310414 and the LM second parameter derivation unit 310415.

According to the aforementioned configuration, the regularization term acostY, which is derived from the sum Y of adjacent chroma components, is added, when deriving the first parameter parameter a1 corresponding to a numerator in the case of the derivation of the parameter a, and the regularization term acostX, which is derived from the sum X of adjacent luminance components, is added when deriving the second parameter parameter a2 corresponding to the denominator in the case of the derivation of the parameter a. Since X and Y which are first-order terms derived from the sums of the pixels are generally more robust, than XX and YY which are second-order terms derived from the sums of the products of the pixels, the sum Y of the adjacent chroma components and the sum X of the adjacent luminance components, which are first-order terms derived by the LM addition value derivation unit 310413 as described, above, are added as the regularization terms to the first parameter a1 and the second parameter a2, respectively, so that the parameter a which corresponds to a ratio of the first parameter a1 to the second parameter a2 also becomes robust. Since the parameter to be estimated becomes robust by the regularization terms, an effect of improving the effect of LM prediction is achieved.

(LM Prediction Unit 3104A)

An LM prediction unit 3104A which is a modified example of the LM prediction unit 3104 will be described below. The LM prediction unit 3104A has almost the same configuration as that of the LM prediction unit 3104, but is different in terms of using an LM parameter a derivation unit 310416A instead of the LM parameter a derivation unit 310416. The LM parameter a derivation unit 310416A will be described below.

Figure 18:
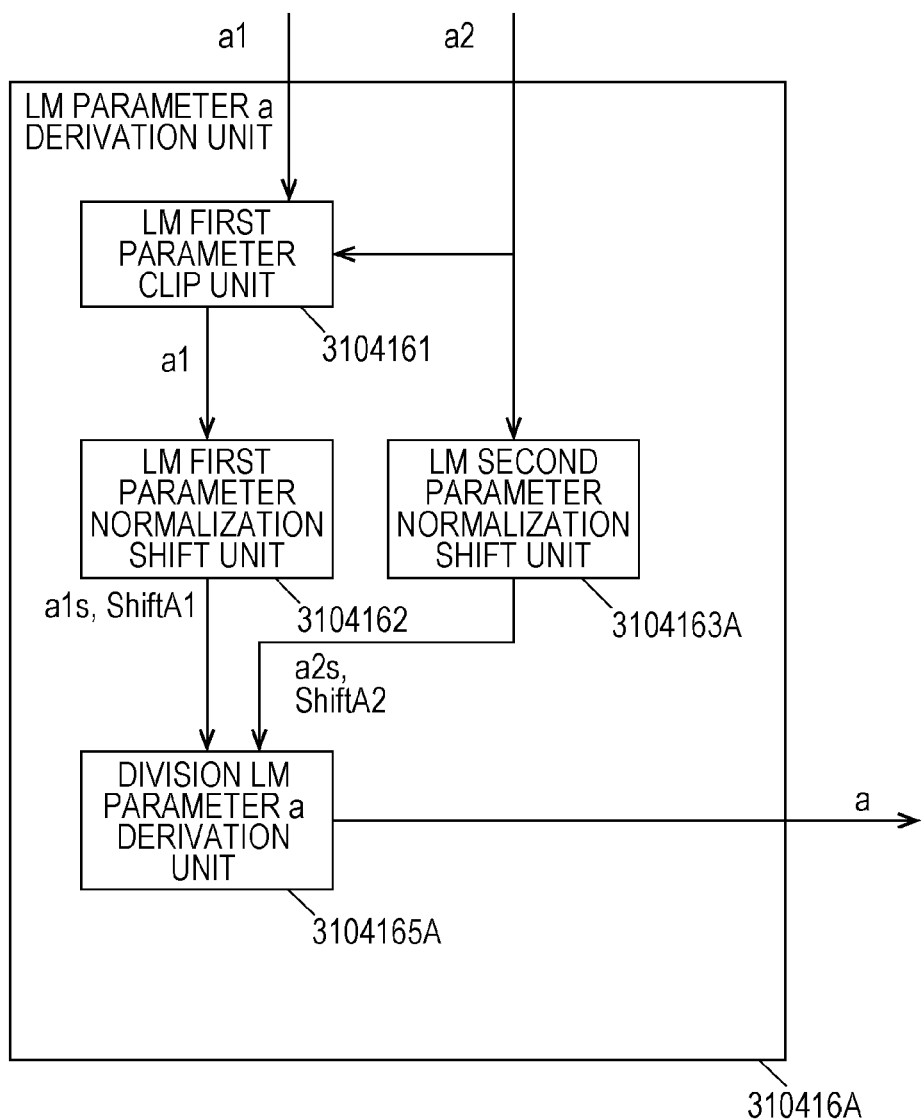
FIG. 18 is a block diagram illustrating a configuration of an LM parameter a derivation unit 310416A according to the present embodiment.

FIG. 18 is a block diagram illustrating a configuration of the LM parameter a derivation unit 310416A. The LM parameter a derivation unit 310416A is composed of the LM first parameter-clip unit 3104161, the LM first parameter normalization shift unit 3104162, an LM second parameter normalization shift unit 3104163A, and a division LM parameter a derivation unit 3104165A. The LM first parameter clip unit 3104161 has been described above, so that the description thereof will be omitted.

The LM second parameter normalization shift unit 3104163A derives the second normalization shift value iScaleShiftA2 with ShiftA2=7 in the LM second parameter normalization shift unit 3104163 which has been described.

The LM first parameter normalization shift unit 3104162 derives the first normalization shift value iScaleShiftA1 with a following formula according to the second normalization shift value iScaleShiftA2, as has been described above. The first normalization shift value iScaleShiftA1, which is derived, is output to the division LM parameter a derivation unit 3104165A.

The division LM parameter a derivation unit 3104165A derives a parameter a shift value iScaleShiftA with a following formula based on a difference between the first normalization shift value iScaleShiftA1 and the second normalization shift value iScaleShiftA2.

$$\text{ScaleShift}A=\text{Shift}A1+i\text{ScaleShift}A2-i\text{ScaleShift}A1-i\text{Shift} \quad \text{formula (B-18)}$$

Further, the division LM parameter a derivation unit 3104165A derives the parameter a with following formulas.

$$tb=(16318+a2s/2)/a2s \quad \text{formula (B-19')}$$

$$a=(a1s*tb)\text{»}\text{Shift}A \quad \text{formula (B-19'')}$$

That is, with a use of the normalization second parameter a2s, an intermediate parameter tb is derived by dividing a sum of a predetermined, constant of 16318 and a2/2 by a2s (here, Floor is performed after the division in the case of rounding down to an integer, that is, a point operation). Further, the parameter a is derived, by right-shifting a product of the intermediate parameter and the normalization first parameter a1s by ShiftA.

Note that, it is also possible to derive the parameter a with, a following formula by generating the table of FIG. 14 with ShiftA1=14 and ShiftA2=7.

$$a=(a1s*\text{invTable}[a2s])\text{»}(\text{ScaleShift}A) \quad \text{formula (B-19)}$$

In the LM prediction unit 3104A composed as described above, the first normalization parameter a1s and the second normalization parameter a2s are derived by right-shifting the first parameter a1 and the second parameter a2 by the first normalization shift value iScaleShiftA1 and the second normalization shift value iScaleShiftA2 derived in accordance with predetermined constants ShiftA1=14 and ShiftA2=7 selected so as to allow processing which is the same as scaling of a motion vector. Then, the intermediate parameter tb is derived by the aforementioned processing and the parameter a is further derived. This makes it possible to use the same scaling as that of the motion vector also in LM prediction, thus achieving an effect, of reducing a scale of mounting.

In the above, both of the first normalization shift value and the second normalization shift value are derived according to magnitude of the second parameter a2. Specifically, since the first normalization shift value is derived by using the second normalization shift value, an effect is achieved that the processing for deriving the first normalization parameter becomes easy compared to a case where the first normalization shift value is derived according to magnitude of the second parameter a1 and the second normalization shift value is derived according to the magnitude of the second parameter a2.

Moreover, since the first normalization shift value is derived by subtracting the predetermined constant from the second normalization shift value, ScaleShiftA, which is used when shifting is performed after multiplication by the inverse table, is always equal to or more than 0. Thus, branching according to whether ScaleShiftA is equal to or more than 0becomes unnecessary and the parameter a is able to be always derived by right-shifting, so that an effect of reducing an amount of calculation is achieved.

(LM Prediction Unit 3104H)

An LM prediction unit 3104H which is a modified example of the LM prediction unit 3104 will be described below.

Figure 19:
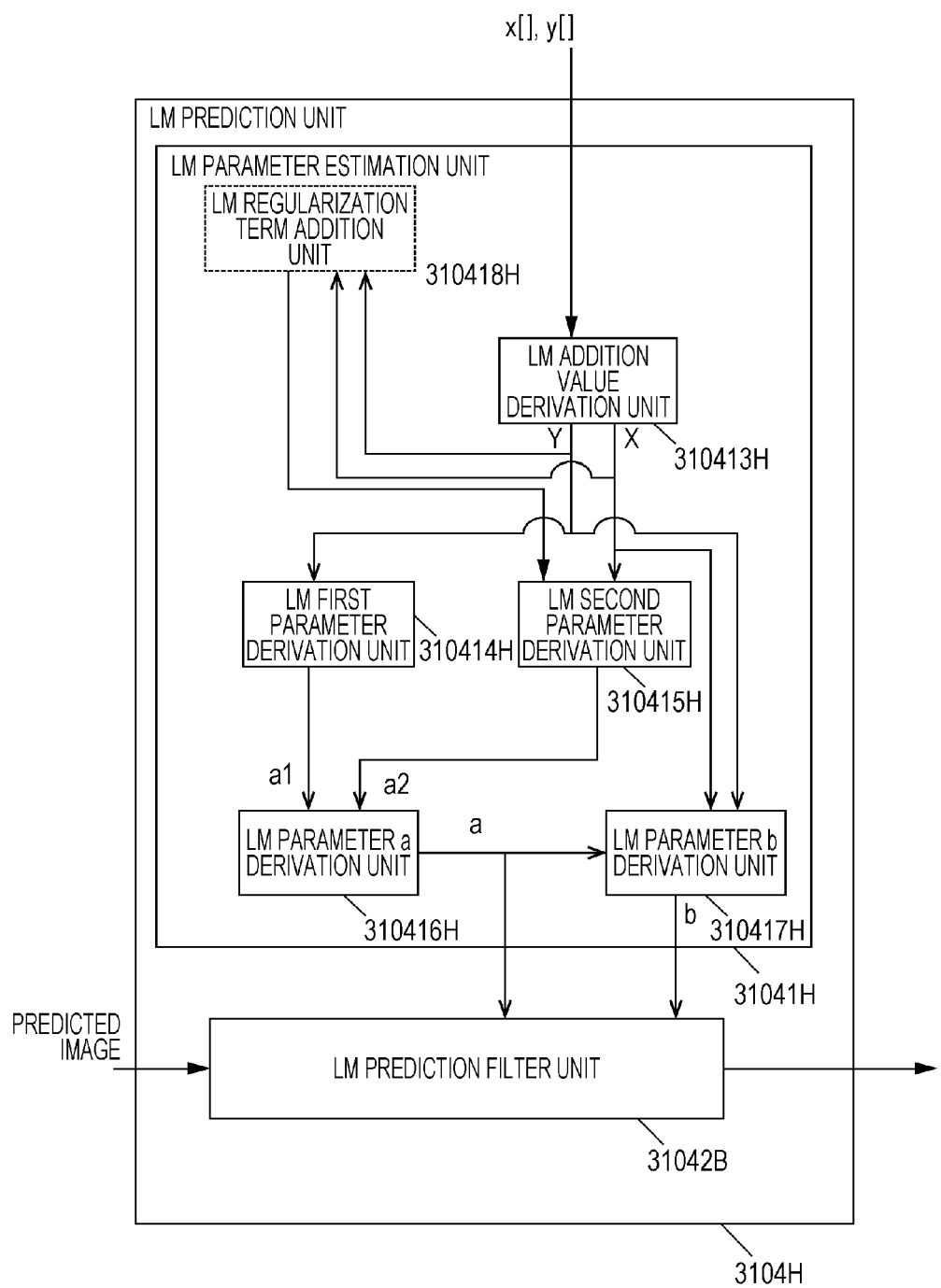
FIG. 19 is a block diagram illustrating a configuration of an LM prediction unit 3104H according to the present embodiment.

FIG. 19 is a block diagram illustrating a configuration of the LM prediction unit 3104H. The LM prediction unit 3104 is composed of an LM parameter estimation unit 31041H and an LM prediction filter unit 31042.

The LM parameter estimation unit 31041H is composed of an LM addition value derivation unit 310413, an LM first parameter derivation unit 310414H, an LM second parameter derivation unit 310415H, an LM parameter a derivation unit 310416, and an LM parameter b derivation unit 310417. Note that, means having the same number as that of the LM parameter estimation unit 31041 has the same configuration, so that the description thereof will be omitted.

The LM addition value derivation unit 310413, the LM parameter a derivation unit 310416, and the LM parameter b derivation unit 310417 are the same as means which have been described above, so that the description thereof will be omitted.

The LM first parameter derivation unit 310414H derives a first parameter a1 with a following formula from the sum Y of the pixel values y of the adjacent chroma images.

a1=Y; formula (B-7')

The LM second parameter derivation unit 310415H derives a second parameter a2 with a following formula from the sum X of the pixel values x of the adjacent luminance images.

a2=X; formula (B-8')

The first parameter a1 and the second parameter a2, which are derived, are output to the LM parameter a derivation unit 310416.

The LM prediction unit 3104H does not include the integral value derivation unit 310412 which derives a second-order term serving as a sum of products of pixels compared to the LM prediction unit 3104, and includes only the addition value derivation unit 310413 which derives a first-order term serving as a sum of pixels. Thus, an LM parameter is able to be derived with relatively simple processing. However, the LM prediction unit 3104 which uses a second-order term has higher coding efficiency.

The LM prediction unit 3104H derives the first normalization shift value by using the second normalization shift value, so that an effect is achieved that processing for deriving the first normalization parameter becomes easy.

Note that, when a bit depth of an image is equal to or less than 10 bits, the parameter a derivation unit 310416 may be composed so as not to include the first parameter normalization shift unit 3104162. That is, the first parameter may be used as the normalization first parameter a1$s$ like a following formula (B-15') with iScaleShiftA1=0.

a1$s$=a1 formula (B-15')

This follows a following formula.

When a bit depth of an image is bitDepth, the first parameter a1 is able to be treated by a bit number which is equal to or less than bitDepth+7 from, a sum of the bit depth bitDepth of a pixel value and a log 7 of 2 of a maximum value 128 of a reference pixel number. Since a maximum value of the inverse table value is 2 raised to the power of ShiftA1, a condition that a product is equal to or less than 32 bits is bitDepth+7+ShiftA1<=32.

When it is modified, the following is obtained.

bitDepth<=25−ShiftA1

When ShiftA1 is 14 or 15, this formula is satisfied if bitDepth<=10, so that the first parameter normalization shift unit 3104162 becomes unnecessary when the bit depth of the pixel is equal to or less than 10 bits.

(Modified Example of LM Prediction Unit 3104H)

The LM prediction unit 3104H may further include an LM regularization term addition unit 310418H. The LM regularization term addition unit 310418H derives a regularization term, acost from the sum X of the pixel values x of the adjacent luminance images.

acost=X»ashift formula (E-1')

Here, ashift is a predetermined constant and used for adjusting a value of the regularization term acost by right-shifting.

Note that, since the sum X of the pixel values x of the adjacent luminance images and the sum Y of the pixel values y of the adjacent, chroma images are almost equal in a normal image, the regularization term acost may be derived from the sum Y of the pixel values y of the adjacent chroma images.

acost=Y«ashift formula (E-1")

The LM regularization term addition unit 310418E adds the regularization term to a parameter (for example, X) used for deriving the second parameter.

X=X+acost formula (H-3)

Note that, the addition of the regularization term may be performed by the LM first parameter derivation unit 310414H and the LM second parameter derivation unit 310415H. In this case, the second parameter is derived with a following formula instead of the formula (B-8').

a2=X+acost formula (E-3")

In the aforementioned configuration of the LM parameter estimation unit 31041H, the parameter a whose value corresponds to the ratio of the first parameter a1 to the second parameter a2 is calculated after the regularization term is added to the second parameter a2, so that an effect is achieved that when there is an outlier or the like, the parameter to be estimated becomes robust and coding efficiency is improved. Note that, the regularization term may be generated from the sum X of the pixel values x of the adjacent luminance images or the sum Y of the pixel values y of the adjacent chroma images.

(LM Prediction Unit 3104HA)

An LM prediction unit 3104HA which is a modified example of the LM prediction unit 3104 will be described below. The LM prediction unit 3104HA has almost the same configuration as that of the LM prediction unit 3104H, but is different in terms of using the LM parameter a derivation unit 310416A instead of the LM parameter a derivation unit 310416. Components including the LM parameter a derivation unit 310416A has been described above, so that the description thereof will be omitted.

The LM parameter a derivation unit 310416A uses division for deriving the parameter a differently from the LM parameter a derivation unit 310416, and this division is the same as following processing used for scaling of a motion vector, so that an effect of reducing a scale of mounting is achieved.

Since the first normalization shift value is derived by using the second normalization shift value in the above, an effect that processing for deriving the first normalization parameter becomes easy is achieved.

In the above, since the first normalization shift value is derived by subtracting the predetermined constant from the second normalization shift value, ScaleShiftA, which is used when shifting is performed after multiplication by the inverse table, is always equal to more than 0. Thus, branching according to whether ScaleShiftA is equal to more than 0becomes unnecessary and the parameter a is able to be always derived by right-shifting, so that an effect of reducing an amount of calculation is achieved.

The inverse quantization/inverse DCT unit 311 obtains a DCT coefficient by performing inverse quantization for a quantization coefficient input from the entropy decoding unit 301, The inverse quantization/inverse DCT unit 311 performs inverse DCT (Inverse Discrete Cosine Transform) of the obtained DCT coefficient and calculates a decoding residual signal. The inverse quantization/inverse DCT unit 311 outputs the decoding residual signal, which is calculated, to the addition unit 312 and the residual storage unit 313.

The addition unit 312 adds the prediction picture block P, which is input from, the inter-prediction image generation unit 309 and the intra-prediction image generation unit 310, and a signal value of the decoding residual signal, which is input from the inverse quantization/inverse DCT unit 311, for each pixel, and generates reference picture blocks. The addition unit 312 stores the generated reference picture blocks in the reference picture memory 306, and outputs a decoding layer image Td, in which the generated reference picture blocks are integrated for each picture, to outside.

(Configuration of Inter Prediction Parameter Decoding Unit)

Next, a configuration of the inter prediction parameter decoding unit 303 will be described.

Figure 6:
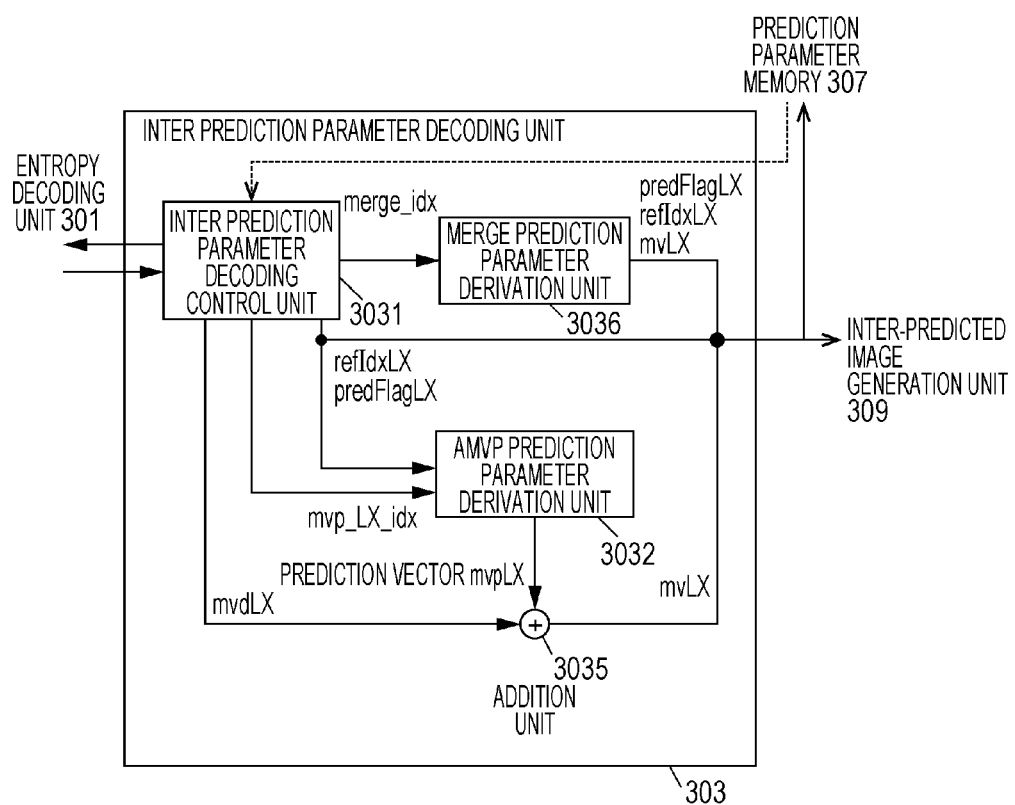
FIG. 6 is a schematic view illustrating a configuration of an inter prediction parameter decoding unit according to the present embodiment.

FIG. 6 is a schematic view illustrating a configuration of the inter prediction parameter decoding unit 303 according to the present embodiment. The inter prediction parameter decoding unit 303 is composed by including an inter prediction parameter decoding control unit 3031, an AMVP prediction parameter derivation unit 3032, an addition unit 3035, and a merge prediction parameter derivation unit 3036.

The inter prediction parameter decoding control unit 3031 instructs the entropy decoding unit 301 to decode a code (syntax element) associated with inter prediction, and extracts a code (syntax element) included in coding data, for example, a partition mode part_mode, a merge flag merge_flag, a merge index merge_idx, an inter prediction flag inter_pred_idcinter_pred_idc, a reference picture index refIdxLX, a prediction vector index mvp_LX_idx, or a difference vector mvdLX.

First, the inter prediction parameter decoding control unit 3031 extracts the merge flag. Expressing that the inter prediction parameter decoding control unit 3031 extracts a certain syntax element means that the inter prediction parameter decoding control unit 3031 instructs the entropy decoding unit 301 to decode the certain syntax element to read the corresponding syntax element, from coding data. Here, when a value indicated by the merge flag is 1, that is, indicates a merge prediction mode, the inter prediction parameter decoding control unit 3031 extracts the merge index merge_idx as a prediction parameter associated with merge prediction. The inter prediction, parameter decoding control unit 3031 outputs the merge index merge_idx, which is extracted, to the merge prediction parameter derivation unit 3036.

When the merge flag merge_flag indicates 0, that is, the AMVP prediction mode, the inter prediction parameter decoding control unit 3031 uses the entropy decoding unit 301 to extract an AMVP prediction parameter from the coding data. Examples of the AMVP prediction parameter include the inter prediction flag inter_pred_idc, the reference picture index refIdxLX, the vector index mvp_LX_idx, and the difference vector mvdLX. The inter prediction parameter decoding control unit 3031 outputs a prediction list utilization flag predFlagLX, which is derived from the extracted inter prediction flag inter_pred_idcinter_pred_idc, and the reference picture index refIdxLX to the AMVP prediction parameter derivation, unit 3032 and the prediction image generation unit 308 (FIG. 5), and stores them in the prediction parameter memory 307 (FIG. 5). The inter prediction parameter decoding control unit 3031 outputs the extracted vector index mvp_LX_idx to the AMVP prediction parameter derivation unit 3032. The inter prediction parameter decoding control unit 3031 outputs the extracted difference vector mvdLX to the addition unit 3035.

Figure 7:
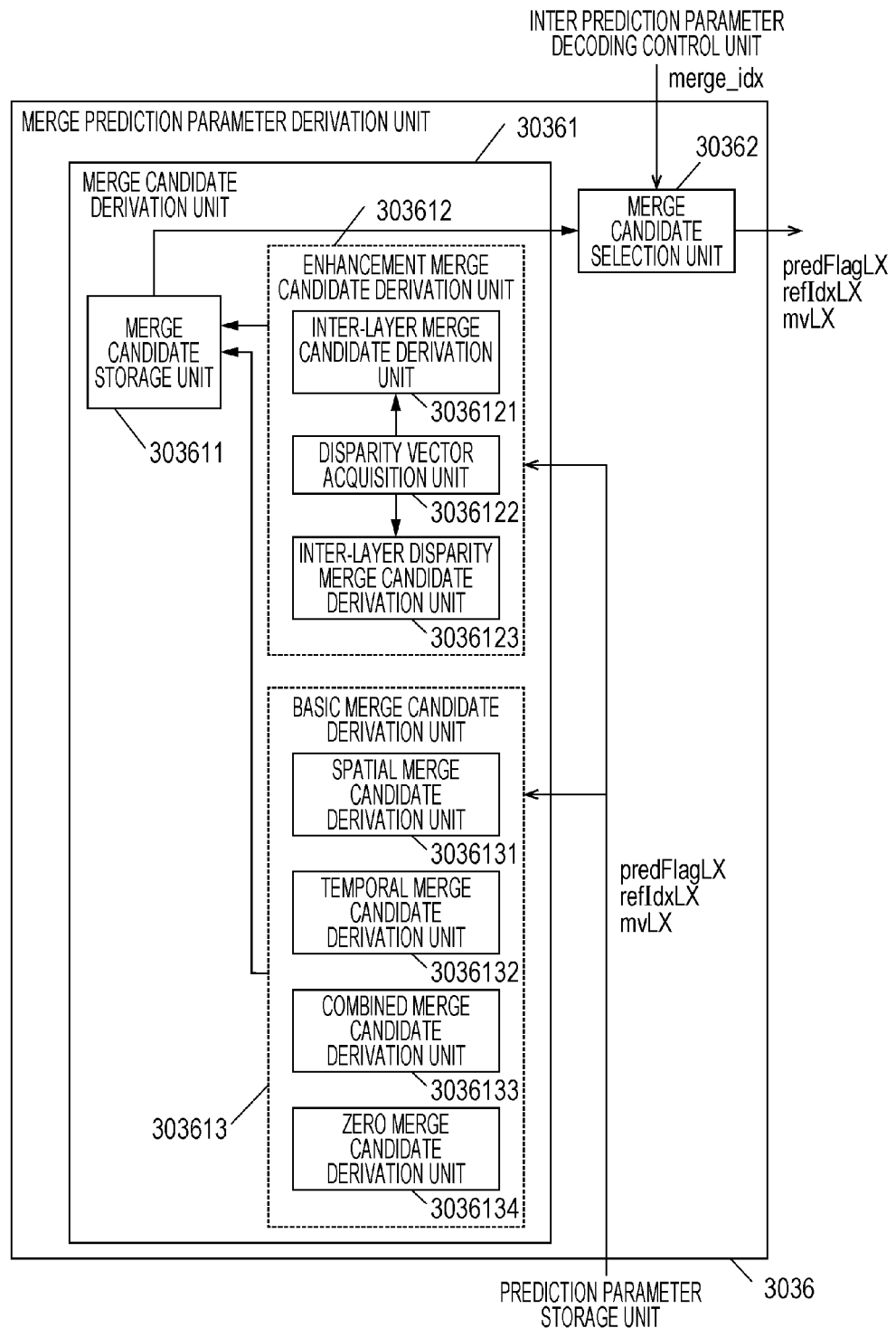
FIG. 7 is a schematic view illustrating a configuration of a merge prediction parameter derivation unit according to the present embodiment.

FIG. 7 is a schematic view illustrating a configuration of the merge prediction parameter derivation unit 3036 according to the present embodiment. The merge prediction parameter derivation unit 3036 includes a merge candidate derivation unit 30361 and a merge candidate selection unit 30362. The merge candidate derivation unit 30361 is composed by including a merge candidate storage unit 303611, an enhancement merge candidate derivation unit 303612, and a basic merge candidate derivation unit 303613.

The merge candidate storage unit 303611 stores merge candidates input, from the enhancement merge candidate derivation unit 303612 and the basic merge candidate derivation unit 303613. The merge candidates are formed by including the prediction list utilization flag predFlagLX, the vector mvLX, and the reference picture index refIdxLX. Indexes are allocated to the merge candidates, which are stored in the merge candidate storage unit 303611, in accordance with a predetermined rule. For example, "0" is allocated as the index to the merge candidates input from the enhancement merge candidate derivation unit 303612.

The enhancement merge candidate derivation unit 303612 is composed by including a disparity vector acquisition unit 3036122, an inter-layer merge candidate derivation unit 3036121, and an inter-layer disparity merge candidate derivation unit 3036123.

First, the disparity vector acquisition unit 3036122 acquires disparity vectors in order from a plurality of candidate blocks adjacent to a decoding target block (for example, adjacent blocks positioned on the left, the upper side, and the upper right). Specifically, one of the candidate blocks is selected, and whether a vector of the selected candidate block is a disparity vector or a motion vector is decided by using a reference layer decision unit 303111 (described below) with a use of the reference picture index refIdxLX of the candidate block, and when there is a disparity vector, it is set as the disparity vector. When there is no disparity vector in the candidate block, next candidate blocks are scanned in order. When there is no disparity vector in the adjacent blocks, the disparity vector acquisition unit 3036122 tries to acquire a disparity vector of a block at a position corresponding to that of a target block of blocks included in a reference picture which is displayed in temporally different order. When a disparity vector is not able to be acquired, the disparity vector acquisition unit 3036122 sets a zero vector as the disparity vector. The disparity vector acquisition unit 3036122 outputs the disparity vector to the inter-layer merge candidate derivation unit 3036121 and the inter-layer disparity merge candidate derivation unit.

The disparity vector is input from the disparity vector acquisition unit 3036122 to the inter-layer merge candidate derivation unit 3036121. The inter-layer merge candidate derivation unit 3036121 selects a block indicated only by the disparity vector, which is input from the disparity vector acquisition unit 3036122, from a picture having the same POC as that of a decoding target picture of a different layer (for example, a base layer or a base view), and reads a prediction parameter serving as a motion vector that the block has from the prediction parameter memory 307. More specifically, the prediction parameter read by the inter-layer merge candidate derivation unit 3036121 is a prediction parameter of a block which includes a coordinate obtained by adding the disparity vector to a coordinate of a start point when a center point of the target, block is set as the start point.

A coordinate of a reference block (xRef, yRef) is derived with following formulas when a coordinate of the target block is (xP, yP), the disparity vector is (mvDisp[0], mvDisp[1]), and width and height of the target block are nPSW and nPSH.

$$xRef = Clip3(0, PicWidthInSamples_L - 1, xP + ((nPSW - 1) \gg 1) + ((mvDisp[0] + 2) \gg 2))$$

$$yRef = Clip3(0, PicHeightInSamples_L - 1, yP + ((nPSH - 1) \gg 1) + ((mvDisp[1] + 2) \gg 2))$$

Note that, the inter-layer merge candidate derivation unit 3036121 decides whether or not the prediction parameter is a motion vector with a method by which decision is made as false (not a disparity vector) in a decision method of the reference layer decision unit 303111 described blow that is included in the inter prediction parameter decoding control unit 3031. The inter-layer merge candidate derivation unit 3036121 outputs the read prediction parameter as the merge candidate to the merge candidate storage unit 303611. Further, when the prediction parameter was not able to be derived, this is output to the inter-layer disparity merge candidate derivation unit by the inter-layer merge candidate derivation unit 3036121. The present merge candidate is an inter-layer candidate of motion prediction (inter-view candidate) and is also described as an inter-layer merge candidate (motion prediction).

The disparity vector is input from the disparity vector acquisition unit 3036122 to the inter-layer disparity merge candidate derivation unit 3036123. The inter-layer disparity merge candidate derivation unit 3036123 outputs the input disparity vector and the reference picture index refIdxLX of a layer image indicated by the disparity vector (for example, index of a base layer image having the same POC as that of the decoding target picture) to the merge candidate storage unit 303611 as the merge candidate. The present merge candidate is an inter-layer candidate of disparity prediction (inter-view candidate) and is also described as an inter-layer merge candidate (disparity prediction).

The basic merge candidate derivation unit 303613 is composed by including a spatial merge candidate derivation unit 3036131, a temporal merge candidate derivation unit 3036132, a combined merge candidate derivation unit 3036133, and a zero merge candidate derivation unit 3036134.

The spatial merge candidate derivation unit 3036131 reads prediction parameters (the prediction list utilization flag predFlagLX, the vector mvLX, and the reference picture index refIdxLX), which are stored in the prediction parameter memory 307, in accordance with a predetermined rule, and derives the read prediction parameters as a merge candidate. The prediction parameters to be read are prediction parameters associated with each of blocks which are positioned in predefined ranges from the decoding target block (for example, all or a part of blocks each adjacent to a lower left end, an upper left end, and an upper right end of the decoding target block). The derived merge candidate is stored in the merge candidate storage unit 303611.

The temporal merge candidate derivation unit 3036132 reads prediction parameters of a block in a reference image, which includes a coordinate on the lower right side of the decoding target block, from the prediction parameter memory 307 to set as a merge candidate. As a method for designating a reference image, the designation may be performed, for example, by using the reference picture index refIdxLX designated being put on a slice header or a minimum one among the reference picture indexes refIdxLX of the blocks adjacent to the decoding target blocks. The derived merge candidate is stored in the merge candidate storage unit 303611.

The combined merge candidate derivation unit 3036133 combines vectors and reference picture indexes of the two different derived merge candidates which have been derived and stored in the merge candidate storage unit 303611 as the vectors of L0 and L1, respectively, to thereby derive a combined merge candidate. The derived merge candidate is stored in the merge candidate storage unit 303611.

The zero merge candidate derivation unit 3036134 derives a merge candidate whose reference picture index refIdxLX is 0, and whose X component and Y component of the vector mvLX are both 0. The derived merge candidate is stored in the merge candidate storage unit 303611.

The merge candidate selection unit 30362 selects, as an inter prediction parameter of a target PU, a merge candidate, to which an index corresponding to the merge index merge_idx input from the inter prediction parameter decoding control unit 3031 is allocated, from among merge candidates stored in the merge candidate storage unit 303611. The merge candidate selection unit 30362 stores the selected merge candidate in the prediction parameter memory 307 (FIG. 5) and outputs it to the prediction image generation unit 308 (FIG. 5).

Figure 8:
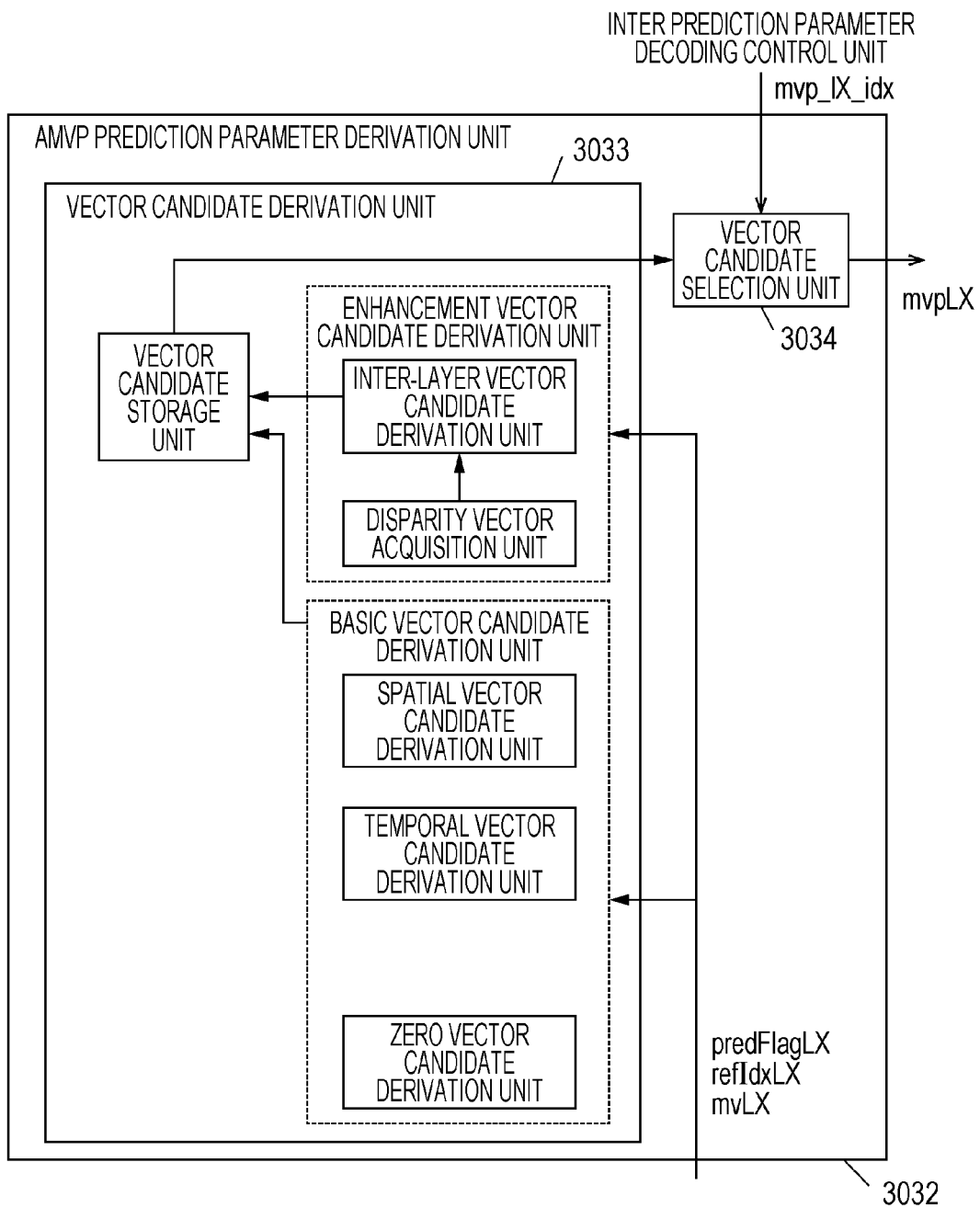
FIG. 8 is a schematic view illustrating a configuration of an AMVP prediction parameter derivation unit according to the present embodiment.

FIG. 8 is a schematic view illustrating a configuration of the AMVP prediction parameter derivation unit 3032 according to the present embodiment. The AMVP prediction parameter derivation unit 3032 includes a vector candidate derivation unit 3033 and a prediction vector selection unit 3034. The vector candidate derivation unit 3033 reads vectors (motion vectors or disparity vectors), which are stored in the prediction parameter memory 307 (FIG. 5), based on the reference picture index refIdx, as vector candidates mvpLX. The vectors to be read are vectors associated with each of blocks which are positioned in predefined ranges from the decoding target block (for example, all or a part of blocks each adjacent to a lower left end, an upper left end, and an upper right end of the decoding target block).

The prediction vector selection unit 3034 selects, as a prediction vector mvpLX, a vector candidate indicated by the vector index mvp_LX_idx input from the inter prediction parameter decoding control unit 3031 from among the vector candidates read by the vector candidate derivation unit 3033. The prediction vector selection unit 3034 outputs the selected prediction vector mvpLX to the addition unit 3035.

Figure 9:
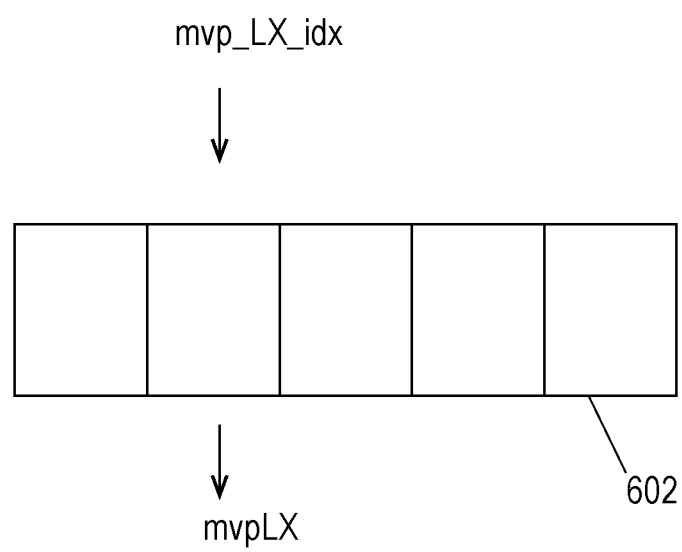
FIG. 9 is a concept view illustrating one example of vector candidates.

FIG. 9 is a concept view illustrating one example of vector candidates. A prediction vector list 602 indicated in FIG. 9 is a list composed of a plurality of vector candidates derived in the vector candidate derivation unit 3033. In the prediction vector list 602, each of five rectangles arranged in one line from left to right indicates a region indicating each prediction vector. Downward arrows just below mvp_LX_idx which is for the second rectangle from a left end and mvpLX below them indicate that the vector index mvp_LX_idx is an index which refers to the vector mvpLX in the prediction parameter memory 307.

A candidate vector is generated by referring to a block for which decoding processing is completed and which is positioned in a predefined range from the decoding target block (for example, adjacent block) based on a vector associated with the block which has been referred to. Note that, the adjacent block includes a block temporally adjacent, to a target block, for example, a. block obtained from a block which is at the same position with the target block and has a different, display time, in addition to a block spatially adjacent to the target block, for example, a left block and an upper block.

The addition, unit 3035 adds the prediction vector mvpLX input from the prediction vector selection unit 3034 and the difference vector mvdLX input from the inter prediction parameter decoding control unit to calculate a vector mvLX. The addition unit 3035 outputs the calculated vector mvLX to the prediction image generation unit 308 (FIG. 5).

The inter prediction parameter decoding control unit 3031 is composed by including an additional prediction flag decoding unit 30311, a merge index decoding unit 30312 and a vector candidate index decoding unit 30313, and a partition mode decoding unit, a merge flag decoding unit, an inter prediction flag decoding unit, a reference picture index decoding unit and a vector difference decoding unit, which are not illustrated. The partition mode decoding unit, the merge flag decoding unit, the merge index decoding unit, the inter prediction flag decoding unit, the reference picture index decoding unit, the vector candidate index decoding unit 30313, and the vector difference decoding unit decode a partition mode part_mode, a merge flag merge_flag, a merge index merge_idx, an inter prediction flag inter_pred_idc, a reference picture index refIdxLX, a prediction vector index mvp_LX_idx, and a difference vector mvdLX, respectively.

The additional prediction flag decoding unit 30311 decodes a flag indicating whether or not to perform additional prediction. The additional prediction is illumination compensation and residual prediction, here. The additional prediction flag decoding unit 30311 decodes an illumination compensation flag ic_enable_flag which is a flag indicating whether or not to perform, illumination compensation and a residual prediction flag res_pred_flag which is a flag indicating whether to perform residual prediction, to output to the inter-prediction image generation unit 309. Note that, in the illumination compensation and the residual prediction, processing is performed only when the partition mode PartMode is 2N×2N. Accordingly, the additional prediction flag decoding unit 30311 decodes values of the illumination compensation flag ic_enable_flag and the residual prediction flag res_pred_flag in a case where the partition mode PartMode is 2N×2N, and sets ic_enable_flag=0 and res_pred_flag=0 in other cases.

When a block adjacent to the target PU has a disparity vector, the disparity vector acquisition unit extracts the disparity vector from the prediction parameter memory 307, and by referring to the prediction parameter memory 307, reads a prediction flag predFlagLX, a reference picture index refIdxLX, and a vector mvLX of the block adjacent to the target PU. The disparity vector acquisition unit includes, inside thereof, the reference layer decision unit 303111. The disparity vector acquisition unit reads prediction parameters of the block adjacent to the target PU in order, and by using the reference layer decision unit 303111, decides whether or not the adjacent block has a disparity vector from the reference picture index of the adjacent block. When the adjacent block has a disparity vector, the disparity vector is output. When there is no disparity vector in the prediction parameters of the adjacent block, a zero vector is output as the disparity vector.

(Reference Layer Decision Unit 303111)

Based on the input reference picture index refIdxLX, the reference layer decision unit 303111 defines a reference picture, which is indicated by the reference picture index refIdxLX, and reference layer information reference_layer_info indicating a relation of a target picture. The reference layer information reference_layer_info is information indicating whether the vector mvLX to the reference picture is a disparity vector or a motion vector.

Prediction when a layer of the target picture and a layer of the reference picture are the same layer is called same-layer prediction, and a vector obtained in this case is a motion vector. Prediction when a layer of the target picture and a layer of the reference picture are different layers is called inter-layer prediction, and a vector obtained in this case is a disparity vector.

(Inter-prediction Image Generation Unit 309)

Figure 11:
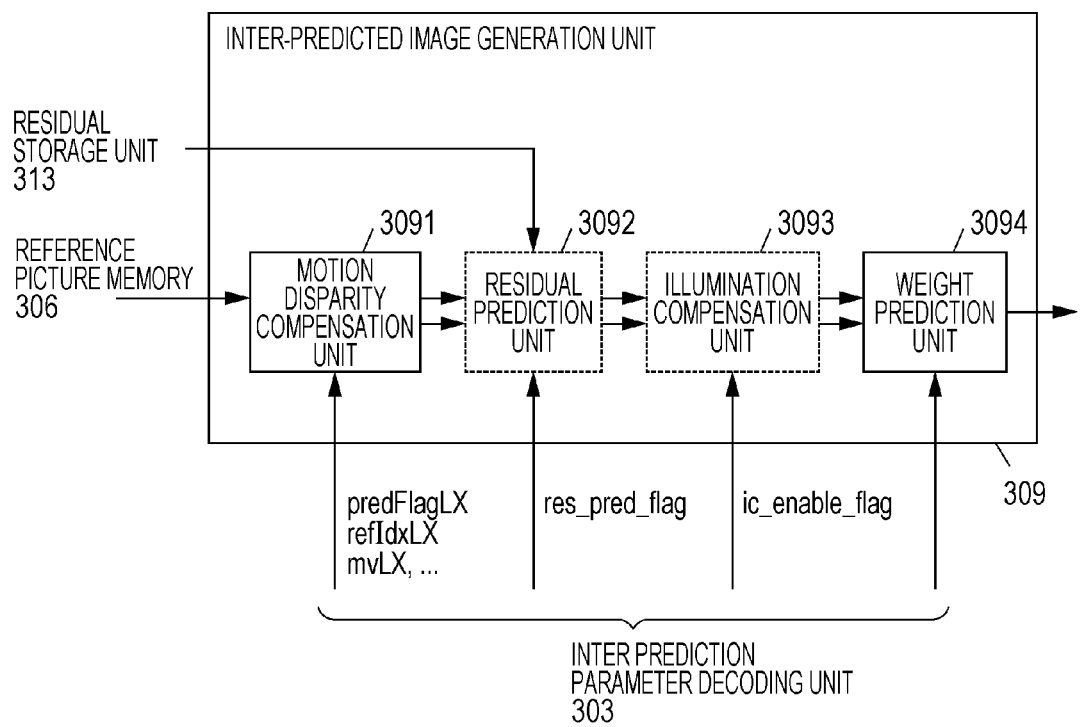
FIG. 11 is a schematic view illustrating a configuration of an inter-prediction image generation unit according to the present embodiment.

FIG. 11 is a schematic view illustrating a configuration of the inter-prediction image generation unit 309 according to the present embodiment. The inter-prediction image generation unit 309 is composed by including a motion disparity compensation unit 3091, a residual prediction unit 3092, an illumination compensation unit 3093, and a weight prediction unit 3094.

(Motion Disparity Compensation)

Based on the prediction list utilization flag predFlagLX, the reference picture index refIdxLX, and the motion vector mvLX, which are input from the inter prediction parameter decoding unit 303, the motion disparity compensation unit 3091 reads, from the reference picture memory 306, a block at a position shifted by the vector mvLX with a position of the target block of the reference picture designated by the reference picture index refIdxLX as a start point, and thereby generates a motion disparity compensation image. Here, when the vector mvLX is not an integer vector, the motion disparity compensation image is generated by applying a filter for generating a pixel at a decimal position, which is called a motion compensation filter (or disparity compensation filter). Generally, the aforementioned processing is called motion compensation when the vector mvLX is the motion vector, and called disparity compensation when being the disparity vector. Here, they are represented as motion disparity compensation collectively. A motion disparity compensation image of L0 prediction and a motion disparity compensation image of L1 prediction are respectively called predSamplesL0 and predSamplesL1 below. Both of them, when being not distinguished, are called predSamplesLX. Though the following describes an example in which residual prediction and illumination compensation are further performed for the motion disparity compensation image predSamplesLX obtained at the motion disparity compensation unit 3091, an output image in this case is also called a motion disparity compensation image predSamplesLX. Note that, when an input image and the output image are distinguished in the following residual prediction and illumination compensation, the input image and the output image are respectively represented as predSamplesLX and predSamplesLX'.

(Residual Prediction)

The residual prediction unit 3092 performs residual prediction for the motion disparity compensation image predSamplesLX, which is input, when a residual prediction flag res_pred_flag is 1. When the residual prediction flag res_pred_flag is 0, the residual prediction unit 3092 directly outputs the motion disparity compensation image predSamplesLX, which is input. By using a disparity vector mvDisp input from, the inter prediction parameter decoding unit 303 and a residual refResSamples stored in the residual storage unit 313, residual prediction is performed for the motion disparity compensation image predSamplesLX obtained at the motion disparity compensation unit 3091. The residual prediction is performed by adding a residual of a reference layer (first layer image) different from a target layer (second layer image) for which a prediction image is to be generated to the motion disparity compensation image predSamplesLX serving as an image for which prediction of the target layer has been performed. That is, by assuming that a residual similar to that of the reference layer is caused also in the target layer, the residual of the reference layer which has been derived is used as an estimation value of the residual of the target layer. Only an image of the same layer serves as a reference image in a base layer (base view). Thus, when the reference layer (first layer image) is the base layer (base view), a prediction image of the reference layer is a prediction image by motion compensation, so that residual prediction is effective in the case of the prediction image by motion compensation also in prediction by the target layer (second layer image). That is, the residual prediction has a characteristic of being effective when a target block is for motion compensation.

Figure 12:
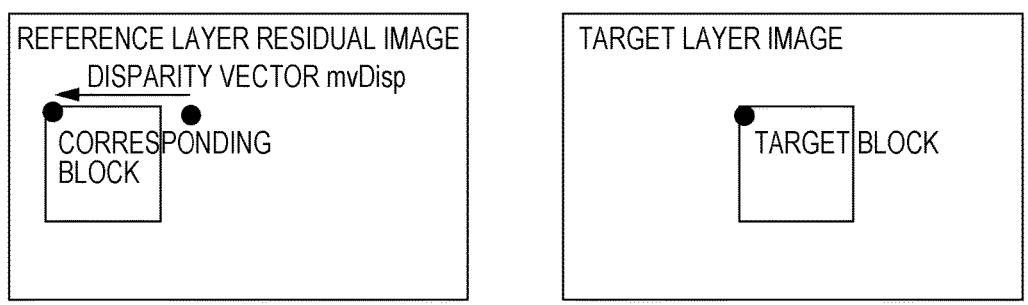
FIG. 12 is a concept view of residual prediction according to the present embodiment.

The residual prediction unit 3092 is composed of a residual acquisition unit 30921 and a residual filter unit 30922 which are not illustrated. FIG. 12 is a view for explaining residual prediction. A corresponding block which corresponds to a target block in a target layer is positioned at a block positioned being shifted by a disparity vector mvDisp serving as a vector indicating a positional relation between the reference layer and the target layer with a position of the target block of an image in a reference layer as a start point. Accordingly, as a residual used for residual prediction, a residual positioned being shifted by the disparity vector mvDisp is used. Specifically, the residual acquisition unit 30921 derives a pixel positioned being shifted by an integer pixel component of the disparity vector mvDisp of the target block from a coordinate (x, y) of a pixel of the target block. By considering that the disparity vector mvDisp is decimal accuracy, the residual acquisition unit 30921 derives an X coordinate xR0 of a corresponding pixel R0 and an X coordinate xR1 of a pixel R1 adjacent to the pixel R0 with following formulas, when a coordinate of a pixel of the target block is (xP, yP).

$$xR0 = \text{Clip3}(0, \text{PicWidthInSamples}_L - 1, xP + x + (mv\text{Disp}[0] \gg 2))$$

$$xR1 = \text{Clip3}(0, \text{PicWidthInSamples}_L - 1, xP + x + (mv\text{Disp}[0] \gg 2)) + 1$$

Here, Clip3(x, y, z) is a function for limiting (clipping) z to be x or more and y or less. Note that, mvDisp[0]»2 is a formula for deriving an integer component in a vector with a quarter-pel accuracy.

The residual acquisition unit 30921 derives a weight coefficient w0 of the pixel R0 and a weight coefficient w1 of the pixel R1 with following formulas, according to a decimal pixel position of a coordinate designated by the disparity vector mvDisp (mvDisp[0]−((mvDisp[0]»2)«2)).

$$w0 = 4 - mv\text{Disp}[0] + ((mv\text{Disp}[0] \gg 2) \ll 2)$$

$$w1 = mv\text{Disp}[0] - ((mv\text{Disp}[0] \gg 2) \ll 2)$$

Subsequently, the residual acquisition unit 30921 acquires residuals of the pixel R0 and the pixel R1 by refResSamples$_L$[xR0, y] and refResSamples$_L$[xR1, y] from the residual storage unit 313. The residual filter unit 30922 derives an estimation residual deltaL with a following formula.

$$\text{delta}_L = (w0 * \text{Clip3}(x\text{min}, x\text{max}, \text{refResSamples}_L[xR0, y]) + w1 * \text{Clip3}(x\text{min}, x\text{max}, \text{refResSamples}_L[xR1, y] + 2)) \gg 2$$

Here, xmin =−(1«(BitDepthY−1)) and xmax=(1«(BitDepthY−1))−1. When reading the residual of the reference layer, the residual acquisition unit 30921 performs the reading after clipping it to be in a range within a predetermined bit width. For example, when a bit depth is BitDepthY, refResSamples$_L$[xR0, y] and refResSamples$_L$[xR1, y] are limited to −(1«(BitDepthY−1))~+(1«BitDepthY−1)−1 for reading the residual. Though the bid depth bitDepthY of luminance is used for the bit depth in the description above, the similar clip processing is performed also when a residual of chroma is read. In this case, the processing is performed by replacing the bit depth with a bit depth bitDepthC of chroma (the similar is also applied below).

With the aforementioned processing, a pixel is derived by linear interpolation when the disparity vector mvDisp has decimal accuracy, but a near integer pixel may be used without using the linear interpolation. Specifically, the residual acquisition unit 30921 may acquire only the pixel xR0 as a pixel corresponding to the pixel of the target block and derive an estimation residual deltaL by using a following formula.

$$\text{delta}_L = \text{Clip3}(x\text{min}, x\text{max}, \text{refResSamples}_L[xR0, y])$$

After deriving the estimation residual deltaL, the residual filter unit 30922 adds the estimation residual deltaL to the motion disparity image predSamplesLX input to the residual prediction unit 3092 to output as a motion disparity image predSamplesLX'.

$$predSamplesLX'[x, y]=predSamplesLX[x, y]+delta_L$$

(Illumination Compensation)

The illumination compensation unit 3093 performs illumination compensation for the motion disparity compensation image predSamplesLX, which is input, when an illumination compensation flag ic_enable_flag is 1. When the illumination compensation flag ic_enable_flag is 0, the illumination compensation unit 3093 directly outputs the motion disparity compensation image predSamplesLX, which is input. The motion disparity compensation image predSamplesLX input to the illumination compensation unit 3093 is an output image of the motion disparity compensation unit 3091 when the residual prediction is turned off, and is an output image of the residual prediction unit 3092 when the residual prediction is turned on.

The illumination parameter estimation unit 30931 obtains an estimation parameter for estimating a pixel of the target block (target prediction unit) from the pixel of the reference block. FIG. 13 is a view for explaining illumination compensation. In FIG. 13, positions of pixels L neighboring a target block and pixels C neighboring a reference block (corresponding block) in a reference layer image, which is positioned being shifted by a disparity vector from, the target block.

The illumination parameter estimation unit 30931 obtains an estimation parameter (illumination variation parameter) from the pixels L (L0 to LN-1) neighboring the target block and the pixels C (C0 to CN-1) neighboring the reference block.

The illumination compensation unit 3093 and a modified example thereof will be described in detail below.

(Illumination Compensation Unit 3093)

Figure 20:
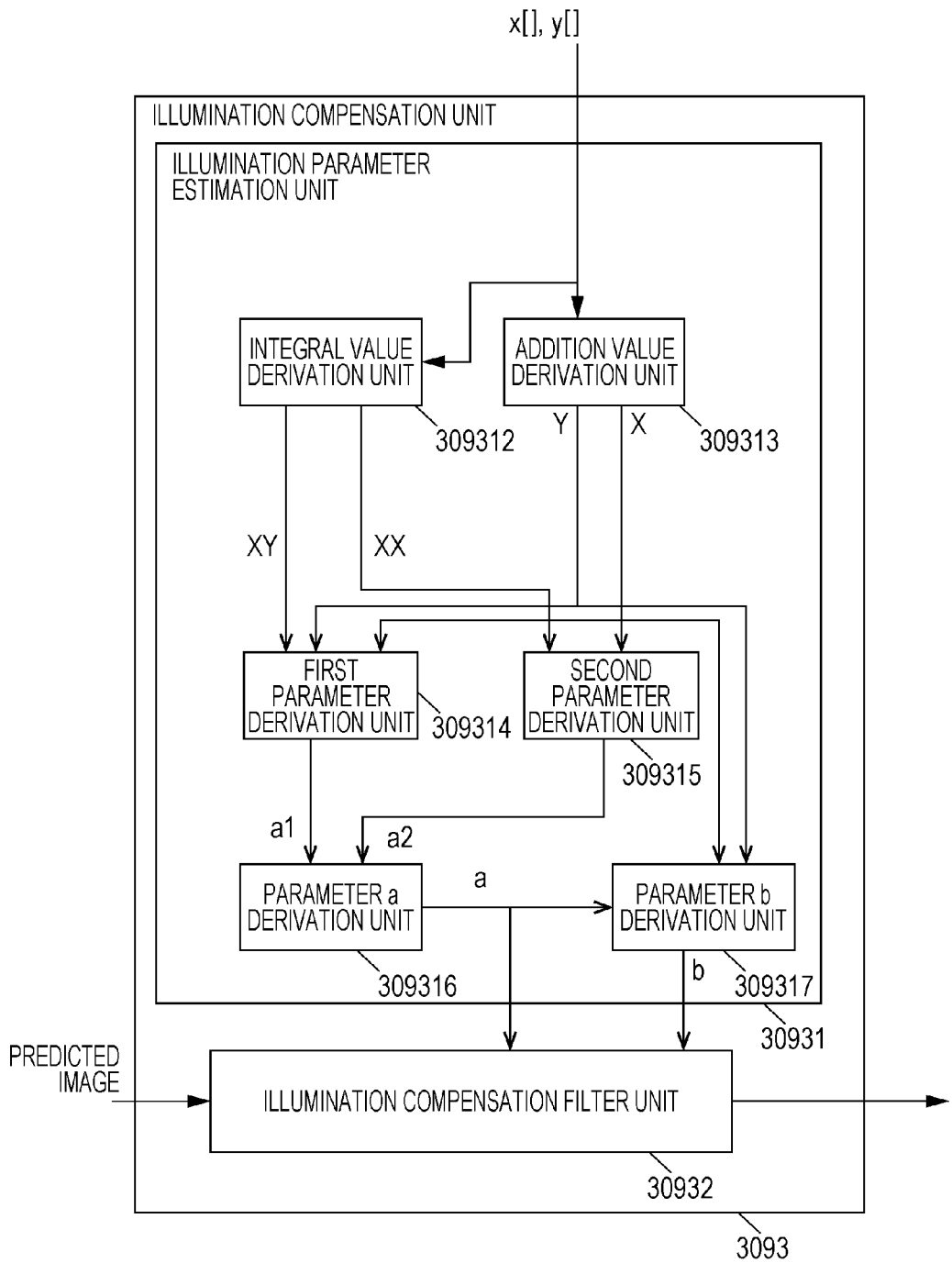
FIG. 20 is a block diagram illustrating a configuration of an illumination compensation unit 3093 according to the present embodiment.

FIG. 20 is a block diagram illustrating a configuration of the illumination compensation unit 3093. The illumination compensation unit 3093 is composed of an illumination parameter estimation unit 3093, and an illumination compensation filter unit 30932. The illumination parameter estimation unit 30931 is composed of an integral value derivation unit 309312, an addition value derivation unit 309313, a first parameter derivation unit 309314, a second parameter derivation unit 309315, a parameter a derivation unit 309316, and a parameter b derivation unit 309317.

The illumination parameter estimation unit 30931 sets the pixels C neighboring the reference block in the reference layer image and the pixels L neighboring the target block in the target layer, which are illustrated in FIG. 13, as pixel values x[ ] of the reference images and pixel values y[ ] of adjacent, decoding images, respectively, and based on the pixel values x[ ] of the reference images and the pixel values y[ ] of the adjacent decoding images, derives a parameter a and a parameter b which are parameters when, the pixel values y[ ] of the adjacent decoding images are linearly prediction from the pixel values x of the reference images.

The addition value derivation unit 309313 derives a sum Y of the pixel values y of the adjacent decoding images and a. sum X of the pixel values x of the reference images with a formula (B-2) and a formula (B-3) as follows.

The integral value derivation unit 309312 derives a sum XY of products of the pixel values y of the adjacent decoding images and the pixel values x of the reference images, and a sum XX of squares of the pixel values of the reference images, with following formulas (B-4) to (B-5). Before addition as follows, X, Y, XY and XX are initialized to 0.

$$X=\Sigma x[i] \quad \text{formula (B-2)}$$

$$Y=\Sigma y[i] \quad \text{formula (B-3)}$$

$$XX+=\Sigma(x[i]*x[i]) \quad \text{formula (B-4)}$$

$$XY+=\Sigma(y[i]*y[i]) \quad \text{formula (B-5)}$$

Here, $\Sigma$ is a sum with respect to a reference region, by which a sum with respect to an index i for designating pixels of the reference region is derived. y[i] is a pixel value in an index i of the adjacent decoding images. x[i] is a pixel value in an index i of the reference images.

$$i\text{CountShift}=\log 2 \text{ (pixel number of the reference region)} \quad \text{formula (B-6)}$$

The first parameter derivation unit 309314 derives a first parameter a1 with a following formula by a difference between the sum XY of products of the pixel values y of the adjacent decoding images and the pixel values x of the reference images and a product of the sum Y of the pixel values of the adjacent decoding images and the sum X of the pixel values of the reference images.

$$a1=(XY\ll i\text{CountShift})-(Y*X); \quad \text{formula (B-7)}$$

The second parameter derivation unit 309315 derives a second parameter a2 with a following formula by a difference between the sum XX of the squares of the pixel values of the reference images and a square of the sum X of the pixel values of the reference images.

$$a2=(XX\ll i\text{CountShift})-(X*X)\gg\text{precShift}; \quad \text{formula (B-8)}$$

As indicated with the formula (B-8), XX is left-shifted by the count shift value iCountShift and the product of X and X is right-shifted by an integration shift value precShift, and then, a difference between them is calculated.

The first parameter a1 and the second parameter a2, which are derived, are output to the parameter a derivation unit 309316.

Figure 21:
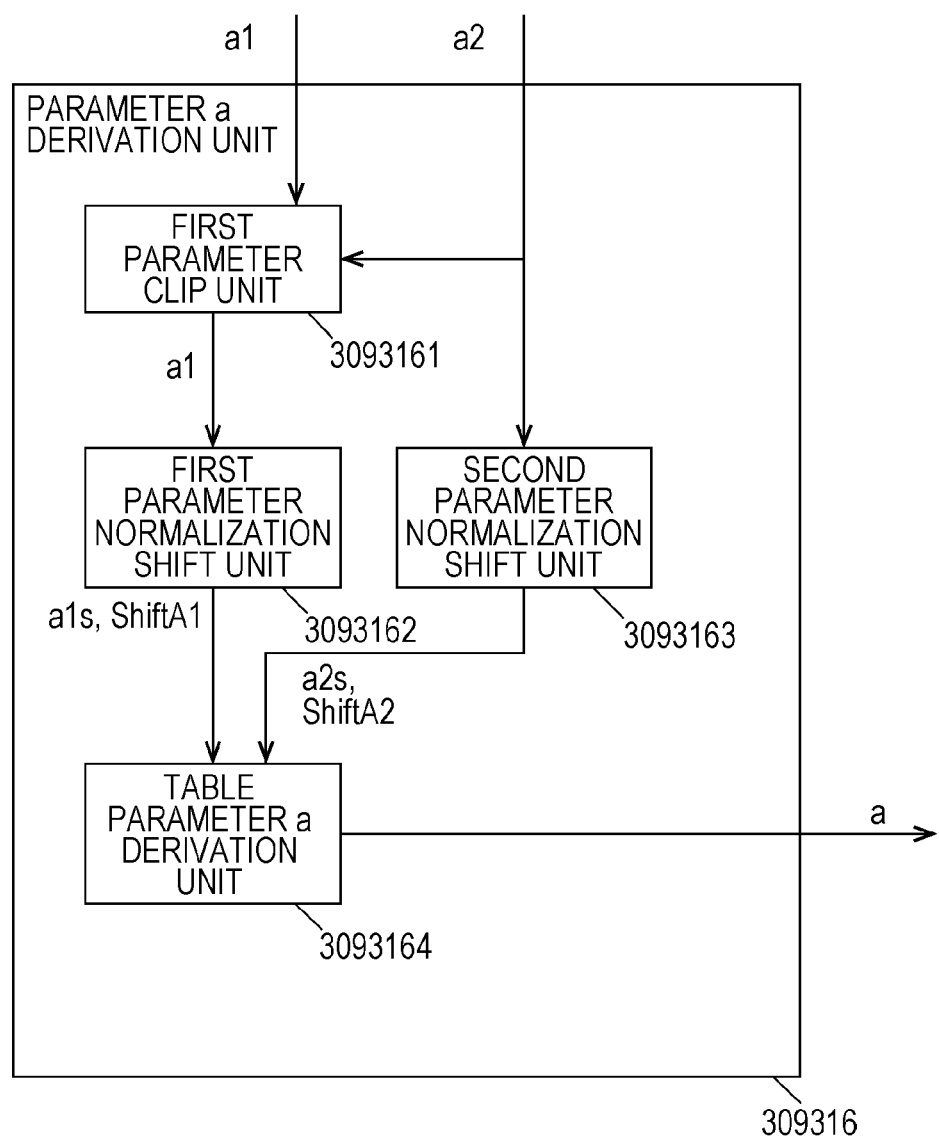
FIG. 21 is a block diagram illustrating a configuration of a parameter a derivation unit 309316 according to the present, embodiment.

FIG. 21 is a block diagram illustrating a configuration of the parameter a derivation unit 309316. The parameter a derivation unit 309316 is composed of a first parameter clip unit 3093161, a first parameter normalization shift unit 3093162, a second parameter normalization shift unit 3093163, and a table base parameter a derivation unit 3093164.

The parameter a derivation unit 309316 derives a parameter a corresponding to inclination in linear prediction for illumination compensation. Specifically, the parameter a corresponding to a1/a2≪iShift which is a value obtained by left-shifting a ratio of the first parameter a1 to the second parameter a2 by a fixed shift value for obtaining an integer is derived with following processing by using integer arithmetic operation.

The first parameter clip unit 3093161 limits the first parameter a1 according to magnitude of the second parameter a2. For example, like a following formula, a1 is clipped to be equal to or more than 0 and twice or less of a2.

$$a1=\text{Clip3}(0, 2*a2, a1) \quad \text{formula (B-12)}$$

Since a value of a1 is clipped according to a value of a2 by the first parameter clip unit 3093161, a value of a1/a2 which is a ratio thereof is also clipped to be between 0 and 2. Accordingly, a value of a1/a2≪iShift which is a value of the parameter a is also clipped to be from 0 to 2≪iShift. That is, when iShift=6, the parameter a becomes 0 to 128 and is able to be treated in a range of an 8-bit nonnegative integer.

According to the magnitude of the second parameter a2, the second parameter normalization shift unit 3093163 derives a second normalization shift value iScaleShiftA2 with a following formula with respect to a predetermined bit width ShiftA2 used for the derivation of the table of FIG. 14. The second normalization shift value iScaleShiftA2, which is derived, is output to the table base parameter a derivation unit 3093164.

$$iScaleShiftA2=Max(0, Floor(Log\ 2(Abs(a2)))-(ShiftA2-1)) \quad \text{formula (B-14)}$$

Here, Floor(Log 2(Abs(x))) is able to be obtained by Floor(Log 2(Abs(x)))=32−NLZ(x)−1 by using the Number of Leading Zero (NLZ), which is the number of successive zeros as viewed from a left side of a bit sequence, Leftmost bit, when a2 is stored in a 32-bit register. Note that, when a 64-bit register is used, it is able to be derived by 64−NLZ(x)−1.

Note that, it is preferable that the number is small in the derivation of the NLZ because relatively complicated calculation is required.

The first parameter normalization shift unit 3093162 derives the first normalization shift value iScaleShiftA1 with a following formula according to the second normalization shift value iScaleShiftA2. The first normalization shift value iScaleShiftA1, which is derived, is output to the table base parameter a derivation unit 3093164.

$$iScaleShiftA1=Max(0, iScaleShiftA2-offsetA1) \quad \text{formula (B-13)}$$

Note that, offsetA1 here is a constant which satisfies 14 or less.

In the above, the second normalization shift value is derived by subtracting the predetermined constant offsetA1 from the second normalization shift value. Here, both of the first normalization shift value and the second normalization shift value are clipped to be equal to or more than 0 in the formula (B-14) and the formula (B-13). Though the first normalization shift value is derived by clipping the second normalization shift to be equal to or more than 0 and then subtracting the predetermined constant offsetA1 therefrom and clipping the resultant to be equal to or more than 0 in the above, the first normalization shift value may be derived by subtracting the predetermined constant offsetA1 before clipping the second normalization shift to be equal to or more than 0, and then clipping the resultant to be equal to or more than 0. Moreover, in the above, both of the first normalization shift value and the second normalization shift value are derived according to the magnitude of the second parameter a2. Specifically, the first normalization shift value is derived by using the second normalization shift value. Thus, an effect is achieved that the processing for deriving the first normalization parameter becomes easy compared to a case where the first normalization shift value is derived according to the magnitude of the second parameter a1 and the second normalization shift value is derived according to the magnitude of the second parameter a2. That is, it is possible to prevent the first normalization parameter from being obtained, for example, with a following formula (B-13') which has a relatively large arithmetic amount.

$$iScaleShiftA1=Max(0, Floor(Log\ 2(Abs\ (a1)))-(31-ShiftA1-1)) \quad \text{formula (B-13')}$$

Here, offsetA1 is derived so that iScaleShiftA1 satisfies a following formula.

First, in the formula (B-19), a following formula needs to be established in order to treat a1s*invTable[a2s] in a range of a 32-bit integer (−2^31 to 2^31);

$$a1s*invTable[a2s]<=2^{31}-1.$$

Here, since a1s=a1»iScaleShiftA1 and invTable[a2s=Floor (2^ShiftA1+a2s/2)/a2s<=(2^ShiftA1+2^ShiftA2)/a2s), a following formula is obtained.

$$(a1»iScaleShiftA1)*(2^{\hat{}}ShiftA1+2^{\hat{}}ShiftA2)/a2s<=2^{31}-1$$

Further, since a1<=2*a2, a following formula is obtained.

$$((2*a2)»iScaleShiftA1)*(2^{\hat{}}ShiftA1+2^{\hat{}}ShiftA2)/a2s<=2^{31}-1$$

Further, since a2=a2s«iScaleShiftA2, a following formula is obtained.

$$(2*(a2s«iScaleShiftA2)»iScaleShiftA1)*(2^{\hat{}}ShiftA1+2^{\hat{}}ShiftA2)/a2s<=2^{31}-1$$

By modifying this formula, a following formula is obtained.

$$(2*(1«iScaleShiftA2)»iScaleShiftA1)*(2^{\hat{}}ShiftA1+2^{\hat{}}ShiftA2)<=2^{31}-1$$

By modifying this formula, a following formula is obtained.

$$(1«(iScaleShiftA2-iScaleShiftA1+1))*(2^{\hat{}}ShiftA1+2^{\hat{}}ShiftA2)<=2^{\hat{}}31-1$$

Here, by substituting iScaleShiftA1=iScaleShiftA2−offsetA1, a following formula is obtained.

$$(1«(offsetA1+1))*(2^{\hat{}}ShiftA1+2^{\hat{}}ShiftA2)<=2^{31}-1$$

Here, by modifying this formula with 2^ShiftA1+2^ShiftA2 =a*2^ShiftA1, $$(a«(offsetA1+1+ShiftA1)<=2^{31}-1$$

$$(1«offsetA1+1+ShiftA1)<=(2^{31}-1)/a.$$

Here, when a is equal to or less than (2^31−1)/2^30, (1«offsetA1+1+ShiftA1)<=2^30.

Thus, $$offsetA1+1+ShiftA1<=2^{\hat{}}30.$$

Consequently, offsetA1 which satisfies a following formula is suitably used.

$$offsetA1<=29-ShiftA1$$

Here, when ShiftA1=15, a following condition is obtained.

$$offsetA1<=14$$

Note that, a condition that a is equal to or less than (2^31−1)/2^30 is able to be modified as indicated below.

$$a=(2^{\hat{}}ShiftA1+2^{\hat{}}ShiftA2)/2^{\hat{}}ShiftA1<=(2^{\hat{}}31-1)/2^{\hat{}}30<=b$$

$$(2^{\hat{}}ShiftA1+2^{\hat{}}ShiftA2)/2^{\hat{}}ShiftA1<=(2^{\hat{}}31-1)/2^{\hat{}}30$$

$$2^{\hat{}}ShiftA1+2^{\hat{}}ShiftA2<=(2^{\hat{}}31-1)/2^{\hat{}}30*2^{\hat{}}ShiftA1$$

$$2^{\hat{}}ShiftA2<=2^{\hat{}}ShiftA1*((2^{\hat{}}31-1)/2^{\hat{}}30-1)$$

$$2^{\hat{}}ShiftA2<=2^{\hat{}}ShiftA1*(2^{\hat{}}30-1)/2^{\hat{}}30$$

$$ShiftA2<=ShiftA1+log\ 2((2^{\hat{}}30-1)/2^{\hat{}}30)$$

Thus, $$ShiftA2<=ShiftA1-1.34.$$

This is able to be satisfied easily in the case of a value like ShiftA1=15 and ShiftA2=7.

As above, the description for offsetA1 ends. The description continues as follows.

The first parameter normalization shift unit 3093162 and the second parameter normalization shift unit 3093163 derive a normalization first parameter a1s and a normalization second parameter a2s by right-shifting the first parameter a1 and the second parameter a2 by the first normalization shift value iScaleShiftA1 and the second normalization shift value iScaleShiftA2, respectively.

$$a1s=a1\gg iScaleShiftA1 \quad \text{formula (B-15)}$$

$$a2s=a2\gg iScaleShiftA2 \quad \text{formula (B-16)}$$

Thereby, the normalization first parameter a1s and the normalization second parameter a2s are normalized to values from 0 to 2 raised to the power of ShiftA1-1 and from 0 to 2 raised to the power of ShiftA2-1, respectively.

The table base parameter a derivation unit 3093164 derives a parameter a shift value iScaleShiftA with a following formula based on a difference between the first normalization shift value iScaleShiftA1 and the second normalization shift value iScaleShiftA2.

$$ScaleShiftA = ShiftA1 + iScaleShiftA2 - iScaleShiftA1 - iShift \quad \text{formula (B-18)}$$

Here, since iScaleShiftA1=Max(0, iScaleShiftA2−offsetA1), following formulas are obtained.

$$ScaleShiftA <= ShiftA1 + iScaleShiftA2 - (iScaleShiftA2 - offsetA1) - iShift$$

$$ScaleShiftA <= ShiftA1 + offsetA1 - iShift$$

Since offsetA1 is equal to or more than 0, a fixed shift value iShift is 5 to 8 bits, and ShiftA1 is 14 to 15 bits, ScaleShiftA is always equal to or more than 0.

In the above, since the first normalization shift value is derived by subtracting the predetermined constant from the second normalization shift value, ScaleShiftA, which is used when shifting is performed after multiplication by the inverse table, is always equal to or more than 0. Thus, branching according to whether ScaleShiftA is equal to or more than 0becomes unnecessary and the parameter a is able to be always derived by right-shifting, so that an effect of reducing an amount of calculation is achieved.

By referring to the inverse table value invTable which is defined according to the normalization second parameter a2s, the table base parameter a derivation unit 3093164 calculates a product of the inverse table value invTable and the normalization first parameter a1s and right-shifts the product by a table shift value (ScaleShiftA) to thereby derive a parameter a with a following formula.

$$a=(a1s*invtable[a2s])\gg(ScaleShiftA) \quad \text{formula (B-19)}$$

Here, invTable[ ] is the table described with FIG. 14.

Note that, the first parameter clip unit 3093161 and the first parameter normalization shift unit 3093162, which have been described, are processing for preventing a value of a1s* invTable[a2s] from exceeding 32 bits, and the second parameter normalization shift unit 3093163 is processing for preventing a2s from exceeding 2^ShiftA2-1.

A value of the parameter a is a ratio of the first parameter a1 to the second parameter a2 (corresponding to a value obtained by left-shifting a1/a2 by the fixed shift value iShift).

The derived parameter a is output to the parameter b derivation unit 309317 and the illumination compensation filter unit 30932.

The parameter b derivation unit 309317 derives a parameter b with a following formula by dividing a value obtained by subtracting a value, which is obtained by multiplying the sum X of the pixel values of the reference images by the parameter a to perform right-shifting by the fixed shift value iShift, from the sum Y of the pixel values of the adjacent decoding images, by the pixel number of the reference region.

$$b=(Y-((a*X)\gg iShift)+(1\ll(iCountShift-1)))\gg iCountShift \quad \text{formula (B-20)}$$

Here, the right-shifting of iCountShift corresponds to division by the pixel number of the reference region.

The illumination compensation filter unit 30932 uses the estimation parameter derived by the illumination parameter estimation unit 30931 to derive a prediction image predSamples'[ ] after illumination compensation from a prediction image predSamples[ ] before the illumination compensation. For example, when deriving the parameter b with the formula (B-20), a following formula is used.

$$predSamples'[x][y]=(a*predSamples[x][y]\gg iShift)+b \quad \text{formula (B-21)}$$

Note that, a parameter b derivation unit 309317' having a configuration different from that of the parameter b derivation unit 309317 may be used instead of the parameter b derivation unit 309317. In this case, the parameter b may be derived with a following formula by dividing a value obtained by subtracting a value, which is obtained by multiplying the sum X of the pixel values of the reference images by the parameter a, from a value obtained by left-shifting the sum Y of the pixel values of the adjacent decoding images by the fixed shift value iShift, by the pixel number of a reference pixel.

$$b=((Y\ll iShift)-((a*X))+(1\ll(iCountShift-1)))\gg iCountShift \quad \text{formula (B-20')}$$

Note that, when a bit depth of a pixel is 8 bits, a range of the pixel values x is a range of an 8-bit nonnegative variable, and a range of the parameter a is also a range of an 8-bit nonnegative variable, thus arithmetic operation is possible by performing arithmetic operation of ones both of which are the 8-bit nonnegative variables serving as a minimum bit number in software (unsigned char in C language). For example, in SIMD arithmetic operation using a 128-bit register, arithmetic operation of the 8-bit nonnegative variable is able to be performed by storing 16 pieces simultaneously in the register. That is, 16 pixels are able to be processed simultaneously, thus achieving an effect of high speed.

When the parameter b derivation unit 309317' having a configuration different from that of the parameter b derivation unit 309317 is used instead of the parameter b derivation unit 309317, an illumination compensation filter unit 30932' having a configuration different from that of the illumination compensation filter unit 30932 is used instead of the illumination compensation filter unit 30932. The illumination compensation filter unit 30932' derives a prediction image predSamples'[ ] after illumination compensation with a following formula from a prediction image predSamples[ ] before the illumination compensation.

$$predSamples'[x][y]=(a*predSamples[x][y]+b\gg iShift) \quad \text{formula (B-21')}$$

Since the first normalization shift value is derived by using the second normalization shift value in the illumination compensation unit 3093, an effect that processing for deriving the first normalization parameter becomes easy is achieved.

Moreover, since the first normalization shift value is derived by subtracting the predetermined constant from the second normalization shift value in the above, ScaleShiftA, which is used when shifting is performed after multiplication by the inverse table, is always equal to or more than 0. Thus, branching according to whether ScaleShiftA is equal to or more than 0 becomes unnecessary and the parameter a is able to be always derived by right-shifting, so that, an effect of reducing an amount of calculation is achieved.

(Illumination Compensation Unit 3093A)

An illumination compensation unit 3093A which is a modified example of the illumination compensation unit 3093 will be described below. The illumination compensation unit 3093A has almost the same configuration as that of the illumination compensation unit 3093, but is different in terms of using a parameter a derivation unit 309316A instead of the parameter a derivation unit 309316. Only the parameter a derivation unit 309316A will be described below.

The illumination compensation unit 3093A is composed of an illumination parameter estimation unit 30931A and the illumination compensation filter unit 30932. The illumination parameter estimation unit 30931A is composed of the integral value derivation unit 309312, the addition value derivation unit 309313, the first parameter derivation unit 309314, the second parameter derivation unit 309315, the parameter a derivation unit 309316A, and the parameter b derivation unit 309317.

Figure 22:
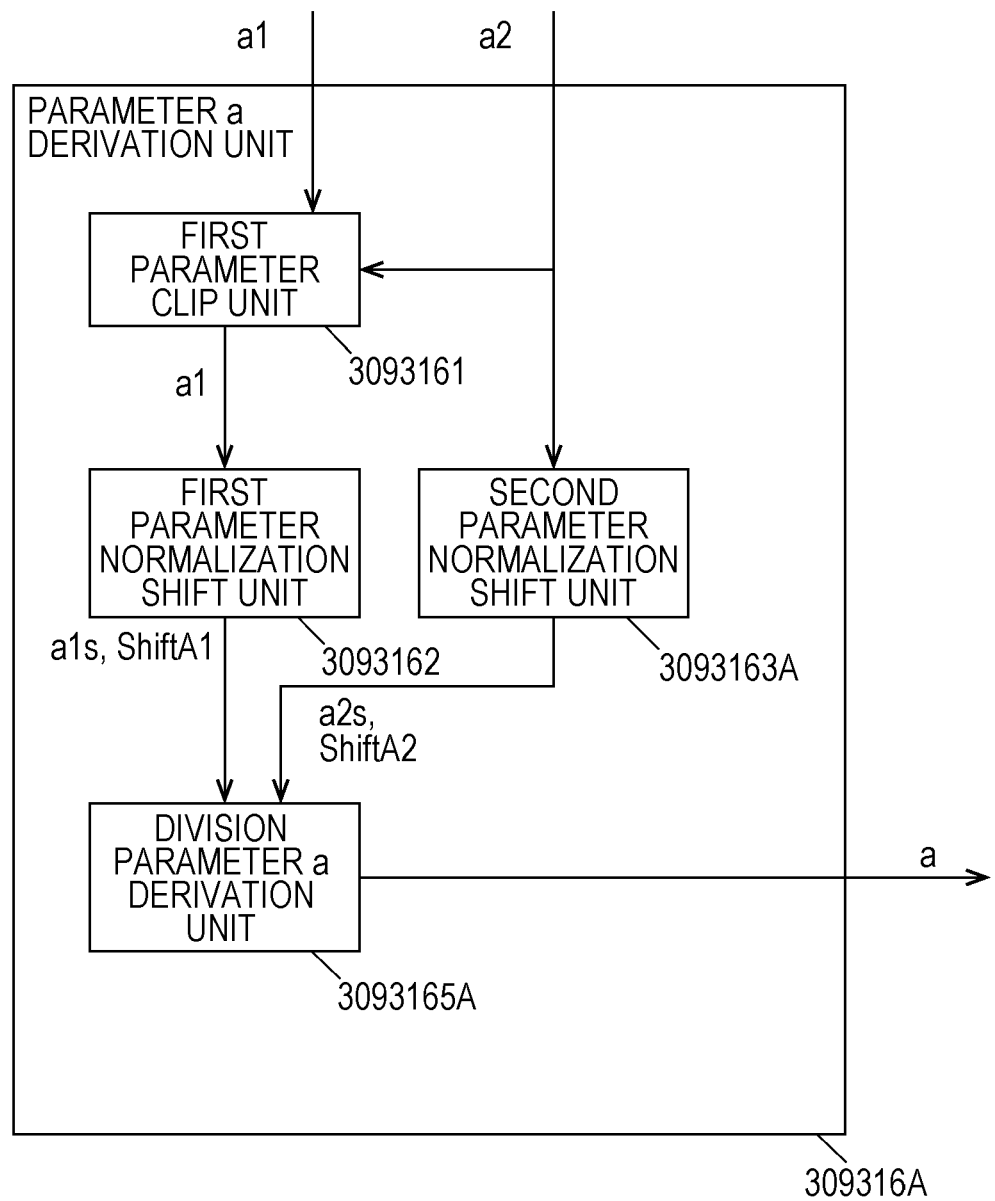
FIG. 22 is a block diagram illustrating a configuration of a parameter a derivation unit 309316A according to the present, embodiment.

FIG. 22 is a block diagram illustrating a configuration of the parameter a derivation unit 309316A. The parameter a derivation unit 309316A is composed of the first parameter clip unit 3093161, the first parameter normalization shift unit 3093162, a second parameter normalization shift unit 3093163A, and a division parameter a derivation unit 3093165A. The first parameter clip unit 3093161 has been described above, so that the description thereof will be omitted.

The second parameter normalization shift unit 3093163A. derives a second normalization shift value iScaleShiftA2 with ShiftA2=7 in the second parameter normalization shift unit 3093163 which has been described.

The first parameter normalization shift unit 3093162 derives the first normalization shift value iScaleShiftA1 with the formula (B-13) according to the second normalization shift value iScaleShiftA2, as has been described above.

The first normalization shift value iScaleShiftA1, which is derived, is output to the division parameter a derivation unit 3093165A.

The division parameter a derivation unit 3093165A derives the parameter a corresponding to a1/a2«iShift by using arithmetic operation similar to that of motion vector scaling.

The motion vector scaling is derived with following formulas.

$$tx=(16384+(Abs(td)\gg1))/td \qquad \text{formula (MV-1)}$$

$$distScaleFactor=Clip3(-4096, 4095, (tb*tx+32)\gg6) \qquad \text{formula (MV-2)}$$

$$mvLXA=Clip3(-32768, 32767, \text{Sign}$$
$$(distScaleFactor*mvLXA) *((Abs$$
$$(distScaleFactor*mvLXA)+127)\gg8)) \qquad \text{formula (MV-3)}$$

Here, mvLXA is a motion vector to be subjected to scaling, and scaling corresponding to mvLXA=mvLXA*tb/td is performed with the formulas above. Note that, division in the formula (MV-1) is division which includes rounding down to an integer, and is able to be represented by Floor for performing rounding down to an integer as follows.

$$tx=\text{Floor}((16384+(Abs(td)\gg1))/td \qquad \text{formula (MV-1')}$$

Here, td and tb are POC differences derived with following formulas and have values of −128 to 127.

$$td=\text{Clip3}(-128, 127, \text{DiffPicOrderCnt (currPic, refPicA)})$$

$$tb=\text{Clip3}(-128, 127, \text{DiffPicOrderCnt (currPic, refPicB)})$$

Here, DiffPicOrderCnt(x, y) is a function for deriving a POC difference between a picture x and a picture y. currPic is a target picture, and refPicA and refPicB are reference pictures.

In the above, arithmetic operation of tb/td is derived after deriving tx below once. Since a range of td is limited to −128 to 127, by deriving an inverse table invTableTX[ ], by which x below corresponds to −128 to 127, in advance, arithmetic operation of the division in the formula (MV-1) is able to be derived by the table.

$$\text{invTable}TX[x]=(16384+(Abs (x)\gg1))/x \qquad \text{formula (MV-2)}$$

This table is similar to the table of FIG. 14 used for LM prediction and illumination compensation. However, since ranges of the first parameter a1 and the second parameter a2 used for LM prediction and illumination compensation are larger than the POC, processing of the motion vector scaling is not able to be applied directly. Specifically, by comparison to a following formula (T-2), it is necessary to use the first parameter normalization shift unit 3093162A and the second parameter normalization shift unit 3093163A by designing invTable of FIG. 14 with ShiftA1=14 and ShiftA2=7. It is found that the parameter a for illumination compensation is able to derived by the same processing as that of the motion vector scaling.

$$tx=\text{Floor}((2^{\text{ShiftA1}}/x/2)/x) \text{ (when } x \text{ is other than 0)} \qquad \text{formula (T-2)}$$

Here, x=[0 . . 2^ShiftA2−1].

The second parameter normalization shift unit 3093163A derives a second normalization shift value iScaleShiftA2 with ShiftA2=7 in the second parameter normalization shift unit 3093163 which has been described.

The division parameter a derivation unit 3093165A derives a parameter a shift value iScaleShiftA with a following formula based on a difference between the first normalization shift value iScaleShiftA1 and the second normalization shift value iScaleShiftA2.

$$\text{ScaleShift}A=\text{Shift}A1+i\text{ScaleShift}A2-i\text{ScaleShift}A1-i\text{Shift} \qquad \text{formula (B-18)}$$

Further, the division parameter a derivation unit 3093165A derives the parameter a with a following formula.

$$tb=(16318+(a2s\gg1))/a2s \qquad \text{formula (B-19')}$$

$$a=(a1s*tb)\gg\text{Shift}A \qquad \text{formula (B-19'')}$$

That is, an intermediate parameter tb is derived by dividing a sum of a predetermined constant of 16318 and (a2s»1) by a2s with a use of the normalization second parameter a2s (here, Floor is performed after the division in the case of rounding down to an integer, that is, a point operation). Further, the parameter a is derived by right-shifting a product of the intermediate parameter tb and the normalization first parameter a1s by ShiftA.

Note that, it is also possible to derive the parameter a with a following formula by generating the table of FIG. 14 with ShiftA1=14 and ShiftA2=7.

$$a=(a2s*\text{invTable}[a2s])\gg(\text{ScaleShift}A) \quad \text{formula (B-19)}$$

In the illumination compensation unit 3093A composed as described above, the first normalization parameter a1s and the second normalization parameter a2s are derived by right-shifting the first parameter a1 and the second parameter a2 by the first normalization shift value iScaleShiftA1 and the second normalization shift value iScaleShiftA2 derived in accordance with predetermined constants ShiftA1=14 and ShiftA2=7 selected so as to allow processing which is the same as scaling of a motion vector. Then, the intermediate parameter tb is derived by the aforementioned processing and the parameter a is further derived. This makes it possible to use the same scaling as that of a motion vector also in illumination compensation, thus achieving an effect of reducing a scale of mounting.

Since the first normalization shift value is derived by using the second normalization shift value in the illumination compensation unit 3093A, an effect that processing for deriving the first normalization parameter becomes easy is achieved.

Moreover, since the first normalization shift value is derived by subtracting the predetermined constant from the second normalization shift value in the above, ScaleShiftA, which is used when shifting is performed after multiplication by the inverse table, is always equal to or more than 0. Thus, branching according to whether ScaleShiftA is equal to or more than 0 becomes unnecessary and the parameter a is able to be always derived by right-shifting, so that an effect of reducing an amount of calculation is achieved.

(Illumination Compensation unit 3093H)

An illumination compensation unit 3093H which is a modified example of the illumination compensation unit 3093 will be described below.

Figure 23:
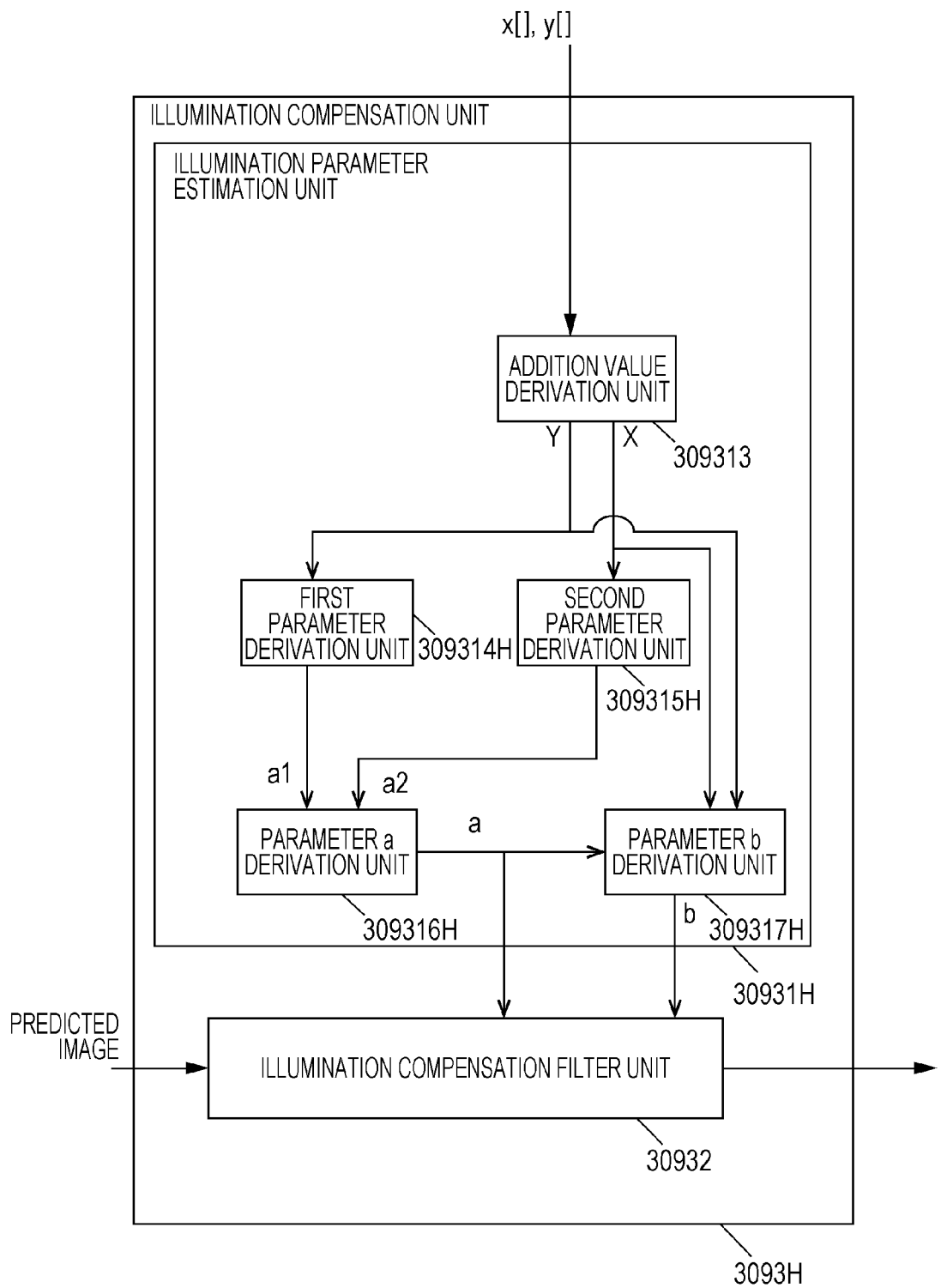
FIG. 23 is a block diagram illustrating a configuration of an illumination compensation unit 3093H according to the present, embodiment.

FIG. 23 is a block diagram illustrating a configuration of the illumination compensation unit 3093H. The illumination compensation unit 3093H is composed of an illumination parameter estimation unit 30931H and the illumination compensation filter unit 30932. Note that, means having the same number as that of the illumination parameter estimation unit 309311 has the same configuration, so that the description thereof will be omitted.

The illumination parameter estimation unit 30931H is composed of the addition value derivation unit 309313, a first parameter derivation unit 309314H, a second parameter derivation unit 309315H, the parameter a derivation unit 309316, and the parameter b derivation unit 309317.

The addition value derivation unit 309313, the parameter a derivation unit 309316, and the parameter b derivation unit 309317 are the same as means which have been described, so that the description thereof will be omitted.

The first parameter derivation unit 309314H derives a first parameter a1 with a following formula from the sum Y of the pixel values y of the adjacent decoding images.

$$a1=Y; \quad \text{formula (B-7')}$$

The second parameter derivation unit 309315H derives a second parameter a2 with a following formula from the sum X of the pixel values x of the reference images.

$$a2=X; \quad \text{formula (B-8')}$$

The first parameter a1 and the second parameter a2, which are derived, are output to the parameter a derivation unit 309316.

The illumination compensation unit 3093H does not include the integral value derivation unit 309312 which derives a second-order term serving as a sum of products of pixels compared to the illumination compensation unit 3093, and includes only the addition value derivation unit 309313 which derives a first-order term serving as a sum of pixels. Thus, an illumination variation parameter is able to be derived with relatively simple processing. However, the illumination compensation unit 3093 which uses a second-order term has higher coding efficiency.

The illumination compensation unit 3093H derives the first normalization shift value by using the second normalization shift value, so that an effect that processing for deriving the first normalization parameter becomes easy is achieved.

Note that, when a bit depth of an image is 10 bits or less, the parameter a derivation unit 309316 may be composed so as not to include the first parameter normalization shift unit 3093162. That is, the first parameter may be used as the normalization first parameter a1s like a following formula (B-15') with iScaleShiftA1=0.

$$a1s=a1 \quad \text{formula (B-15')}$$

This follows a following formula.

When a bit depth of an image is bitDepth, the first parameter a1 is able to be treated by a bit number of bitDepth+7 or less from a sum of the bit depth bitDepth of a pixel value and a log 7 of 2 of a maximum value 128 of a reference pixel number. Since a maximum value of the inverse table value is 2 raised to the power of ShiftA1, a condition that a product is 32 bits or less is bitDepth+7+ShiftA1<=32.

When it is modified, the following is obtained.

$$\text{bitDepth}<=25-\text{Shift}A1$$

When ShiftA1 is 14 or 15, this formula is satisfied if bitDepth<=10, so that the first parameter normalization shift unit 3093162 becomes unnecessary when the bit depth of the pixel is 10 bits or less.

(Illumination Compensation unit 3093HA)

An illumination compensation unit 3093HA which is a modified example of the illumination compensation unit 3093 will be described below. The illumination compensation unit 3093HA has almost the same configuration as that of the illumination compensation unit 3093H, but is different in terms of using the parameter a derivation unit 309316A instead of the parameter a derivation unit 309316. Components including the parameter a derivation unit 309316A have been described, so that description thereof will be omitted.

The parameter a derivation unit 309316A uses division in order to derive the parameter a differently from the parameter a derivation unit 309316, and this division is the same as following processing used for scaling of a motion vector, so that an effect of reducing a scale of mounting is achieved.

The illumination compensation unit 3093HA includes only the addition value derivation unit 309313 which derives a first-order term serving as a sum of pixels. Thus, an illumination variation parameter is able to be derived with relatively simple processing.

Note that, when a bit depth of an image is 10 bits or less, the parameter a derivation unit 309316A may be composed so as not to include the first parameter normalization shift unit 3093162. That is, the first parameter may be used as the normalization first parameter a1s like a following formula (B-15') with iScaleShiftA1=0.

$$a1s=a1 \quad \text{formula (B-15')}$$

(Illumination Compensation Unit 3093O)

An illumination compensation unit 3093O which is a modified example of the illumination compensation unit 3093 will be described below.

Figure 24:
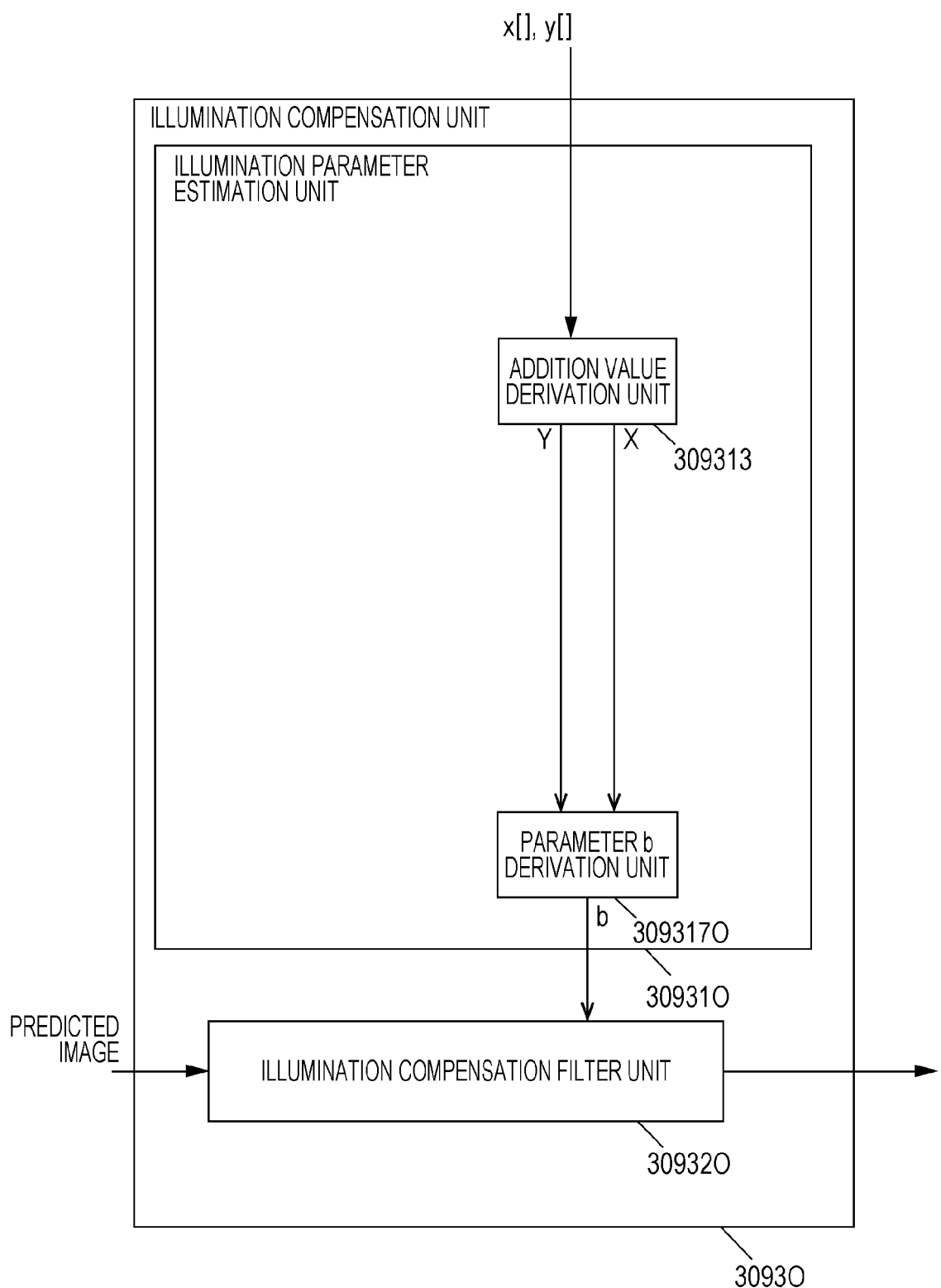
FIG. 24 is a block diagram illustrating a configuration of an illumination compensation unit 3093O according to the present embodiment.

FIG. 24 is a block diagram illustrating a configuration of the illumination compensation unit 3093O. The illumination compensation unit 3093O is composed of an illumination parameter estimation unit 30931O and an illumination compensation filter unit 30932O. The illumination parameter estimation unit 30931O is composed of the addition value derivation unit 309313 and a parameter b derivation unit 30931 7O.

The illumination parameter estimation unit 30931O sets the pixels C (reference image regions) neighboring the reference block corresponding to the target block in the reference layer image and the pixels L (target image regions) neighboring the target block in the target layer image, which are illustrated in FIG. 13, as pixel values x[ ] of the reference images and pixel values y[ ] of the adjacent decoding images, respectively, and based on the pixel values x[ ] of the reference images and the pixel values y[ ] of the adjacent decoding images, derives a parameter a and a parameter b which are parameters when the pixel values y[ ] of the adjacent decoding images are prediction from the pixel values x of the reference images.

The addition value derivation unit 309313 derives a sum Y of the pixel values y of the adjacent decoding images and a sum X of the pixel values x of the reference images with a formula (B-2) and a formula (B-3) as follows.

$$X = \Sigma x[i] \quad \text{formula (B-2)}$$

$$Y = \Sigma y[i] \quad \text{formula (B-3)}$$

Here, $\Sigma$ is a sum with respect to a reference region, by which a sum with respect to an index i for designating pixels of the reference region is derived. y[i] is a pixel value in an index i of the adjacent decoding images, and x[i] is a pixel value in an index i of the reference images. A count shift value iCountShift is a log of 2 of a size of the reference region.

$$i\text{CountShift} = \log 2 \text{ (pixel number of the reference region)} \quad \text{formula (B-6)}$$

The parameter b derivation unit 30931 7O derives a parameter b with a following formula by dividing a difference between the sum Y of the pixel values of the adjacent decoding images and the sum X of the pixel values of the reference images by the pixel number of the reference region.

$$b = (Y - X + (1 \ll (i\text{CountShift} - 1))) \gg i\text{CountShift} \quad \text{formula (B-20'')}$$

Note that, right-shifting of iCountShift corresponds to division by the pixel number of the reference region.

The illumination compensation filter unit 30932O uses the estimation parameter derived by the illumination parameter estimation unit 30931O to derive a prediction image predSamples'[ ] after illumination compensation from a prediction image predSamples[ ] before the illumination compensation. For example, when deriving the parameter b with the formula (B-20), a following formula is used.

$$\text{predSamples'}[x][y] = \text{predSamples}[x][y] + b \quad \text{formula (B-21)}$$

(Weight Prediction)

The weight prediction unit 3094 generates a prediction picture block P (prediction image) by multiplying a motion disparity image predSamplesLX, which is to be input, by a weight coefficient. When residual prediction and illumination compensation are performed, the motion disparity image predSamplesLX, which is to be input, is an image subjected to them. When one of the reference list utilization lists (predFlagL0 or predFlagL1) is 1 (in the case of uni-prediction) and when weight prediction is not used, processing with a following formula for matching the motion disparity image predSamplesLX, which is input, (LX is L0 or L1) to a pixel bit number is performed.

$$\text{predSamples}[x][y] = \text{Clip3}(0, (1 \ll \text{bitDepth}) - 1, (\text{predSamplesLX}[x][y] + \text{offset1}) \gg \text{shift1})$$

Here, shift1 = 14 − bitDepth and offset1 = 1 ≪ (shift1 − 1).

When both of the reference list utilization lists (predFlagL0 or predFlagL1) are 1 (in the case of bi-prediction) and when weight prediction is not used, processing with a following formula for averaging the motion disparity images pred SamplesL0 and predSamplesL1, which are input, to match to a pixel bit number is performed.

$$\text{predSamples}[x][y] = \text{Clip3}(0, (1 \ll \text{bitDepth}) - 1, (\text{predSamplesL0}[x][y] + \text{predSamplesL1}[x][y] + \text{offset2}) \gg \text{shift2})$$

Here, shift2 = 15 − bitDepth and offset2 = 1 ≪ (shift2 − 1).

Further, in the case of uni-prediction and in the case of performing weight prediction, the weight prediction unit 3094 derives a weight prediction coefficient w0 and an offset o0 for performing processing with a following formula.

$$\text{predSamples}[x][y] = \text{Clip3}(0, (1 \ll \text{bitDepth}) - 1, ((\text{predSamplesLX}[x][y] * w0 + 2 \log 2WD - 1) \gg \log 2WD) + o0)$$

Here, log 2WD is a variable indicating a predetermined shift amount.

Further, in the case of bi-prediction and in the case of performing weight prediction, the weight prediction unit 3094 derives weight prediction coefficients w0 and w1, and o0 and o1 for performing processing with a following formula.

$$\text{predSamples}[x][y] = \text{Clip3}(0, (1 \ll \text{bitDepth}) - 1, (\text{predSamplesL0}[x][y] * w0 + \text{predSamplesL1}[x][y] * w1 ((o0 + o1 + 1) \ll \log 2WD)) \gg (\log 2WD + 1))$$

(Configuration of Image Coding Device)

Figure 32:
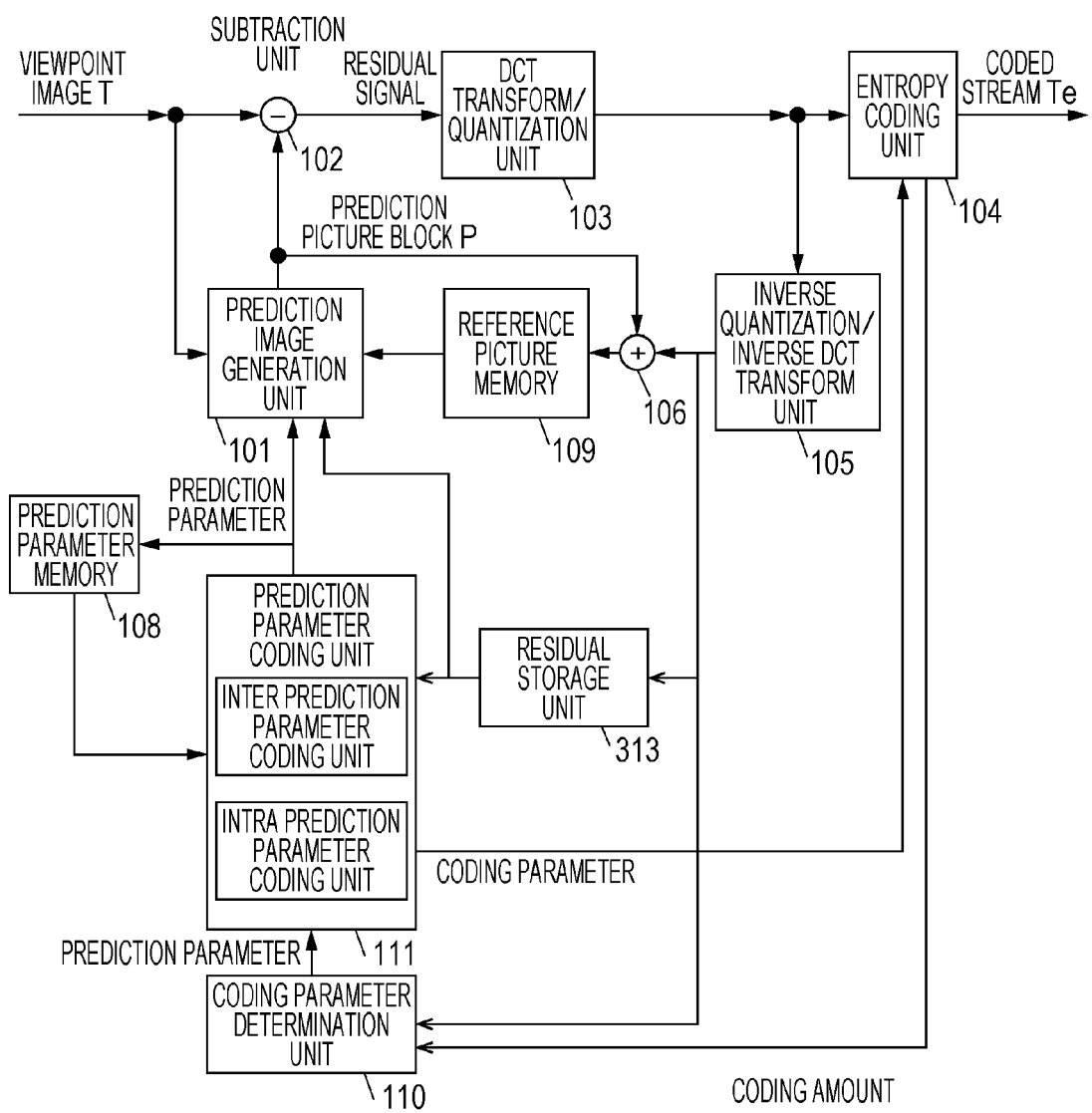
FIG. 32 is a block diagram illustrating a configuration of an image coding device according to the present embodiment.

Next, a configuration of the image coding device 11 according to the present embodiment will be described. FIG. 32 is a block diagram illustrating the configuration of the image coding device 11 according to the present embodiment. The image coding device 11 is composed by including a prediction image generation unit 101, a subtraction unit 102, a DCT/quantization unit 103, an entropy coding unit 104, an inverse quantization/inverse DCT unit 105, an addition unit 106, a prediction parameter memory (prediction parameter storage unit, frame memory) 108, a reference picture memory (reference image storage unit, frame memory) 109, a coding parameter determination unit 110, a prediction parameter coding unit 111, and a residual storage unit 313 (residual recording unit). The prediction parameter coding unit 111 is composed by including an inter prediction parameter coding unit 112 and an intra prediction parameter coding unit 113.

As to each picture for each viewpoint of a layer image T which is input from, outside, the prediction image generation unit 101 generates a prediction picture block P for each block which is a region obtained by dividing the picture. Here, the prediction image generation unit 101 reads a reference picture block from the reference picture memory 109 based on a prediction parameter input from the prediction parameter coding unit 111. The prediction parameter input from the prediction parameter coding unit 111 is, for example, a motion vector or a disparity vector. The prediction image generation unit 101 reads the reference picture block of a block at a position indicated by the motion vector or the disparity vector, which is prediction with a coding target block as a start point. The prediction image generation unit 101 uses one prediction method among a plurality of prediction methods for the read reference picture block to generate the prediction picture block P. The prediction image generation unit 101 outputs the prediction picture block P, which is generated, to the subtraction unit 102. Note that, the prediction image generation unit 101 operates in the same manner as the prediction image generation unit 308 which has been described, so that detailed description for the generation of the prediction picture block P will be omitted.

For selecting the prediction method, the prediction image generation unit 101 selects, for example, a prediction method which minimizes an error value based on a difference between a signal value for each pixel of the blocks included in the layer image and a signal value for each corresponding pixel of the prediction picture block P. The method for selecting the prediction method is not limited thereto.

When the picture to be coded is a base view picture, the plurality of prediction methods are intra prediction, motion prediction, and merge prediction. The motion prediction is prediction between display times among inter prediction described above. The merge prediction is prediction which uses a reference picture block same as a block which has been already coded and which is in a predefined range from a coding target block, and a prediction parameter. When the picture to be coded is a non-base view picture, the plurality of prediction methods are intra prediction, motion prediction, merge prediction, and disparity prediction. The disparity prediction (disparity prediction) is prediction between different layer images (different viewpoint images) among the inter prediction described above. Further, there are motion prediction, merge prediction, and disparity prediction. There are prediction for performing additional prediction (residual prediction and illumination compensation) and prediction for not performing it, with respect to the disparity prediction (disparity prediction).

The prediction image generation unit 101, when having selected the intra prediction, outputs a prediction mode predMode indicating the intra prediction mode used when generating the prediction picture block P, to the prediction parameter coding unit 111. Note that, as one of chroma prediction modes IntraPredModeC of the intra prediction, LM prediction using the LM prediction unit 3093 is used.

The prediction image generation unit 101, when having selected the motion prediction, stores a motion vector mvLX used when generating the prediction picture block P, in the prediction parameter memory 108 to output to the inter prediction parameter coding unit 112. The motion vector mvLX indicates a vector from a position of the coding target block to a position of the reference picture block when generating the prediction picture block P. Information indicating the motion vector mvLX includes information indicating a reference picture (for example, a reference picture index refIdxLx, a picture order number POC), and may be one indicating a prediction parameter. Moreover, the prediction image generation unit 101 outputs the prediction mode predMode indicating the inter prediction mode to the prediction parameter coding unit 111.

The prediction image generation unit 101, when having selected the disparity prediction, stores a disparity vector used when generating the prediction picture block P, in the prediction parameter memory 108 to output to the inter prediction parameter coding unit 112. The disparity vector dvLX indicates a vector from a position of the coding target block to a position of the reference picture block when generating the prediction picture block P. Information indicating the disparity vector dvLX includes information indicating a reference picture (for example, a reference picture index refIdxLx, a view ID view_id), and may be one indicating a prediction parameter. Moreover, the prediction image generation unit 101 outputs the prediction mode predMode indicating the inter prediction mode to the prediction parameter coding unit 111.

The prediction image generation unit 101, when having selected the merge prediction, outputs a merge index merge_idx indicating the selected reference picture block to the inter prediction parameter coding unit 112. Moreover, the prediction image generation unit 101 outputs the prediction mode predMode indicating the merge prediction mode to the prediction parameter coding unit 111.

In the motion prediction, the disparity prediction, and the merge prediction, which are described above, the prediction image generation unit 101, when a residual prediction flag res_pred_flag indicates performing residual prediction, performs the residual prediction in the residual prediction unit 3092 included in the prediction image generation unit 101 as has been described above, and when an illumination compensation flag ic_enable_flag indicates performing illumination compensation, performs illumination compensation prediction in the illumination compensation unit 3093 included in the prediction image generation unit 101 as has been described above. The illumination compensation unit 3093A, the illumination compensation unit 3093H, or the illumination compensation unit 3093HA may be used instead of the illumination compensation unit 3093.

The subtraction unit 102 subtracts a signal value of the prediction picture block P input from the prediction image generation unit 101 from a signal value of the corresponding block of the layer image T, which is input from outside, for each pixel, and generates a residual signal. The subtraction unit 102 outputs the generated residual signal to the DCT/quantization unit 103 and the coding parameter determination unit 110.

The DCT/quantization unit 103 performs DCT for the residual signal input from, the subtraction unit 102 and calculates a DCT coefficient. The DCT/quantization unit 103 quantizes the calculated DCT coefficient to obtain a quantization coefficient. The DCT/quantization unit 103 outputs the obtained quantization coefficient to the entropy coding unit 104 and the inverse quantization/inverse DCT unit 105.

To the entropy coding unit 104, the quantization coefficient is input from the DCT/quantization unit 103 and a coding parameter is input from the coding parameter determination unit 110. Examples of the coding parameter which is input include codes such as a reference picture index refIdxLX, a vector index mvp_LX_idx, a difference vector mvdLX, a prediction mode predMode, and a merge index merge_idx.

The entropy coding unit 104 performs entropy coding of the quantization coefficient and the coding parameter, which are input, to generate a coded stream Te, and outputs the coded stream Te, which is generated, to outside.

The inverse quantization/inverse DCT unit 105 performs inverse quantization of the quantization coefficient input from the DCT/quantization unit 103 to obtain a DCT coefficient. The inverse quantization/inverse DCT unit 105 performs inverse DCT of the obtained DCT coefficient and calculates a decoding residual signal. The inverse quantization/inverse DCT unit 105 outputs the calculated decoding residual signal to the addition unit 106.

The addition unit 106 adds, for each pixel, the signal value of the prediction picture block P input from the prediction image generation unit 101, and the signal value of the decoding residual signal input from the inverse quantization/inverse DCT unit 105, and generates a reference picture block. The addition unit 106 stores the generated reference picture block in the reference picture memory 109.

The prediction parameter memory 108 stores the prediction parameter generated by the prediction parameter coding unit 111 at a predefined position for each picture and block which are to be coded.

The reference picture memory 109 stores the reference picture block generated by the addition unit 106 at a predefined position for each picture and block which are to be coded.

The coding parameter determination unit 110 selects one set of a plurality of sets of coding parameters. The coding parameters are the prediction parameter described above and a parameter to be coded, which is generated in association with this prediction parameter. The prediction image generation unit 101 uses each of the set of the coding parameters to generate the prediction picture block P.

The coding parameter determination unit 110 calculates a cost value indicating volume of an information amount and a coding error for each of a plurality of sets. The cost value is, for example, a sum of a coding amount and a value obtained by multiplying a square error by a coefficient λ. The coding amount is an information amount of the coded stream Te obtained by performing entropy coding of the quantization error and the coding parameter. The square error is a total sum of square values of residual values of the residual signal calculated by the subtraction unit 102 among pixels. The coefficient λ is an actual number larger than zero, which is set in advance. The coding parameter determination unit 110 selects a set of coding parameters, the calculated cost value of which is the smallest. Thereby, the entropy coding unit 104 outputs the selected set of coding parameters to outside as the coded stream Te, and does not output sets of coding parameters, which are not selected.

The prediction parameter coding unit 111 derives prediction parameters, which are used when generating a prediction picture, based on the parameter input from the prediction image generation unit 101, and codes the derived prediction parameters to generate a set of coding parameters. The prediction parameter coding unit 111 outputs the generated set of coding parameters to the entropy coding unit 104.

The prediction parameter coding unit 111 stores, in the prediction parameter memory 108, a prediction parameter corresponding to one selected by the coding parameter determination unit 110 among the generated sets of coding parameters.

When the prediction mode predMode input from the prediction image generation unit 101 indicates the inter prediction mode, the prediction parameter coding unit 111 causes the inter prediction parameter coding unit 112 to operate. When the prediction mode predMode indicates the intra prediction mode, the prediction parameter coding unit 111 causes the intra prediction parameter coding unit 113 to operate.

The inter prediction parameter coding unit 112 derives an inter prediction parameter based on the prediction parameter input from the coding parameter determination unit 110. The inter prediction parameter coding unit 112 includes the same configuration as the configuration of the inter prediction parameter decoding unit 303 (refer to FIG. 5, etc.) for deriving the inter prediction parameter, as the configuration for deriving the inter prediction parameter. The configuration of the inter prediction parameter coding unit 112 will be described below.

The intra prediction parameter coding unit 113 defines an intra prediction mode IntraPredMode indicated by the prediction mode predMode input from the coding parameter determination unit 110, as a set of inter prediction parameters.

(Configuration of Inter Prediction Parameter Coding Unit)

Next, the configuration of the inter prediction parameter coding unit 112 will be described. The inter prediction parameter coding unit 112 is means corresponding to the inter prediction parameter decoding unit 303.

Figure 33:
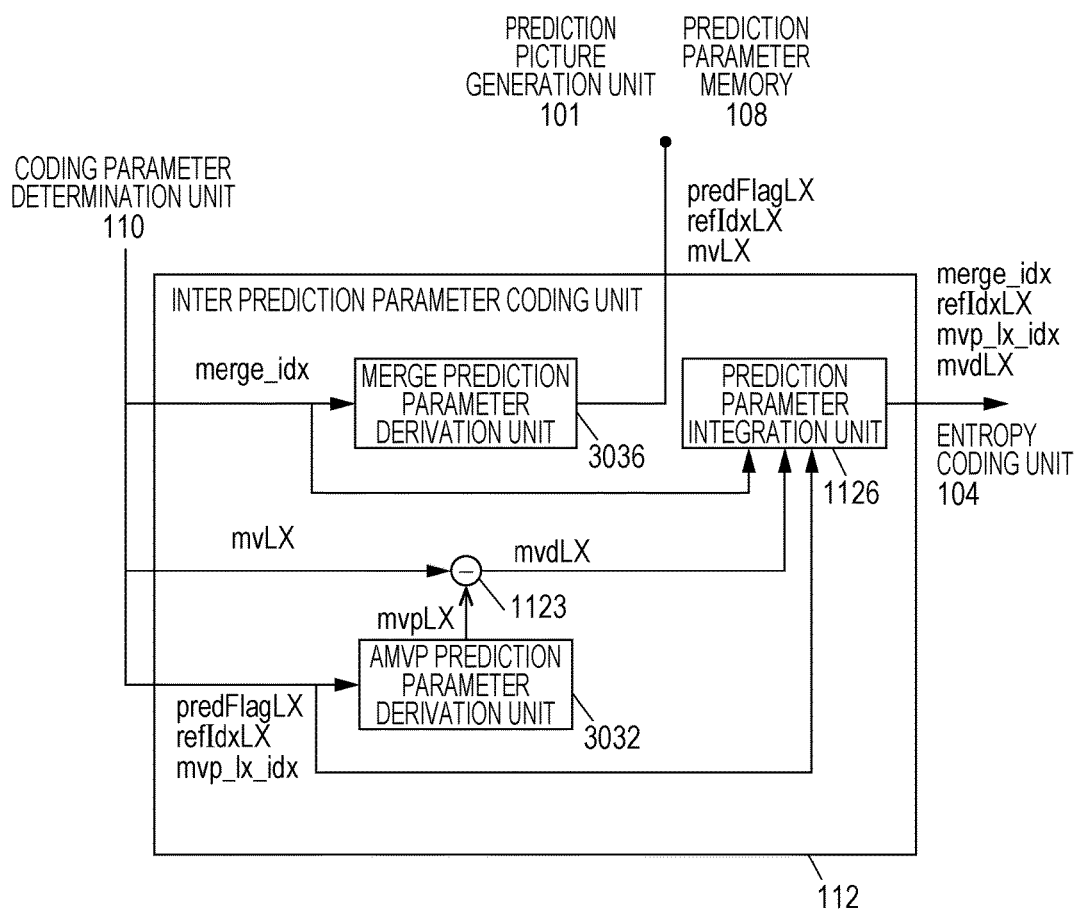
FIG. 33 is a schematic view illustrating a configuration of an inter prediction parameter coding unit according to the present embodiment.

FIG. 33 is a schematic view illustrating the configuration of the inter prediction parameter coding unit 112 according to the present embodiment.

The inter prediction parameter coding unit 112 is composed by including an inter prediction parameter coding control unit 1031, a merge prediction parameter derivation unit 1121, an AMVP prediction parameter derivation unit 1122, a subtraction unit 1123, and a prediction parameter integration unit 1126.

The merge prediction parameter derivation unit 1121 has a similar configuration to that of the merge prediction parameter derivation unit 3036 (refer to FIG. 7) described above.

The inter prediction parameter coding control unit 1031 instructs the entropy coding unit 104 to decode a code (syntax element) associated with inter prediction, and codes a code (syntax element) included in coding data, for example, a partition mode part_mode, a merge flag merge_flag, a merge index merge_idx, an inter prediction flag inter_pred_idcinter_pred_idc, a reference picture index refIdxLX, a prediction vector index mvp_LX_idx, or a difference vector mvdLX.

The inter prediction parameter coding control unit 1031 is composed by including an additional prediction flag coding unit 10311, a merge index coding unit 10312, a vector candidate index coding unit 10313, and a partition mode coding unit, a merge flag coding unit, an inter prediction flag coding unit, a reference picture index coding unit, and a vector difference coding unit, which are not illustrated. The partition mode coding unit, the merge flag coding unit, the merge index coding unit, the inter prediction flag coding unit, the reference picture index coding unit, the vector candidate index coding unit 10313, and the vector difference coding unit code a partition mode part_mode, a merge flag merge_flag, a merge index merge_idx, an inter prediction flag inter_pred_idcinter_pred_idc, a reference picture index refIdxLX, a prediction vector index mvp_LX_idx, and a difference vector mvdLX, respectively.

The additional prediction flag coding unit 1031 codes the illumination compensation flag ic_enable_flag and the residual prediction flag res_pred_flag in order to indicate whether or not additional prediction is to be performed.

When the prediction mode predMode input from the prediction image generation unit 101 indicates a merge prediction mode, a merge index merge_idx is input to the merge prediction parameter derivation unit 1121 from the coding parameter determination unit 110. The merge index merge_idx is output to the prediction parameter integration unit 1126. The merge prediction parameter derivation unit 1121 reads, from the prediction parameter memory 108, a reference picture index refIdxLX and a vector mvLX of a reference block indicated by the merge index merge_idx among merge candidates. The merge candidates are reference blocks which are in a predefined range from a coding target block serving as a coding target (for example, among reference blocks adjacent to a lower left end, an upper left end, and an upper right end of the coding target block) and reference blocks for which coding processing is completed.

The AMVP prediction parameter derivation unit 1122 has a similar configuration to that of the AMVP prediction parameter derivation unit 3032 (refer to FIG. 8) described above.

When the prediction mode predMode input from the prediction image generation unit 101 indicates an inter prediction mode, a vector mvLX is input to the AMVP prediction parameter derivation unit 1122 from the coding parameter determination unit 110. The AMVP prediction parameter derivation unit 1122 derives a prediction vector mvpLX based on the input vector mvLX. The AMVP prediction parameter derivation unit 1122 outputs the derived prediction vector mvpLX to the subtraction unit 1123. Note that, the reference picture index refIdx and the vector index mvp_LX_idx are output to the prediction parameter integration unit 1126.

The subtraction unit 1123 subtracts the prediction, vector mvpLX input from the AMVP prediction parameter derivation unit 1122 from the vector mvLX input from the coding parameter determination unit 110 to generate a difference vector mvdLX. The difference vector mvdLX is output to the prediction parameter integration unit 1126.

When the prediction mode predMode input from the prediction image generation unit 101 indicates the merge prediction mode, the prediction parameter integration unit 1126 outputs the merge index merge_idx, which is input from the coding parameter determination unit 110, to the entropy coding unit 104.

When the prediction mode predMode input from the prediction image generation unit 101 indicates the inter prediction mode, the prediction parameter integration unit 1126 performs following processing.

The prediction parameter integration unit 1126 integrates the reference picture index refIdxLX and the vector index mvp_LX_idx which are input from the coding parameter determination unit 110, and the difference vector mvdLX input from the subtraction unit 1123. The prediction parameter integration unit 1126 outputs an integrated code to the entropy coding unit 104.

(Second Embodiment)

An embodiment of the invention will be described below with reference to drawings. An image coding device 11 and an image decoding device 31 in a second embodiment use, as illumination compensation means, components of an illumination compensation 3093S, an illumination compensation 3093AS, an illumination compensation 3093HS, an illumination compensation 3093S, and an illumination compensation 3093OS, instead of the illumination compensation 3093, the illumination compensation 3093A, the illumination compensation 3093H, the illumination compensation 3093, and the illumination compensation 3093O, which have been described in the first embodiment. In the second embodiment, an illumination variation parameter is calculated by referring to and subsampling pixel values x of reference images and pixel values y of adjacent decoding images.

Figure 25:
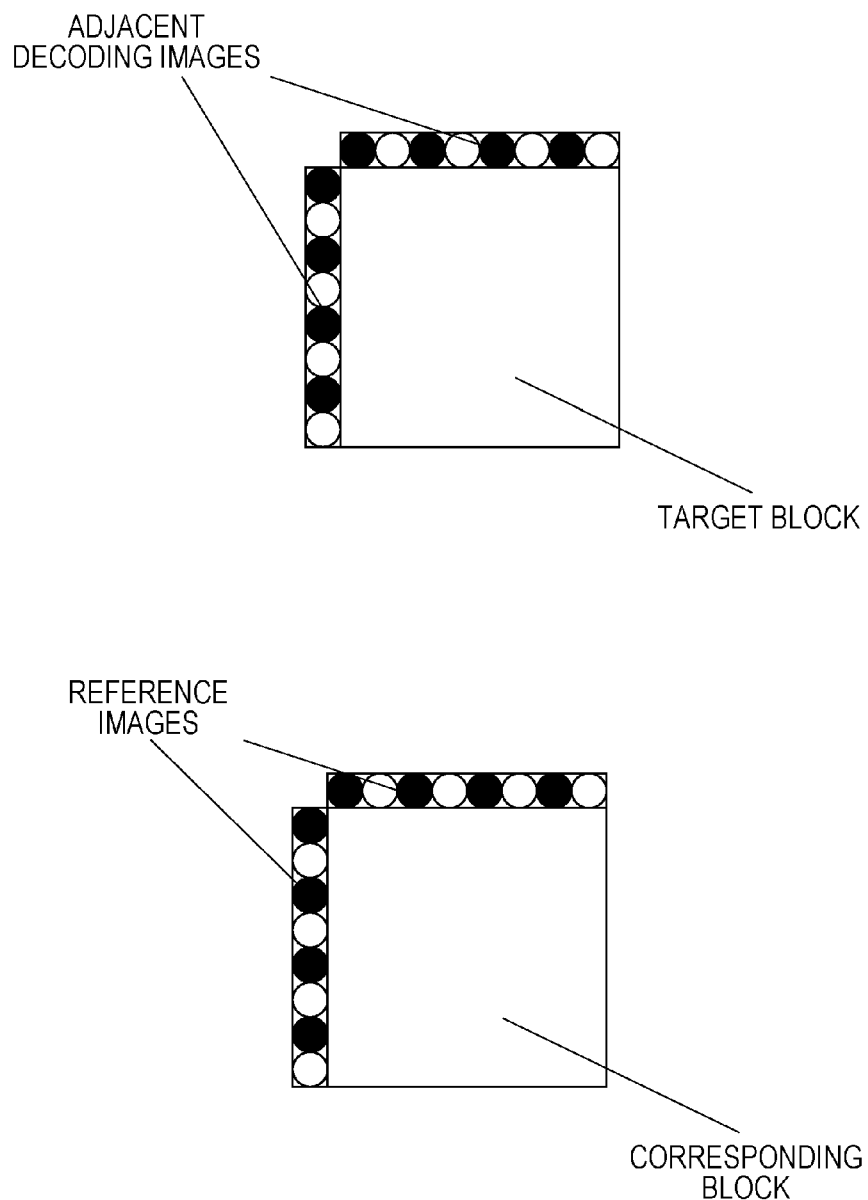
FIG. 25 is a view for explaining reference pixels for illumination compensation according to a second embodiment.

FIG. 25 is a view for explaining reference pixels for illumination compensation of the second embodiment. As illustrated in FIG. 25, in both of the pixel values y of the adjacent decoding images adjacent to a target block and the pixel values x of the reference images adjacent to a corresponding block, only pixels which are sampled by subsampling of 2 to 1 are referred to.

(Illumination Compensation Unit 3093S)

The illumination compensation unit 3093S is composed of an illumination parameter estimation unit 30931S and an illumination compensation filter unit 30932. The illumination parameter estimation unit 30931S is composed of an integral value derivation unit 309312S, an addition value derivation unit 309313S, a first parameter derivation unit 309314, a second parameter derivation unit 309315, a parameter a derivation unit 309316, and a parameter b derivation unit 309317.

The addition value derivation unit 309313S derives a sum Y of the pixel values y of the adjacent decoding images and a sum X of the pixel values x of the reference images with a formula (B-2) and a formula (B-3) as follows.

The integral value derivation unit 309312S derives a sum XY of products of the pixel values y of the adjacent decoding images and the pixel values x of the reference images, and a sum XX of squares of the pixel values of the reference images, with following formulas (B-4) to (B-5). Before addition as follows, X, Y, XY and XX are initialized to 0.

$$X = \Sigma x[i*2] \quad \text{formula (B-2)}$$

$$Y = \Sigma y[i*2] \quad \text{formula (B-3)}$$

$$XX+ = \Sigma(x[i*2]*x[i*2]) \quad \text{formula (B-4)}$$

$$XY+ = \Sigma(y[i*2]*y[i*2]) \quad \text{formula (B-5)}$$

Here, $\Sigma$ is a sum with respect to a reference region, by which a sum with respect to an index i for designating pixels of the reference region is derived. y[i] is a pixel value in an index i of the adjacent decoding images, x[i] is a pixel value in an index i of the reference images. A count shift value iCountShift is a log of 2 of a size of the reference region. Here, the pixel values y of the adjacent decoding images and the pixel values x of the reference images are referred to after doubling the index i. i*2 takes discrete values as 0, 2, 4, . . . , so that it is indicated that pixels of the adjacent decoding images and pixels of the reference images are subsampled and referred to in the addition value derivation unit 309313. Note that, in the subsampling, subsampling for pruning pixels in a vertical direction is performed in the case of the adjacent decoding image adjacent to the left of the target block and the reference region adjacent to the left of the corresponding block (in which a Y coordinate takes discrete values such as 0, 2, 4, for example, by accessing with an index of *2), and subsampling for pruning pixels in a horizontal direction is performed in the case of the adjacent decoding image adjacent to the upper side of the target block and the reference region adjacent to the upper side of the corresponding block (in which an X coordinate takes discrete values such as 0, 2, 4, for example, by accessing with an index of *2).

The illumination parameter estimation unit 30931S derives a parameter a which is an inclination component used for illumination compensation at the illumination compensation filter unit 30932 and a parameter b which is an offset component, by using addition values derived from the subsampled pixels. An effect of reducing an amount of calculation for calculating the illumination variation parameter by subsampling is achieved.

(Illumination Compensation Unit 3093AS)

The illumination compensation unit 3093AS which is a modified example of an illumination compensation unit 3093S*v* will be described below.

The illumination compensation unit 3093AS is composed of an illumination parameter estimation unit 30931AS and the illumination compensation filter unit 30932.

The illumination compensation unit 3093AS is composed of the illumination parameter estimation unit 30931AS and the illumination compensation filter unit 30932. The illumination parameter estimation unit 30931AS is composed of the integral value derivation unit 309312S, the addition value derivation unit 309313S, the first parameter derivation unit 309314, the second parameter derivation unit 309315, the parameter a derivation unit 309316A, and the parameter b derivation unit 309317.

The parameter a derivation unit 309316AS in the aforementioned configuration derives a first normalization parameter a1s and a second normalization parameter a2s by right-shifting a first parameter a1 and a second parameter a2 by a first normalization shift value iScaleShiftA1 and a second normalization shift value iScaleShiftA2 which are derived in accordance with predetermined constants ShiftA1=14 and ShiftA2=7 selected so as to allow the same processing as the scaling of a motion vector. Then, an intermediate parameter tb is derived by the aforementioned processing and a parameter a is further derived. This makes it possible to use the same scaling as that of the motion vector also in illumination compensation, thus achieving an effect of reducing a scale of mounting.

The illumination parameter estimation unit 30931AS in the aforementioned configuration uses the integral value derivation unit 309312S and the addition value derivation unit 309313S to derive the parameter a which is an inclination component used for the illumination compensation at the illumination compensation filter unit 30932 and a parameter b which is an offset component, by using addition values derived from the subsampled pixels. An effect of reducing an amount of calculation for calculating the illumination variation parameter by subsampling is achieved.

(Illumination Compensation Unit 3093HS)

The illumination compensation unit 3093HS which is a modified example of the illumination compensation unit 3093S will be described below.

The illumination compensation unit 3093HS is composed of an illumination parameter estimation unit 30931HS and the illumination compensation filter unit 30932.

The illumination parameter estimation unit 30931HS is composed of the addition value derivation unit 309313S, the first parameter derivation unit 309314H, the second parameter derivation unit 309315H, the parameter a derivation unit 309316, and the parameter b derivation unit 309317

The addition value derivation unit 309313S derives the sum Y of the pixel values y of the adjacent decoding images and the sum X of the pixel values x of the reference images with a formula (B-2) and a formula (B-3) as follows.

$$X = \Sigma x[i*2] \quad \text{formula (B-2)}$$

$$Y = \Sigma y[i*2] \quad \text{formula (B-3)}$$

The illumination parameter estimation unit 30931HS in the aforementioned configuration uses the addition value derivation unit 309313S to derive a parameter b which is an offset component used for the illumination compensation at the illumination compensation filter unit 30932 by using addition values derived from the subsampled pixels. An effect of reducing an amount of calculation for calculating the illumination variation parameter by subsampling is achieved.

(Illumination Compensation Unit 3093HAS)

The illumination compensation unit 3093HAS which is a modified example of the illumination compensation unit 3093S will be described below. The illumination compensation unit 3093HAS has almost the same configuration as that of the illumination compensation unit 3093HA, but is different in terms of using the addition value derivation unit 309313S instead of the addition value derivation unit 309313.

The illumination parameter estimation unit 30931HAS in the aforementioned configuration uses the addition value derivation unit 309313S to derive a parameter b which is an offset component used for the illumination compensation at the illumination compensation filter unit 30932 by using addition values derived from the subsampled pixels. An effect of reducing an amount of calculation for calculating the illumination variation parameter by subsampling is achieved.

(Illumination Compensation Unit 3093OS)

The illumination compensation unit 3093OS which is a modified example of the illumination compensation unit 3093O will be described below.

The illumination compensation unit 3093OS is composed of an illumination parameter estimation unit 30931OS and the illumination compensation filter unit 30932O. The illumination parameter estimation unit 30931OS is composed of the addition value derivation unit 309313S and the parameter b derivation unit 309317O.

The addition value derivation unit 309313S derives the sum Y of the pixel values y of the adjacent decoding images and the sum X of the pixel values x of the reference images with a formula (B-2) and a formula (B-3) as follows.

$$X = \Sigma x[i*2] \quad \text{formula (B-2)}$$

$$Y = \Sigma y[i*2] \quad \text{formula (B-3)}$$

The illumination parameter estimation unit 30931OS in the aforementioned configuration uses the addition value derivation unit 309313S to derive a parameter b which is an offset component used for the illumination compensation at the illumination compensation filter unit 30932O by using addition values derived from the subsampled pixels. An effect of reducing an amount of calculation for calculating the illumination variation parameter by subsampling is achieved.

(Third Embodiment)

An embodiment of the invention will be described below with reference to drawings. An image coding device 11 and an image decoding device 31 in a third embodiment include, as illumination compensation means, illumination compensation means 3093S0 or illumination compensation means 3093S1 instead of the illumination compensation 3093. The configurations of the illumination compensation means are the same as those of the image coding device 11 and the image decoding device 31, which have described in the first embodiment.

(Illumination Compensation Means 3093S0)

Figure 26:
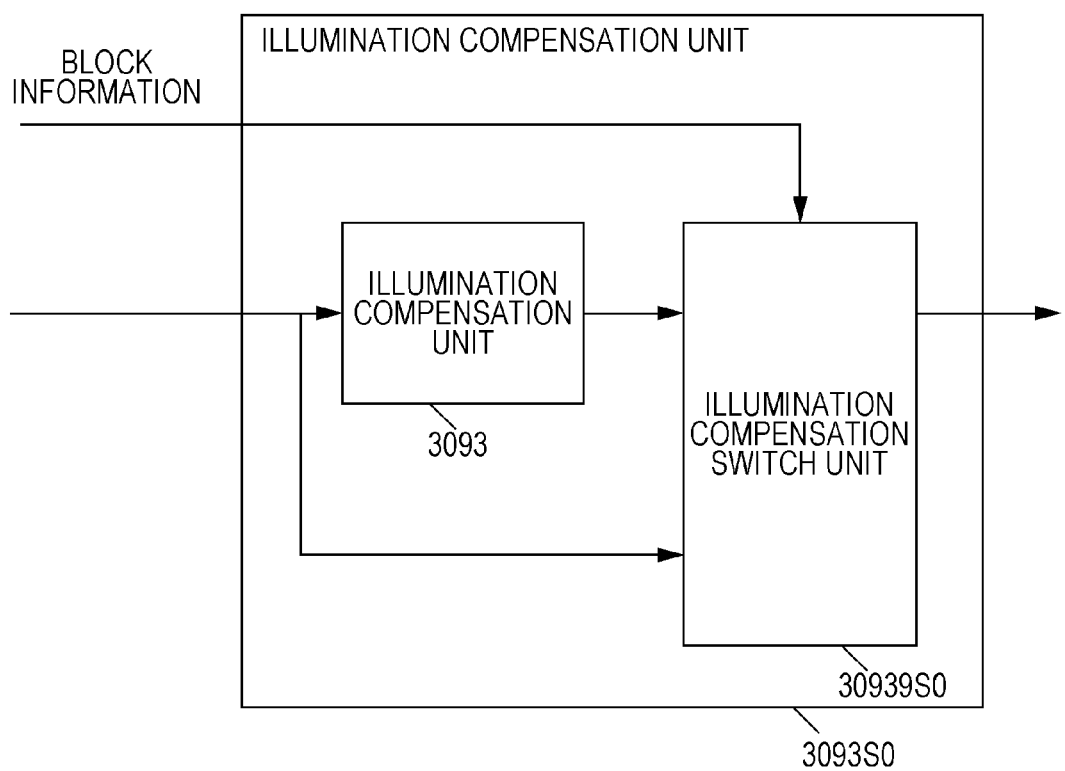
FIG. 26 is a block diagram for explaining a view of an illumination compensation unit 3093S0 including switch means according to a third embodiment.

FIG. 26 is a block diagram for explaining a view of the illumination compensation unit 3093S0 including switch means. As illustrated in FIG. 26, the illumination compensation unit 3093S0 includes, inside thereof, an illumination compensation switch unit 30939S0 and the illumination compensation unit. The illumination compensation switch unit 30939S0 is means for switching whether or not to perform illumination compensation according to block information, and uses a block for which processing is performed at the illumination compensation unit when the block information indicates performing illumination processing and uses a block for which processing is not performed at the illumination compensation unit when the block information does not indicate performing illumination processing. Note that, for the illumination compensation unit 3093, in addition to the illumination compensation unit 3093 which has been described before, the illumination compensation unit 3093A, the illumination compensation unit 3093H, the illumination compensation unit 3093HA, the illumination compensation unit 3093O, the illumination compensation unit 3093S, the illumination compensation unit 3093AS, the illumination compensation unit 3093HS, the illumination compensation unit 3093HAS, the illumination compensation unit 3093OS or the like is able to be used.

Figure 27:
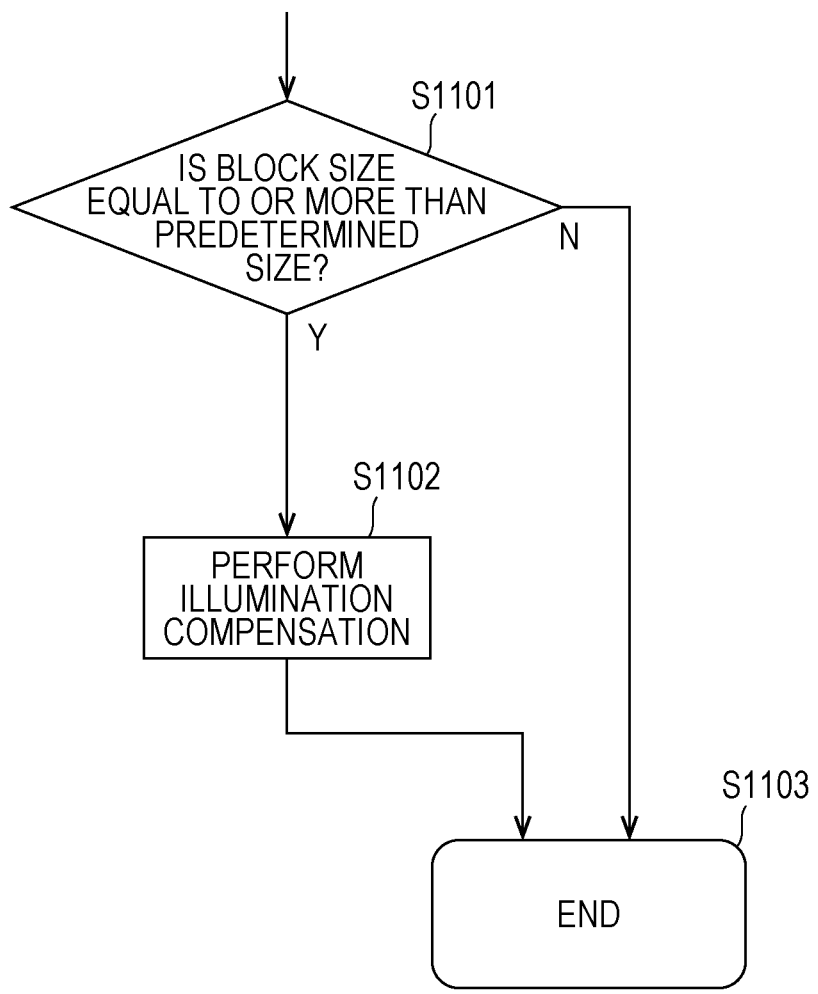
FIG. 27 is a flowchart for explaining an operation of the illumination compensation unit 3093S0 according to the third embodiment.

FIG. 27 is a flowchart for explaining an operation of the illumination compensation unit 3093S0.

S1101: A block size serving as block information is checked in the illumination compensation switch unit 30939S0, and when it is equal to or more than a predetermined size (4×4), the procedure shifts to S1102 to perform illumination compensation. When it is less than the predetermined size, the procedure shifts to S1103 and ends directly.

S1102: Illumination compensation is performed at the illumination compensation unit 3093.

S1103: End

In particular, when the block size is small, calculation load of the illumination compensation is high, so that, when illumination compensation for a small block in which calculation load is high is not performed, an effect of reducing an amount of calculation for a worst case in the illumination compensation is achieved.

Figure 28:
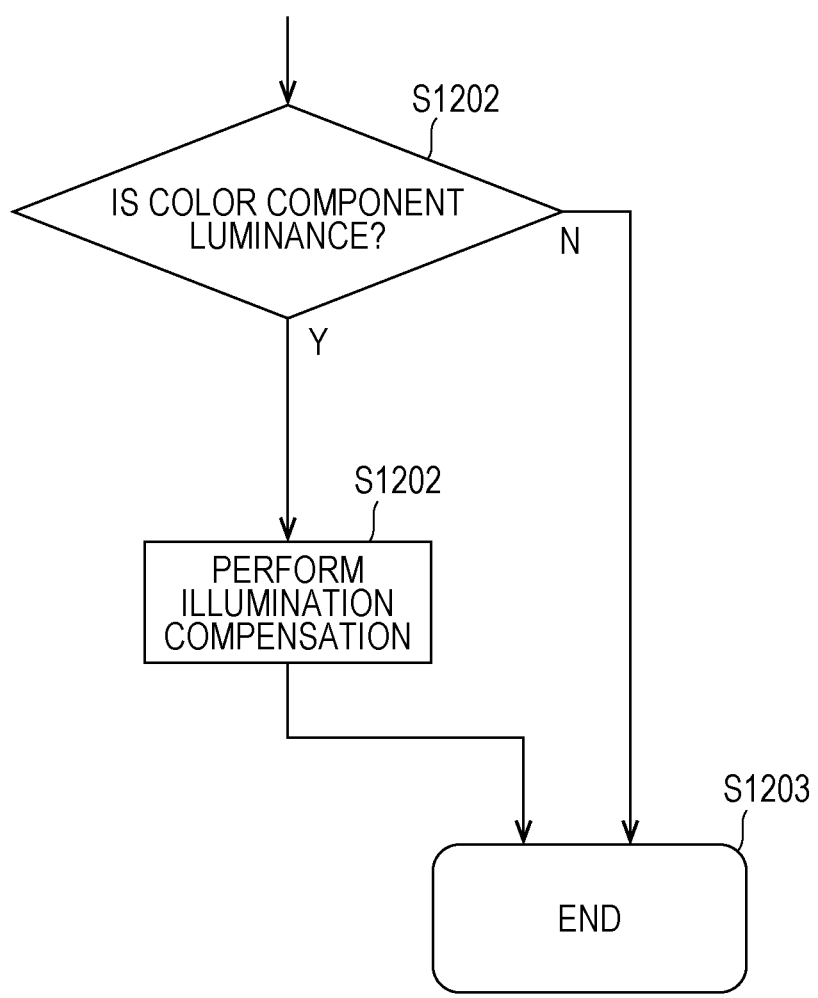
FIG. 28 is a flowchart for explaining another operation of the illumination compensation unit 3093S0 according to the third embodiment.

FIG. 28 is a flowchart for explaining another operation of the illumination compensation unit 3093S0.

S1201: A color component serving as block information is checked in the illumination compensation switch unit 30939S0, and when the color component cIdx is luminance (cIdx is 0, a luminance block), the procedure shifts to S1202 to perform illumination compensation. When the color component cIdx is chroma (cIdx is other than 0, a chroma block), the procedure shifts to S1203 and ends directly.

S1202: Illumination compensation is performed at the illumination compensation unit 3093.

S1203: End

In particular, in a case where a resolution of a chroma component is 4:2:0, which is half of a resolution of a luminance component, when the PU of luminance is 8×8, the PU of chroma is 4×4 and a block size for the chroma becomes small. When illumination compensation is not performed for chroma in which calculation load per a unit area is high, an effect of reducing an amount of calculation for a worst case in the illumination compensation is achieved.

For deciding whether or not the block size is equal to or more than a 4×4 block, whether a block width or a block height is more than 4 is able to be used as a condition for the decision. In a configuration where the 4×4 block is not used for a luminance block and the 4×4 block is used only for chroma, for deciding whether or not the block size is equal to or more than the 4×4 block, whether a CU size is larger than an 8×8 block or whether to be a luminance block is able to be used as a condition for the decision. That is, it may be configured such that illumination prediction is performed when the CU size is larger than the 8×8 block or in the case of the luminance block, and the illumination prediction is not performed in other cases.

(Illumination Compensation Means 3093S1)

Figure 29:
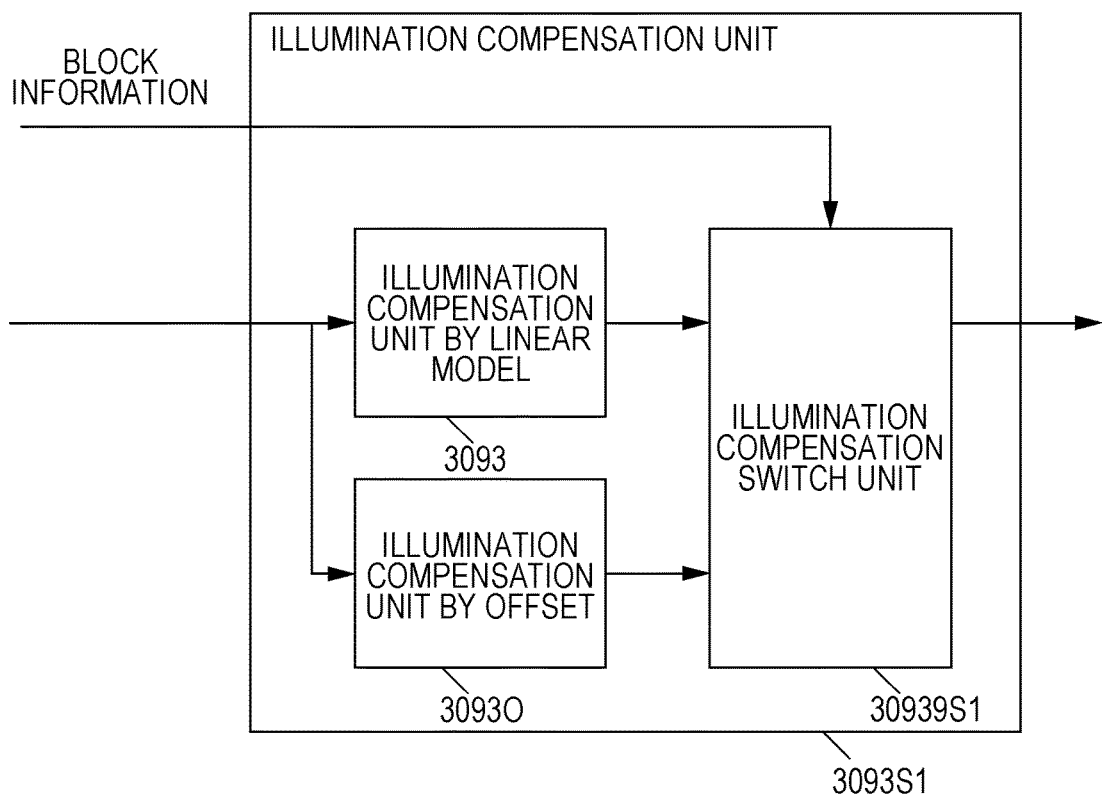
FIG. 29 is a block diagram for explaining a view of an illumination compensation unit 3093S1 including switch means according to the third embodiment.

FIG. 29 is a block diagram for explaining a view of the illumination compensation unit 3093S1 including switch means. As illustrated in FIG. 29, the illumination compensation unit 3093S1 includes, inside thereof, an illumination compensation switch unit 30939S1, the illumination compensation unit 3093, and the illumination compensation unit 3093O. The illumination compensation unit 3093 is means for performing illumination compensation by a linear model, and in addition to the illumination compensation unit 3093, for example, the illumination compensation unit 3093A, the illumination compensation unit 3093H, the illumination compensation unit 3093HA, the illumination compensation unit 3093S, the illumination compensation unit 3093AS, the illumination compensation unit 3093HS, the illumination compensation unit 3093HAS, or the like is able to be used. The illumination compensation unit 3093O is means for performing illumination compensation by an offset model. For example, in addition to the illumination compensation unit 3093O, the illumination compensation unit 3093OS or the like is able to be used. Note that, the illumination compensation by the linear model refers to illumination compensation including means for using a parameter a corresponding to inclination and a parameter b corresponding to offset for illumination deformation parameters and adding the parameter b of the illumination variation parameter to a product of a motion compensation image obtained from a reference picture and the parameter a. Note that, right-shifting may be involved for integer arithmetic operation. That is, it may be such that right-shifting is performed after calculating the product of the motion compensation image and the parameter a, and the parameter b is added thereto, or right-shifting is performed after calculating the product of the motion compensation image and the parameter a, and the parameter b is added thereto, and then right-shifting is performed. Moreover, the illumination compensation by the offset model refers to illumination compensation including means for adding the parameter b of the illumination variation parameter to a motion compensation image obtained from a reference picture.

The illumination compensation switch unit 30939S1 switches whether or not to perform illumination compensation by the linear model or perform illumination compensation by the offset model according to the block information.

Figure 30:
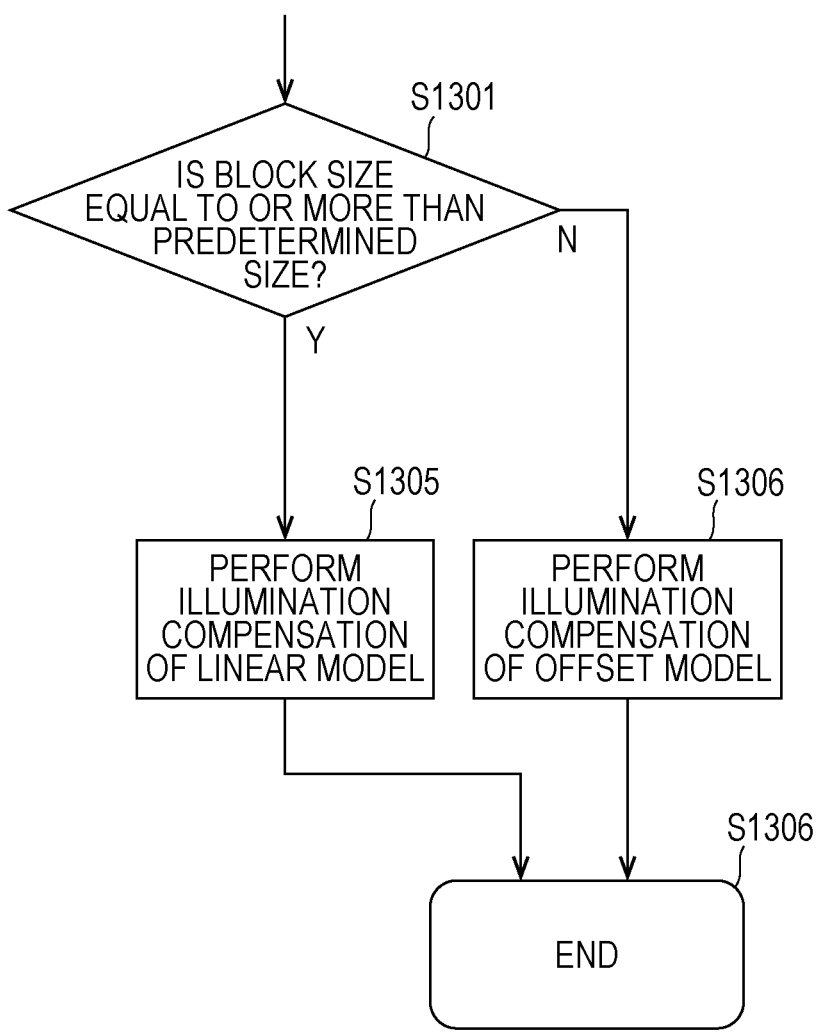
FIG. 30 is a flowchart for explaining an operation of the illumination compensation unit 3093S1 according to the third embodiment.

FIG. 30 is a flowchart for explaining an operation of the illumination compensation unit 3093S1.

S1301: A block size serving as block information is checked in the illumination compensation switch unit 30939S1, and when it is equal to or more than a predetermined size (for example, 4×4 block), the procedure shifts to S1302 to perform illumination compensation by the linear model. When it is less than the predetermined size, the procedure shifts to S1303 to perform illumination compensation by the offset model.

S1302: Illumination compensation by the linear model is performed at the illumination compensation unit 3093.

S1303: Illumination compensation by the offset model is performed at. the illumination compensation unit 3093O.

S1304: End

In particular, when the block size is small, calculation load of the illumination compensation is high, so that illumination compensation for a small block in which calculation load is high is performed by the offset model in which calculation load is low, thus achieving an effect of reducing an amount of calculation for a case where calculation load is particularly high in the illumination compensation. In particular, when illumination compensation is limited to 2N×2N (when the illumination compensation flag ic_enable_flag is set only in a case where PartMode is 2N×2N, and the illumination compensation flag ic_enable_flag is set to 0 for other cases), a minimum size of the luminance block is 8×8 and a minimum size of the chroma block is 4×4. Therefore, when the block size is 4×4, a block becomes smallest, which is a worst case in terms of calculation load. In particular, by defining the predetermined size as 4×4, an effect of reducing calculation load in the worst case is achieved.

Note that, for deciding whether or not the block size is equal to or more than the 4×4 block, whether a block width or a block height is more than 4 is able to be used as a condition for the decision. In a configuration where the 4×4 block is not used for a luminance block and the 4×4 block is used only for chroma, for deciding whether or not the block size is equal to or more than the 4×4 block, whether a CU size is larger than the 8×8 block or whether to be a luminance block is able to be used as a condition for the decision. That is, it may be configured such that illumination prediction is performed by the linear model when the CU size is larger than the 8×8 block or in the case of the luminance block, and the Illumination prediction by the offset model is performed in other cases.

Figure 31:
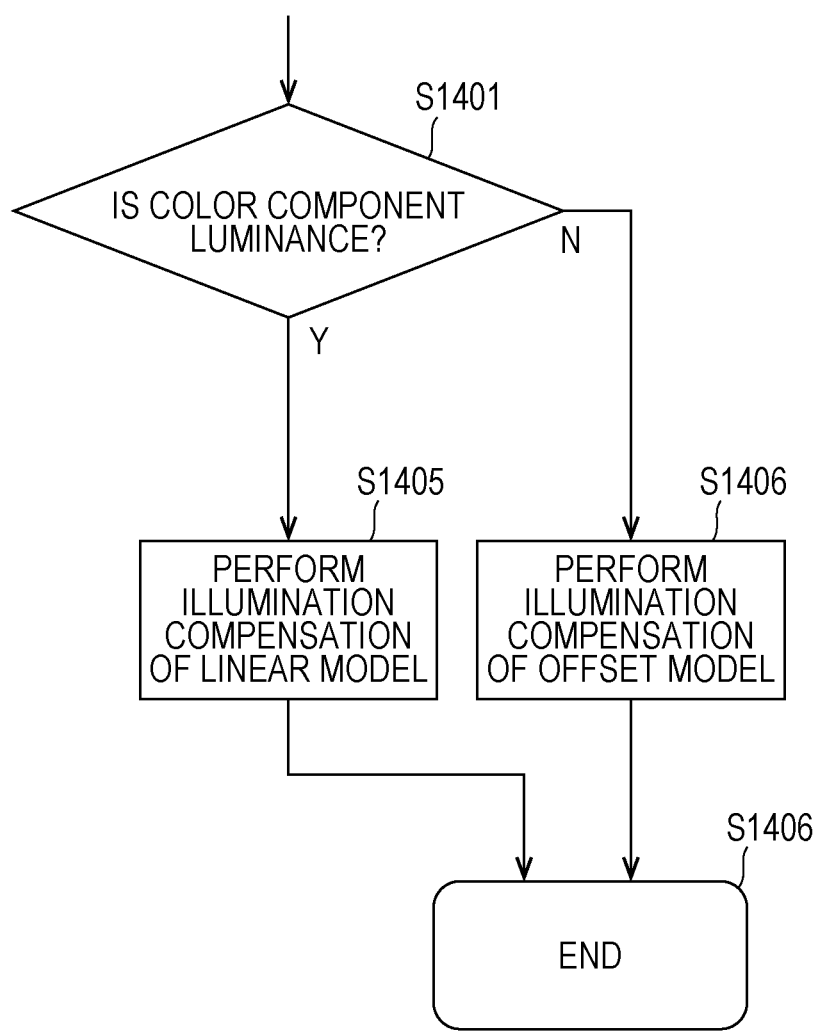
FIG. 31 is a flowchart for explaining another operation of the illumination compensation unit 3093S1 according to the third embodiment.

FIG. 31 is a flowchart for explaining another operation of the illumination compensation unit 3093S1.

S1401: A color component serving as block information is checked in the illumination compensation switch unit 30939S1, and when the color component cIdx is luminance (cIdx is 0, the target block is a luminance block), the procedure shifts to S1402 to perform illumination compensation, and when the color component is chroma (cIdx is other than 0, a target block is a chroma block), the procedure shifts to S1403 and ends directly.

S1402: Illumination compensation by the linear model is performed at the linear illumination compensation unit 3093.

S1403: Illumination compensation by the offset model is performed at the offset illumination compensation unit 3093O.

S1404: End

In particular, in a case where a resolution of a chroma component is 4:2:0, which is half of a resolution of a luminance component, when the PU of luminance is 8×8, the PU of chroma is 4×4 and a block size for the chroma becomes small. Illumination compensation for a small block in which calculation load is high by the offset model in which calculation load is low is performed for chroma in which calculation load per a unit area is high, thus achieving an effect of reducing an amount of calculation for a worst case in the illumination compensation.

Note that, a part of the image coding device 11 and the image decoding device 31 in the embodiments described above, for example, the entropy decoding unit 301, the prediction parameter decoding unit 302, the prediction image generation unit. 101, the DCT/quantization unit 103, the entropy coding unit 104, the inverse quantization/inverse DCT unit 105, the coding parameter determination unit 110, the prediction parameter coding unit 111, the entropy decoding unit 301, the prediction parameter decoding unit 302, the prediction image generation unit 308, and the inverse quantization/inverse DCT unit 311 may be realized by a computer. In this case, it may be realized by recording a program for realizing a control function thereof in a computer readable recording medium and causing a computer system to read this program recorded in the recording medium for execution. Note that, the "computer system" which is referred to here is a computer system incorporated in either the image coding device 11-11h or the image decoding device 31-31h, and includes an OS and hardware such as peripheral equipment. Further, the "computer readable recording medium" refers to a portable medium such as a flexible disk, a magneto-optical disk, a ROM or a CD-ROM, or a storage device such as a hard disk installed in the computer system. Furthermore, the "computer readable recording medium" may also include one for holding a program, dynamically for a short time period like a communication line in a case where a program is transmitted via a network such as the Internet or a communication line such as a telephone line, and one for holding a program for a fixed period of time like a volatile memory inside a computer system serving as a server or a client in such a case. In addition, the aforementioned program may be one for realizing a part of the functions described above, and further may be one capable of realizing the functions described above in combination with a program which has been already recorded in the computer system.

Moreover, a part of or all of the Image coding device 11 and the image decoding device 31 in the embodiments described above may be realized as an integrated circuit such as an LSI (Large Scale Integration). Each functional block of the image coding device 11 and the image decoding device 31 may be set as an individual processor and a part or all thereof may be integrated into a processor. Further, a method for making into an integrated circuit is not limited to the LSI and a dedicated circuit or a versatile processor may be used for realization. Further, in a case where a technology for making into an integrated circuit in place of the LSI appears with advance of a semiconductor technology, an integrated circuit by this technology may be also used.

Although one embodiment of the invention has been described in detail with reference to the drawings, specific configurations are not limited to those described above, and various design changes and the like can be made within a scope that does not depart from the gist of the invention.

(Summary)

The present specification also describes at least following invention.

According to an illumination compensation device with one configuration, the illumination compensation device includes an illumination compensation unit that applies illumination compensation to a motion compensation image, in which the illumination compensation unit includes an illumination parameter estimation unit that derives an illumination variation parameter from reference images in a reference layer and adjacent decoding images in a target layer, and an illumination compensation filter that performs the illumination compensation by using the illumination variation parameter, the illumination compensation filter includes means for adding a parameter b of the illumination variation parameter to a product of the motion compensation image obtained from a reference picture and a parameter a of the illumination variation parameter, the illumination parameter estimation unit includes parameter a derivation means for deriving the parameter a from a first parameter and a second parameter, the parameter a derivation means includes a parameter normalization shift unit that derives a first normalization shift value and a second normalization shift value, a parameter normalization shift unit that uses the first normalization shift value to derive a normalization first parameter by right-shifting the first parameter, and a parameter normalization shift unit that uses the second normalization shift value to derive a normalization second parameter by right-shifting the second parameter, and the parameter normalization shift unit derives the first normalization shift value by subtracting a predetermined value from the second normalization shift value.

According to the aforementioned configuration, since the first normalization shift value is derived according to the second normalization shift value, an effect of reducing an amount of calculation for deriving the first normalization shift value is achieved.

According to an illumination compensation device with one configuration, the illumination compensation device includes an illumination compensation unit that applies illumination compensation to a motion compensation image, in which the illumination compensation unit includes an illumination parameter estimation unit that derives an illumination variation parameter, which includes at least a parameter b, from reference image regions in a reference layer and adjacent decoding image regions in a target layer, and an illumination compensation filter that performs the illumination compensation by using the illumination variation parameter, the illumination compensation filter includes either means for adding the parameter b of the illumination variation parameter to a product of the motion compensation image obtained from a reference picture and a parameter a of the illumination variation parameter or means for adding the motion compensation image and the parameter b of the illumination variation parameter, and the illumination parameter estimation unit performs derivation by subsampling and referring to pixels of the reference image regions and the adjacent decoding image regions.

According to the aforementioned configuration, since the illumination variation parameter is calculated by referring to the pixels which are subsampled, an effect of reducing an amount of calculation is achieved.

According to the illumination compensation device with one configuration, the illumination parameter estimation unit includes parameter b derivation means for deriving the parameter b from a difference between a sum of the pixels of the adjacent decoding images and a sum of the pixels of the reference images, and the pixels of the adjacent decoding images and the pixels of the reference images are subsampled.

According to the illumination compensation device with one configuration, the illumination parameter estimation unit includes parameter a derivation means for deriving the parameter a by using a first parameter derived from a sum of products of pixels of the adjacent decoding images and a second parameter derived from a sum of pixels of the reference images, and parameter b derivation means for deriving the parameter b from a sum of the pixels of the adjacent decoding images, the parameter a, and the sum of the pixels of the reference images, and the pixels of the adjacent decoding images and the pixels of the reference images are subsampled.

According to the illumination compensation device with one configuration, the illumination parameter estimation unit includes parameter a derivation means for deriving the parameter a from a first parameter derived from a sum of products of pixels of the reference images and pixels of the adjacent decoding images and a product of a sum of the pixels of the reference images and a sum of the pixels of the adjacent decoding images, and a second parameter derived from a sum of squares of the pixels of the reference images and a square of the sum of the pixels of the reference images, and parameter b derivation means for deriving the parameter b from the sum of the pixels of the adjacent decoding images, the parameter a, and the sum of the pixels of the reference images, and the pixels of the adjacent decoding images and the pixels of the reference images are subsampled.

According to the illumination compensation device with one configuration, the parameter a derivation means includes a parameter normalization shift unit that derives a first normalization shift value and a second normalization shift value, a parameter normalization shift unit that uses the first normalization shift value to derive a normalization first parameter by right-shifting the first parameter by the number of times of clipping the first normalization shift value to be equal to or more than 0, and a parameter normalization shift unit that uses the second normalization shift value to derive a normalization second parameter by right-shifting the second parameter by the number of times of clipping the second normalization shift value to be equal to or more than 0, and the first normalization shift value is derived by subtracting a predetermined value from the second normalization shift value.

According to the illumination compensation device with one configuration, the parameter a derivation means includes a parameter normalization shift unit that derives at least a second normalization shift value, and a parameter normalization shift unit that derives a normalization second parameter which is equal to or less than 127 by right-shifting the second parameter by the number of times of clipping the second normalization shift value to be equal to or more than 0, and means for deriving tb derived by (16318+(normalization second parameter»1))/normalization second parameter and means for deriving the parameter a by using a product of the tb and the first parameter.

According to an illumination compensation device with one configuration, the illumination compensation device includes an illumination compensation unit that applies illumination compensation to a motion compensation image, in which in a case where a target block has a predetermined size or more, the illumination compensation is performed by the illumination compensation unit, and in a case where the target block is less than the predetermined size, the illumination compensation is not performed.

According to an illumination compensation device with one configuration, the illumination compensation device includes an illumination compensation unit that applies illumination compensation to a motion compensation image, in which the illumination compensation unit includes an illumination parameter estimation unit that derives an illumination variation parameter from reference image regions in a reference layer and adjacent decoding image regions in a target layer, and an illumination compensation filter that performs the illumination compensation by using the illumination variation parameter, and the illumination compensation filter, in a case where a target block has a predetermined size or more, performs the illumination compensation by means for adding a parameter b of the illumination variation parameter to a product of the motion compensation image obtained from the reference layer and a parameter a of the illumination variation parameter, and in a case where the target block is less than the predetermined size, performs the illumination compensation by means for adding the motion compensation image and the parameter b of the illumination variation parameter.

According to the illumination compensation device with one configuration, the predetermined size is a 4×4 block.

According to an illumination compensation device with one configuration, the illumination compensation device includes an illumination compensation unit that applies illumination compensation to a motion compensation image, in which the illumination compensation unit includes an illumination parameter estimation unit that derives an illumination variation parameter from reference image regions in a reference layer and adjacent decoding image regions in a target layer, and an illumination compensation filter that performs the illumination compensation by using the illumination variation parameter, and the illumination compensation filter, in a case where a target block is a luminance block, performs the illumination compensation by means for adding a parameter b of the illumination variation parameter to a product of the motion compensation image obtained from the reference layer and a parameter a of the illumination variation parameter, and in a case where the target block is a chroma block, performs the illumination compensation by means for adding the motion compensation image and the parameter b of the illumination variation parameter.

According to an LM prediction device with one configuration, the LM prediction device includes an LM prediction unit that applies a chroma prediction image from a luminance image, in which the LM prediction unit includes an LM parameter estimation unit that derives an LM parameter from adjacent luminance images and adjacent chroma images, and an LM prediction filter that uses the LM parameter to generate the chroma prediction image from the luminance image, the LM prediction filter includes means for adding a parameter b of the LM parameter to a product of the luminance image and a parameter a of the LM parameter, the LM parameter estimation unit includes a parameter a derivation unit that derives the parameter a from a first parameter a1 obtained from a difference among a sum of products of pixel values of the adjacent luminance images and pixel values of the adjacent chroma images, a sum XY of the products of pixel values y of the adjacent chroma images and pixel values x of the adjacent luminance images, and a product of a sum Y of the pixel values of the adjacent chroma images and a sum X of the pixel values of the adjacent luminance images, and a second parameter a2v obtained from a difference between a sum XX of squares of the pixel values of the adjacent luminance images and a square of the sum X of the pixel values of the adjacent luminance images, and the parameter a derivation unit includes means for right-shifting the first parameter a1 and the second parameter a2 according to a first normalization shift value and a second normalization shift value which are defined according to the second parameter a2.

According to the LM prediction device with one configuration, the parameter a derivation unit further includes regularization term derivation means for deriving a regularization term, and at least the regularization term is added to the second parameter a2.

According to the LM prediction device with one configuration, the parameter a derivation unit further includes regularization term derivation means for deriving regularization terms, the regularization term derived from the sum Y of the pixel values of the adjacent chroma images is added to the first parameter a1, and the regularization term derived from the sum X of the pixel values of the adjacent luminance images is added to the second parameter a2.

According to the illumination compensation device with one configuration, the illumination compensation device is included.

According to the illumination compensation device with one configuration, the illumination compensation device is included.

INDUSTRIAL APPLICABILITY

The invention is suitably applicable to an image decoding device that decodes coded data in which image data is coded and an image coding device that generates coded data in which image data is coded. Moreover, it is also suitably applicable to a data structure of coded data that is generated by the image coding device and referred to by the image decoding device.

REFERENCE SIGNS LIST 1 image transfer system
11 image coding device
101 prediction image generation unit
102 subtraction unit
103 DCT/quantization unit
104 entropy coding unit
105 inverse quantization/inverse DCT unit
106 addition unit
108 prediction parameter memory (frame memory)
109 reference picture memory (frame memory)
110 coding parameter determination unit
111 prediction parameter coding unit
112 Inter prediction parameter coding unit
1121 merge prediction parameter derivation unit
1122 AMVP prediction parameter derivation unit
1123 subtraction unit
1126 prediction parameter integration unit
113 intra prediction parameter coding unit
21 network
31 image decoding device
301 entropy decoding unit
302 prediction parameter decoding unit
303 inter prediction parameter decoding unit
303111 reference layer decision unit
30312 merge index decoding unit
30313 vector candidate index decoding unit
3032 AMVP prediction parameter derivation unit
3035 addition unit
3036 merge prediction parameter derivation unit
30361 merge candidate derivation unit
303611 merge candidate storage unit
303612 enhancement merge candidate derivation unit
3036121 inter-layer merge candidate derivation unit
3036122 disparity vector acquisition unit
3036123 inter-layer disparity merge candidate derivation unit
303613 basic merge candidate derivation unit
3036131 spatial merge candidate derivation unit
3036132 temporal merge candidate derivation unit
3036133 combined merge candidate derivation unit
3036134 zero merge candidate derivation unit
30362 merge candidate selection unit
304 intra prediction parameter decoding unit
306 reference picture memory (frame memory)
307 prediction parameter memory (frame memory)
308 prediction image generation unit
309 inter-prediction image generation unit
3091 disparity compensation unit
3092 residual prediction unit
30921 residual acquisition unit
30922 residual filter unit
3093 illumination compensation unit
3093A illumination compensation unit
3093H illumination compensation unit
3093HA illumination compensation unit 3093O illumination compensation unit
3093S illumination compensation unit
3093HS illumination compensation unit
3093HAS illumination compensation unit
3093OS illumination compensation unit
30931 illumination parameter estimation unit
30931H illumination parameter estimation unit
30931O illumination parameter estimation unit
309312 integral value derivation unit
309314 first parameter derivation unit
309314H first parameter derivation unit
309315 second parameter derivation unit
309315H second parameter derivation unit
309316 parameter a derivation unit
309316A parameter a derivation unit
3093161 first parameter clip unit
3093162 first parameter normalization shift unit (parameter normalization shift unit)
3093163 second parameter normalization shift unit (parameter normalization shift unit)
3093164 table base parameter a derivation unit
3093165A division parameter a derivation unit
309317 parameter b derivation unit
309317O parameter b derivation unit
30932 illumination compensation filter unit
309321 illumination compensation filter unit
3094 weight prediction unit
310 intra-prediction image generation unit
3104 LM prediction unit
31041 LM parameter estimation unit
31042 LM prediction filter unit
310412 LM integral value derivation unit
310413 LM addition value derivation unit
310414 LM first parameter derivation unit
310415 LM second parameter derivation unit
310416 LM parameter a derivation unit
310416A LM parameter a derivation unit
3104161 LM first parameter clip unit
3104162 LM first parameter normalization shift unit (parameter normalization shift unit)
3104163 LM second parameter normalization shift unit (parameter normalization shift unit)
3104164 table base LM parameter a derivation unit
3104165A division LM parameter a derivation unit
310417 LM parameter b derivation unit
310418 LM regularization term addition unit
3104182 LM second parameter regularization term addition unit
311 inverse quantization/inverse DCT unit
312 addition unit
313 residual storage unit
41 image display device

The invention claimed is:
1. An illumination compensation device for an image of a target block comprising:
  circuitry that obtains neighboring target pixel values indicating pixel values of neighboring pixels of the target block and neighboring reference pixel values indicating pixel values of neighboring pixels of a reference block, and
  derives a parameter a and a parameter b; and
  a filter that obtains a prediction sample value and derives a product of the parameter a and the prediction sample value in the target block and adds the parameter b for outputting a filtered image of the target block, wherein the circuitry
  1) subsamples the neighboring pixels of the target block and the neighboring pixels of the reference block,
  2) derives a sum of the neighboring target pixel values of the subsampled neighboring pixels of the target block and a sum of the neighboring reference pixel values of the subsampled neighboring pixels of the reference block,
  3) derives a first parameter from the sum of the neighboring target pixel values, the sum of the neighboring reference pixel values, and a sum of product of the neighboring target pixel values and the neighboring reference pixel values,
  4) derives a second parameter from the sum of the neighboring reference pixel values and a sum of squares of the neighboring reference pixel values,
  5) derives a second normalization shift value from the second parameter,
  6) derives a first normalization shift value by subtracting a predetermined value from the second normalization shift value,
  7) derives a normalization first parameter by right-shifting the first parameter by using the first normalization shift value,
  8) derives a normalization second parameter by right-shifting the second parameter by using the second normalization shift value,
  9) derives the parameter a by multiplying the normalization first parameter by an inverse table value corresponding to the normalization second parameter, and
  10) derives the parameter b by subtracting a value, which is obtained by multiplying the sum of the neighboring reference pixel values by the parameter a, from the sum of the neighboring target pixel values.

2. An illumination compensation method for an image of a target block comprising:
  obtaining neighboring target pixel values indicating pixel values of neighboring pixels of the target block and neighboring reference pixel values indicating pixel values of neighboring pixels of a reference block;
  obtaining a prediction sample value;
  subsampling the neighboring pixels of the target block and the neighboring pixels of the reference block;
  deriving a sum of the neighboring target pixel values of the subsampled neighboring pixels of the target block and a sum of the neighboring reference pixel values of the subsampled neighboring pixels of the reference block;
  deriving a first parameter from the sum of the neighboring target pixel values, the sum of the neighboring reference pixel values, and a sum of product of the neighboring target pixel values and the neighboring reference pixel values;
  deriving a second parameter from the sum of the neighboring reference pixel values and a sum of squares of the neighboring reference pixel values;
  deriving a second normalization shift value from the second parameter;
  deriving a first normalization shift value by subtracting a predetermined value from the second normalization shift value;
  deriving a normalization first parameter by right-shifting the first parameter by using the first normalization shift value;

deriving a normalization second parameter by right-shifting the second parameter by using the second normalization shift value;

deriving a parameter a by multiplying the normalization first parameter by an inverse table value corresponding to the normalization second parameter;

deriving a parameter b by subtracting a value, which is obtained by multiplying the sum of the neighboring reference pixel values by the parameter a, from the sum of the neighboring target pixel values; and deriving a product of the parameter a and the prediction sample value in the target block and adds the parameter b for outputting a filtered image of the target block.

* * * * *